US012806457B2

(12) United States Patent
Magnone et al.

(10) Patent No.: US 12,806,457 B2
(45) Date of Patent: Nov. 24, 2026

(54) CONTROLLED SYSTEM AND METHODS FOR STORAGE FIRE PROTECTION

(71) Applicant: Tyco Fire Products LP, Cranston, RI (US)

(72) Inventors: Zachary L. Magnone, Warwick, RI (US); Daniel G. Farley, Westminster, MA (US); Chad Albert Goyette, Tiverton, RI (US); John Desrosier, East Greenwich, RI (US); Donald D. Brighenti, Westminster, MA (US); Bernhard Abels, Tallahassee, FL (US); Jacob Joseph Dube, Cranston, RI (US); Richard P. Bonneau, Templeton, MA (US)

(73) Assignee: Tyco Fire Products LP, Cranston, RI (US)

( * ) Notice: Subject to any disclaimer, the term of this patent is extended or adjusted under 35 U.S.C. 154(b) by 0 days.

(21) Appl. No.: 18/380,973

(22) Filed: Oct. 17, 2023

(65) Prior Publication Data

US 2024/0042253 A1 Feb. 8, 2024

Related U.S. Application Data

(63) Continuation of application No. 17/097,385, filed on Nov. 13, 2020, now Pat. No. 11,844,971, which is a (Continued)

(51) Int. Cl.

*A62C 3/00* (2006.01)
*A62C 35/60* (2006.01)

(Continued)

(52) U.S. Cl.

CPC .............. *A62C 3/002* (2013.01); *A62C 35/60* (2013.01); *A62C 37/10* (2013.01); *A62C 37/40* (2013.01); *A62C 37/46* (2013.01); *A62C 99/0072* (2013.01)

(58) Field of Classification Search

CPC ......... A62C 3/002; A62C 35/60; A62C 37/10; A62C 37/40; A62C 37/46; A62C 99/0072; A62C 37/04; G08B 17/00; H01B 7/0045

See application file for complete search history.

(56) References Cited

U.S. PATENT DOCUMENTS 3,834,463 A 9/1974 Allard et al.
3,863,720 A 2/1975 Young (Continued)

FOREIGN PATENT DOCUMENTS

AU 2015274770 B2 12/2020
CN 1347330 5/2002

(Continued)

OTHER PUBLICATIONS

NFPA_13.*

(Continued)

*Primary Examiner* — Qingzhang Zhou
*Assistant Examiner* — Joel Zhou
(74) *Attorney, Agent, or Firm* — Foley & Lardner LLP

(57) ABSTRACT

Fire protection systems and methods for ceiling-only high-piled storage protection. The systems include a plurality of fluid distribution devices disposed beneath a ceiling and above a high-piled storage commodity having a nominal storage height ranging from a nominal 20 ft. to a maximum nominal storage height of 55 ft. and means for quenching a fire in the storage commodity. The stored commodity to be protected may include ex posed expanded plastics. The fluid (Continued)

distribution devices include a frame body having an inlet, an outlet, a sealing assembly, and an electronically operated releasing mechanism supporting the sealing assembly in the outlet.

17 Claims, 32 Drawing Sheets

Related U.S. Application Data continuation of application No. 15/317,524, filed as application No. PCT/US2015/034951 on Jun. 9, 2015, now Pat. No. 10,870,024, which is a continuation of application No. PCT/US2014/072246, filed on Dec. 23, 2014.

(60) Provisional application No. 62/172,287, filed on Jun. 8, 2015, provisional application No. 62/172,281, filed on Jun. 8, 2015, provisional application No. 62/172,291, filed on Jun. 8, 2015, provisional application No. 62/145,840, filed on Apr. 10, 2015, provisional application No. 62/016,501, filed on Jun. 24, 2014, provisional application No. 62/013,731, filed on Jun. 18, 2014, provisional application No. 62/009,778, filed on Jun. 9, 2014.

(51) Int. Cl.

| | |
|---|---|
| ***A62C 37/10*** | (2006.01) |
| ***A62C 37/40*** | (2006.01) |
| ***A62C 37/46*** | (2006.01) |
| *A62C 99/00* | (2010.01) |

(56) References Cited

U.S. PATENT DOCUMENTS

| | | | | | |
|---|---|---|---|---|---|
| 4,281,718 | A | 8/1981 | Claussen et al. | | |
| 5,236,049 | A | 8/1993 | Asselin et al. | | |
| 6,039,124 | A | 3/2000 | Bowman et al. | | |
| 6,685,104 | B1 | 2/2004 | Float et al. | | |
| 2002/0036090 | A1 | 3/2002 | Gil | | |
| 2004/0026529 | A1 | 2/2004 | Float | | |
| 2006/0289174 | A1 | 12/2006 | Yu | | |
| 2008/0319716 | A1* | 12/2008 | Golinveaux | A62C 3/002 | 703/1 |
| 2011/0036598 | A1* | 2/2011 | Pahila | A62C 3/002 | 169/37 |
| 2011/0168416 | A1 | 7/2011 | Frasure et al. | | |
| 2012/0043096 | A1* | 2/2012 | Butz | A62C 99/0009 | 169/5 |
| 2012/0118591 | A1 | 5/2012 | Yen | | |
| 2015/0027739 | A1* | 1/2015 | Multer | A62C 35/68 | 169/37 |
| 2017/0120090 | A1 | 5/2017 | Magnone et al. | | |

FOREIGN PATENT DOCUMENTS

| | | | | | |
|---|---|---|---|---|---|
| CN | 1987943 | A | | 6/2007 | |
| CN | 102125741 | A | | 7/2011 | |
| CN | 202028072 | U | | 11/2011 | |
| DE | 19945856 | | | 4/2001 | |
| DE | 20021237 | U1 | | 9/2001 | |
| EP | 1 171 206 | A1 | | 3/2005 | |
| EP | 1 171 206 | B1 | | 3/2005 | |
| EP | 2 343 105 | A2 | | 7/2011 | |
| EP | 2 371 425 | | | 10/2011 | |
| EP | 3 151 928 | B1 | | 5/2020 | |
| GB | 2 146 243 | A | | 4/1985 | |
| GB | 2214806 | A | * | 9/1989 | A62C 37/40 |
| JP | 50-100898 | | | 8/1975 | |
| JP | 54-117198 | | | 9/1979 | |
| JP | 60-174161 | | | 9/1985 | |
| JP | 09-276426 | | | 10/1997 | |
| JP | 2003-523272 | | | 8/2003 | |
| JP | 2005-168645 | | | 6/2005 | |
| JP | 2009-516533 | | | 4/2009 | |
| KR | 10-2001-0082794 | A | | 7/2002 | |
| KR | 10-1258018 | B1 | | 4/2013 | |
| KR | 10-1329156 | B1 | | 11/2013 | |
| WO | WO-0162345 | A1 | * | 8/2001 | A62C 31/005 |
| WO | WO-2014/076348 | A1 | | 5/2014 | |
| WO | WO-2018/191619 | A1 | | 10/2018 | |

OTHER PUBLICATIONS

International Search Report and Written Opinion for International Application No. PCT/US2015/034951, dated Nov. 6, 2015, 17 pages.

International Search Report and Written Opinion on PCT/US2014/072246, dated Apr. 30, 2015, 9 pages.

* cited by examiner

CONTROLLED SYSTEM AND METHODS FOR STORAGE FIRE PROTECTION

PRIORITY DATA AND INCORPORATION BY REFERENCE

This application is a continuation of U.S. patent application Ser. No. 17/097,385, filed Nov. 13, 2020, which is a continuation of U.S. patent application Ser. No. 15/317,524, filed Dec. 9, 2016 which is a national stage of International Application No. PCT/US2015/034951, filed Jun. 9, 2015, which is an international application claiming the benefit of priority to U.S. Provisional Application No. 62/009,778, filed Jun. 9, 2014; U.S. Provisional Application No. 62/013,731, filed Jun. 18, 2014; U.S. Provisional Application No. 62/016,501, filed Jun. 24, 2014; U.S. Provisional Application No. 62/145,840, filed Apr. 10, 2015; U.S. Provisional Application Nos. 62/172,281, 62/172,287, and 62/172,291, filed Jun. 8, 2015; and which is a continuation of International Application No. PCT/US2014/072246, filed Dec. 23, 2014; each of which is incorporated by reference in its entirety.

TECHNICAL FIELD

The present invention relates generally to fire protection systems for storage. More specifically, the present invention involves fire protection systems to generate a controlled response to a fire in which a fixed volumetric flow of firefighting fluid is distributed to effectively quench a fire.

BACKGROUND OF THE INVENTION

Industry accepted system installation standards and definitions for storage fire protection are provided in National Fire Protection Association publication, *NFPA* 13: *Standard for the Installation of Sprinkler Systems* (2013 ed.) ("NFPA 13"). With regard to the protection of stored plastics, such as for example Group A plastics, NFPA 13 limits the manner in which the commodity can be stored and protected. In particular, Group A plastics including expanded exposed and unexposed plastics is limited to palletized, solid-piled, bin box, shelf or back-to-back shelf storage up to a maximum height of twenty-five feet beneath a maximum thirty foot ceiling depending upon the particular plastic commodity. NFPA 13 does provide for rack storage of plastic commodities, but limits rack storage of Group A plastics to (i) cartoned, expanded or nonexpanded and (ii) exposed, nonexpanded plastics. Moreover, the rack storage of the applicable Group A plastics is limited to a maximum storage height of forty feet (40 ft.) beneath a maximum ceiling of forty-five feet (45 ft.). Under the installation standards, the protection of Group A plastics in racks requires particular accommodations such as for example, horizontal barriers and/or in-rack sprinklers. Accordingly, the current installation standards do not provide for fire protection of exposed, expanded plastics in a rack storage arrangement with or without particular accommodations, e.g., a "ceiling-only" fire protection system. Generally, the systems installed under the installation standards provide for fire "control" or "suppression." The industry accepted definition of "fire suppression" for storage protection is sharply reducing the heat release rate of a fire and preventing its regrowth by means of direct and sufficient application of a flow of water through the fire plume to the burning fuel surface. The industry accepted definition of "fire control" is defined as limiting the size of a fire by distribution of a flow of water so as to decrease the heat release rate and pre-wet adjacent combustibles, while controlling ceiling gas temperatures to avoid structural damage. More generally, "control" according to NFPA 13, can be defined "as holding the fire in check through the extinguishing system or until the fire is extinguished by the extinguishing system or manual aid."

Dry system ceiling-only fire protection systems for rack storage including Group A plastics is shown and described in U.S. Pat. No. 8,714,274. These described systems address a fire in a rack storage occupancy by delaying the discharge of firefighting fluid from actuated sprinklers to "surround and drown" the fire. Each of the systems under either NFPA or described in U.S. Pat. No. 8,714,274, employ "automatic sprinklers" which can be either a fire suppression or fire control device that operates automatically when its heat-activated element is heated to its thermal rating or above, allowing water to discharge over a specified area upon delivery of the firefighting fluid. Accordingly, theses known systems employs sprinklers that are actuated in a thermal response to the fire.

In contrast to systems that use a purely thermally automatic response, there are described systems that use a controller to operate one or more sprinkler devices. For example, in Russian Patent No. RU 95528 a system is described in which the system is controlled to open a fixed geographical area of sprinkler irrigators that is larger than the area of a detected fire. In another example, Russian Patent No. RU 2414966, a system is described which provides for controlled operation of sprinkler irrigators of a fixed zone closer to the center of the fire, but the operation of the zone is believed to rely in part upon visual detection by persons able to remotely operate the sprinkler irrigators. These described systems are not believed to improve upon known methods of addressing the fire nor is it believed that the described system provide fire protection of high challenge commodities and in particular plastic commodities.

Disclosure cf Invention

Preferred systems and methods are provided which improve fire protection over systems and methods that address a fire with a control, suppression and/or surround and drown effect. Moreover, the preferred systems and methods described herein provide for protection of storage occupancies and commodities with "ceiling-only" fire protection. As used herein, "ceiling-only" fire protection is defined as fire protection in which the fire protection devices, i.e., fluid distribution devices and/or detectors, are located at the ceiling, above the stored items or materials such that there are no fire protection devices between the ceiling devices and the floors. The preferred systems and methods described includes means for quenching a fire for the protection of a storage commodity and/or occupancy. As used herein, "quench" or "quenching" of a fire is defined as providing a flow of firefighting liquid, preferably water, to substantially extinguish a fire to limit the impact of a fire on a storage commodity; and in a preferred manner, provide a reduced impact as compared to known suppression performance sprinkler systems. Additionally or alternatively to quenching the fire, the systems and methods described herein can also effectively address the fire with fire control, fire suppression and/or surround and drown performance or provide fire protection systems and methods for stored commodities that are unavailable under current installation designs, standards or other described methods. Generally, the preferred means for quenching includes a piping system, a plurality of fire detectors to detect a fire and a controller in communication with each of the detectors and fluid distribution devices to identify a select number of fluid distribution devices preferably defining an initial discharge array above and about the detected fire. The preferred means provides for controlled operation of the fluid distribution devices of the discharge array to distribute a preferably fixed and minimized flow of firefighting fluid to preferably quench the fire. In some embodiments, the preferred means controls the supply of firefighting fluid to the selected fluid distribution devices.

In particular preferred embodiments of the systems and methodologies described herein, the inventors have determined an application of a preferred embodiment of the quenching means to provide for protection of exposed expanded plastics in racks. In particular, the preferred means for quenching can provide for ceiling-only fire protection of rack storage of exposed expanded plastics without accommodations required under current installation standards, e.g., in-rack sprinklers, barriers, etc., and at heights not provided for under the standards. Moreover, it is believed that the preferred means for quenching can effectively address a high challenge fire in a test fire without the need for testing accommodations, such as for example, vertical barriers that limit the lateral progression of a fire in the test array. Preferred embodiments of the fire protection systems for storage protection described herein provide for a controlled response to a fire by providing a fixed volumetric flow of firefighting fluid at a threshold moment in the fire to limit and more preferably reduce impact of the fire on a storage commodity.

A preferred embodiment of a fire protection system is provided for protection of a storage occupancy having a ceiling defining a nominal ceiling height greater than thirty feet. The system preferably includes a plurality of fluid distribution devices disposed beneath the ceiling and above a storage commodity in the storage occupancy having a nominal storage height ranging from a nominal twenty feet (20 ft.) to a maximum nominal storage height of fifty-five feet (55 ft.) and means for quenching a fire in the storage commodity. The storage commodity being protected can include any one of Class I, II, III or IV, Group A, Group B, or Group C plastics, elastomers, or rubber commodities. In one particular embodiment of the fire protection system, the commodity includes exposed expanded plastic and in another embodiment exposed expanded plastic having a maximum nominal storage height of at least forty feet (40 ft.). The plurality of fluid distribution devices of the preferred system include a fluid distribution device with a frame body having an inlet, an outlet, a sealing assembly, and an electronically operated releasing mechanism supporting the sealing assembly in the outlet. As used herein, "releasing mechanism" means an assembly of moving parts performing a complete functional motion as part of the assembly to release a component of the fluid distribution device, such as for example, the sealing assembly. One particular embodiment of the fluid distribution devices includes an ESFR sprinkler frame body and deflector having a nominal K-factor of 25.2 $GPM/PSI^{1/2}$.

Preferred means for quenching include a fluid distribution system include a network of pipes interconnecting the fluid distribution devices to a water supply; a plurality of detectors to monitor the occupancy for the fire; and a controller coupled to the plurality of detectors to detect and locate the fire, the controller being coupled to the plurality of distribution devices to identify and control operation of a select number of fluid distribution devices and more preferably four fluid distribution devices above and about the fire. One preferred embodiment of the controller includes an input component coupled to each of the plurality of detectors for receipt of an input signal from each of the detectors, a processing component for determining a threshold moment in growth of the fire; and an output component to generate an output signal for operation of each of the identified fluid distribution devices in response to the threshold moment. More particularly, preferred embodiments of the controller provide that the processing component analyzes the detection signals to locate the fire and select the proper fluid distribution devices to preferably define a discharge array above and about the fire for operation.

The preferred systems can be installed beneath a nominal ceiling height of 45 feet and above a nominal storage height of 40 feet. The preferred system can alternatively be installed beneath a nominal ceiling height of 30 feet and above a nominal storage height of 25 feet. The stored commodity can be arranged as any one of rack, multi-rack and double-row rack, on floor, rack without solid shelves, palletized, bin box, shelf, or single-row rack storage. Moreover, the stored commodity can include any one of Class I, II, III or IV, Group A, Group B, or Group C plastics, elastomers, or rubber commodities.

In a preferred embodiment, the electrically operated releasing mechanism of a fluid distribution device for use in the preferred systems and methods described herein can be any one of: a strut and lever assembly with a designed fracture region; a hook and strut assembly in a latched arrangement; a hook and strut assembly with a link operated by resistance heating; a reactive strut and link assembly; a hook and strut assembly with a defined electronic flow path; a hook and strut assembly with an electrically fusible wire link; a sealing assembly including a retracting linear actuator or a combination thereof.

In a preferred embodiment in which the electrically operated releasing mechanism is a strut and lever assembly with a designed fracture region, the assembly includes a hook member having a first end and a second end and a strut member having a first end and a second end. The first end of the strut member is in contact with the hook member between the first and second end of the hook member to define a fulcrum. A load member acts on the hook member on a first side of the fulcrum to define a first moment arm. A preferred link extends between the hook and strut. The preferred link has a fracture region to maintain the hook member in a static position with respect to the strut member to define the unactuated state of the assembly. The link is preferably engaged with the hook member on a second side of the fulcrum opposite the first side of the fulcrum with respect to the load member to define a second moment arm. An actuator is preferably coupled to one of the hook and strut members to apply a force between the hook and strut members that breaks the fracture region of the link such that the hook member pivots about the fulcrum to define the actuated state of the trigger assembly. In a preferred embodiment of the device, the frame body includes a pair of frame arms disposed about the body extending from the outlet to the second end of the frame body to converge toward an apex axially aligned along the longitudinal axis with the load member in a threaded engagement with the apex. The actuator is preferably coupled to the hook member; and where the frame arms define a first plane, the actuator applies its force in a second plane intersecting the first plane with the longitudinal axis being disposed along the intersection of the first and second planes. The preferred link has a first portion coupled with the strut member and a second portion coupled with the hook member. The hook member preferably has a recess through which the actuator is coupled with the hook member; and more preferably includes an internally threaded portion for mating with an externally threaded portion of the actuator. The link has a third portion that connects the first portion to the second portion and defining a tensile load of the link and more preferably a designed fracture region of the link. In one embodiment of the link, a thickness of the third portion is less than a thickness of at least one of the first and second portions. More preferably, a thickness of the third portion is less than half a thickness of at least one of the first and second portions. Additionally or alternatively, in one embodiment of the link, a width of the third portion is less than a width of at least one of the first and second portions of the link. In one preferred aspect, the third portion defines a notch in the connection between the first and second portions. In preferred embodiments of the assembly, the actuator can be a solenoid actuator and is more preferably a Metron actuator, in which the actuator is coupled to a control panel. In another preferred aspect of the strut and lever assembly with a designed fracture region, a thermally insensitive link statically maintains the assembly to support a sealing assembly. The thermally insensitive link preferably includes a fracture region having a maximum tensile load capacity ranging from 50 to 100 pounds.

Another embodiment of the releasing mechanism includes a hook and strut assembly in a latched arrangement. The assembly includes a preferred hook member having a first lever portion and a second lever portion in which the second lever portion has a catch portion. In a preferred embodiment, the catch portion is integrally formed with the second lever portion. A load member is in contact with the first lever portion at a first location aligned with the longitudinal axis to place a load on the first lever portion. A strut member has a first end in contact with the first lever portion at a second location spaced from the first location to support the first lever portion under the load from the load member and to define a fulcrum about which the hook member rotates upon operation of the assembly; the strut member having a second end in contact with the sealing body. A portion of the strut member is preferably in a frictional engagement with the catch portion to prevent the hook member from pivoting about the fulcrum and axially transfer the load to the button and support the sealing body in the outlet of the frame body. A linear actuator is preferably coupled to the strut member to displace the second lever portion in the extended configuration relative to the strut member such that the catch portion disengages from the strut member such that the hook member rotates about the fulcrum. The hook member preferably includes a connecting portion between the first lever portion and the second portion, and the strut member includes an intermediate portion between the first end and the second end that preferably defines a window for the second lever portion to extend through. In a preferred embodiment of the latched arrangement the strut member and hook member define a direct interlocked engagement with each other and the linear actuator acts on one of the strut member and hook member to release the direct interlocked engagement in operation of the mechanism. The strut member preferably includes an internal edge defining a slot of the strut member; and the hook member has a portion forming a catch to interlock with the internal edge of the strut member in the first configuration. The hook member is preferably substantially U-shaped.

In a preferred embodiment of the electrically operated releasing mechanism, a hook and strut assembly with a link is operated by resistance heating. The link preferably includes a solder link having two metal members with a thermally responsive solder disposed therebetween to couple the two metal members together to maintain the sealing support in a first configuration; and at least one electrical contact to heat the solder link to melt the solder so as to permit the two metal members to separate and place the sealing support in a second configuration. The electrical contact preferably defines a continuous electrical flow path over the solder link; and in one embodiment, the electrical contact is an insulated wire repetitively extending over one of the metal members to define the continuous electrical path. One of the metal members is preferably disposed between the electrical contact and the solder. Moreover, one of the metal members preferably includes a layer of conductive material and an insulator material is preferably deposited between the resistive material and the one metal member. In a preferred aspect, the defined resistivity of the conductive material is such that the solder can be melted by a 24 volt supply.

Another embodiment of the electrically operated releasing mechanism is a reactive strut and link assembly that includes a solder link having two metal members with a thermally responsive solder disposed therebetween to couple the two metal members together and a reactive layer disposed between one of the metal members and the solder material. The reactive layer preferably includes a first insulation layer, and a second insulation layer coupled to a thermite structure disposed between the first and second insulation layers. At least one electrical contact ignites the thermite structure and defines a preferably continuous electrical path through the reactive layer. In a preferred embodiment, the electrical contact is a single contact to define an ignition point in the thermite structure. The thermite structure can be a nano thermite multilayer structure; and more particularly include alternating oxidizers and reducers. In a preferred aspect, the electrical contact is a nichrome wire.

Preferred embodiments of the fluid distribution device and releasing mechanism to define an electrical actuation flow path. In one embodiment, the frame body is conductive to carry an electrical signal and define a first electrical pole, a hook and strut assembly with a link; and a conductive member suitable to define a second electrical pole, the conductive member being insulated from the frame body so as to define the electrical actuation flow path. In one preferred aspect, the link is thermally responsive and more preferably a thermally responsive soldered link. Alternatively, the link is an electronically fusible link includes a nickel chromium alloy wire. In one preferred embodiment, the hook and strut assembly includes a hook member having a first portion in electrical contact with the frame body and a strut member having a first end and a second end. The first end of the strut member defines a fulcrum to support the first portion of the hook member with the second end of the strut member engaged with the sealing body. The link extends between a second portion of the hook member and a portion of the strut member between the first and second ends. The first portion of the hook preferably includes an insulated region in contact with the first end of the strut member, the frame including a pair of frame arms disposed about the frame body such that the electrical actuation flow path is defined through the frame arms, the hook member and across the link. The insulated region of the hook member preferably includes a recess formed in the first portion of the hook member, a strut engagement plate received in the recess having a notch formation for receiving the first end of the strut member; and an insulator disposed between the recess and the strut engagement plate. The conductive member of the fluid distribution device preferably includes an ejection spring engaged with the sealing body. The ejection spring preferably includes an insulated coating. In preferred embodiments, a portion of the frame contacted by the ejection spring has an insulated coating and more particularly includes an insulated coated portion of the frame arms depending from the frame body.

In yet another embodiment of the electrically operated releasing mechanism including a retracting linear actuator having an extended configuration for maintaining the sealing body in the outlet and a retracted configuration to space the sealing body from the outlet. In a preferred embodiment of the fluid distribution device, the sealing body is hinged with respect to the frame body by a hinged connection to pivot the sealing body from the unactuated state to the actuated state of the device. In a preferred embodiment, the sealing body has a first surface and a second surface opposite the first surface, the linear actuator being disposed in the sealing body between the first and second surface. The linear actuator engages a recess preferably formed along an inner surface of the frame body proximate the outlet in the unactuated state of the device. Upon actuation, the linear actuator retracts to permit the sealing body to pivot away from the outlet. In one preferred embodiment of the fluid distribution device, the frame body is one of a spray nozzle frame body or a sprinkler frame body. The frame body preferably includes an internal pin connection for forming a hinged connection with the sealing body. Alternatively, the hinged connection can be external of the frame body. The hinge connection can be spring biased to the actuated state of the device.

In another embodiment of the releasing mechanism includes a ball-detent mechanism having at least one ball, a corresponding detent, and linear actuator pressuring the at least one ball into contact with the corresponding detent in the extended configuration of the linear actuator such that the ball-detent mechanism supports the sealing body proximate the outlet in the unactuated state of the device. In its retracted configuration, the linear actuator releases pressure from the at least one ball and out of contact with the corresponding detent in the retracted configuration of the linear actuator to space the sealing body from the outlet in the actuated state of the device. In one embodiment of the mechanism, the sealing body defines an internal passageway for the at least one ball and the frame body includes an internal surface proximate the outlet in which the corresponding detent is formed. The linear actuator is preferably coupled to the sealing body to pressure the at least one ball into contact with the corresponding detent. In one embodiment, the at least one ball translates in a direction orthogonal to the direction of operation of the linear actuator. More preferably, the linear actuator operates parallel to the longitudinal axis, and the at least one ball translates radially with respect to the longitudinal axis. The linear actuator can be embodied as a Metron actuator or alternatively as a solenoid actuator. For a preferred system installation, the actuator is coupled to a control panel.

In another preferred aspect, a method of fire protection of a storage occupancy is provided. The preferred method includes detecting a fire in a storage commodity in the storage occupancy and quenching the fire in the storage commodity. In a preferred method of ceiling-only fire protection of a storage occupancy having a ceiling of a nominal ceiling height of thirty feet or greater, the method includes detecting a fire in a high-piled storage commodity in the storage occupancy having a nominal storage height ranging from a nominal 20 ft. to a maximum nominal storage height of 55 ft. with the commodity including exposed expanded plastics. The preferred method further includes electrically operating a releasing mechanism in a plurality of fluid distribution devices to quench the fire in the storage commodity.

The preferred method includes determining a select plurality of fluid distribution devices to define a discharge array above and about the fire. The fluid distribution devices can be determined dynamically or may be a fixed determination. The determination preferably includes identifying preferably any one of four, eight or nine adjacent fluid distribution devices above and about the fire. The preferred method further includes identifying a threshold moment in the fire to operate the identified fluid distribution devices substantially simultaneously.

A preferred method of detecting the fire includes continuously monitoring the storage occupancy and defining a profile of the fire and/or locating the origin of the fire. Preferred embodiments of locating the fire includes defining an area of fire growth based upon data readings from a plurality of detectors that are monitoring the occupancy; determining a number of detectors in the area of fire growth; and determining the detector with the highest reading. Preferred methods of quenching includes determining a number of discharge devices proximate the detector with the highest reading, and more preferably determining the four discharge devices about the detector with the highest reading. A preferred embodiment of the method includes determining a threshold moment in the fire growth to determine when to operate the discharge devices; and quenching includes operating the preferred discharge array with a controlled signal.

Although the Disclosure of the Invention and the preferred systems and methods address fire protection of exposed expanded plastic stored commodities without accommodations required under current installation standards and at heights not provided for under the standards, it is to be understood that the preferred systems and method and features thereof are applicable to fire protection of other storage occupancies and commodities and their various arrangements. The Disclosure of the Invention is provided as a general introduction to some embodiments of the invention, and is not intended to be limiting to any particular configuration or system. It is to be understood that various features and configurations of features described in the Disclosure of the Invention can be combined in any suitable way to form any number of embodiments of the invention. Some additional example embodiments including variations and alternative configurations are provided herein.

BRIEF DESCRIPTION OF DRAWINGS

The accompanying drawings, which are incorporated herein and constitute part of this specification, illustrate exemplary embodiments of the invention, and together, with the general description given above and the detailed description given below, serve to explain the features of the invention. It should be understood that the preferred embodiments are some examples of the invention as provided by the appended claims.

MODE(S) FOR CARRYING OUT THE INVENTION

Figure 1:
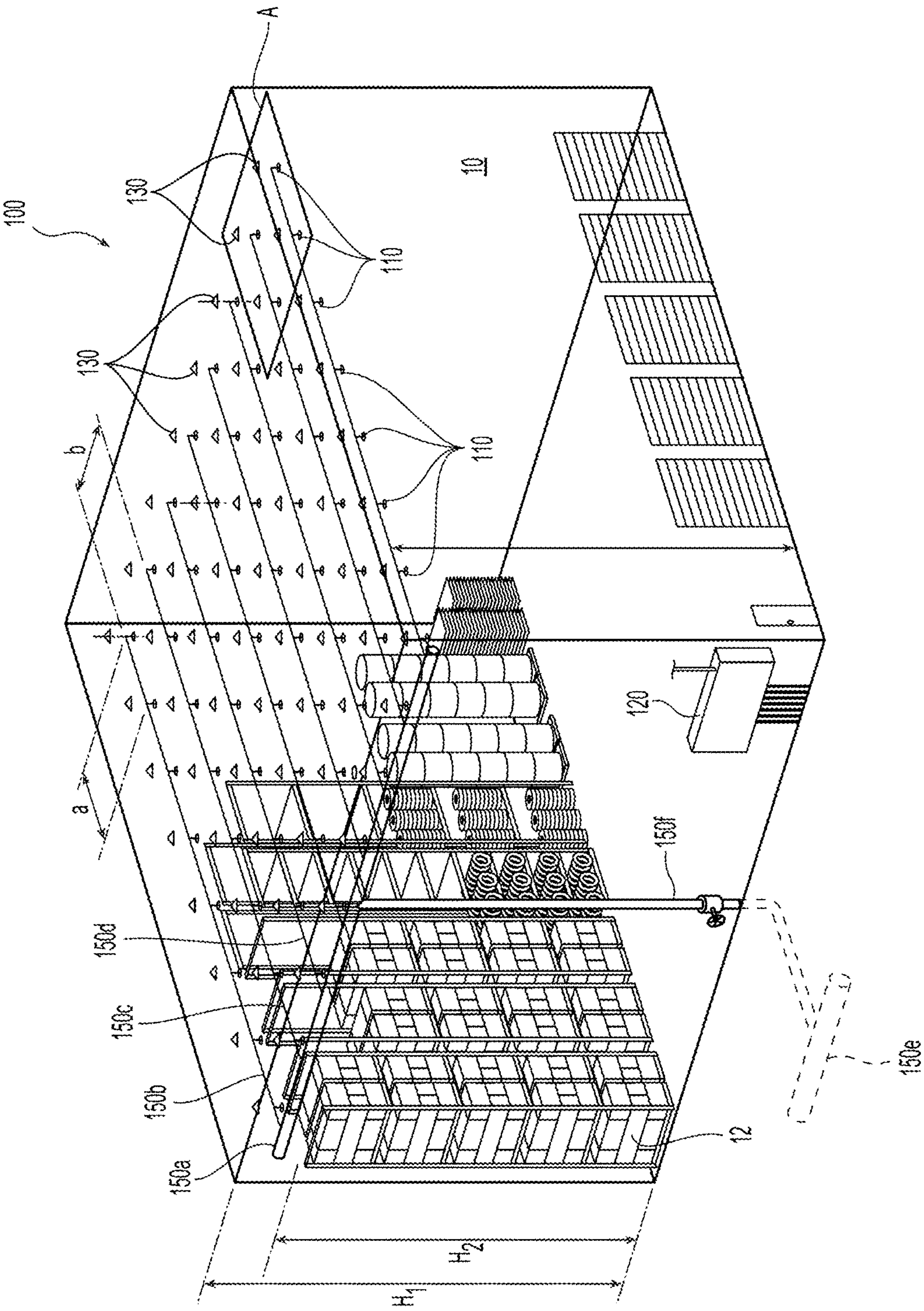
FIG. 1 is a representative illustration of one embodiment of the preferred fire protection system for storage.
Figure 2:
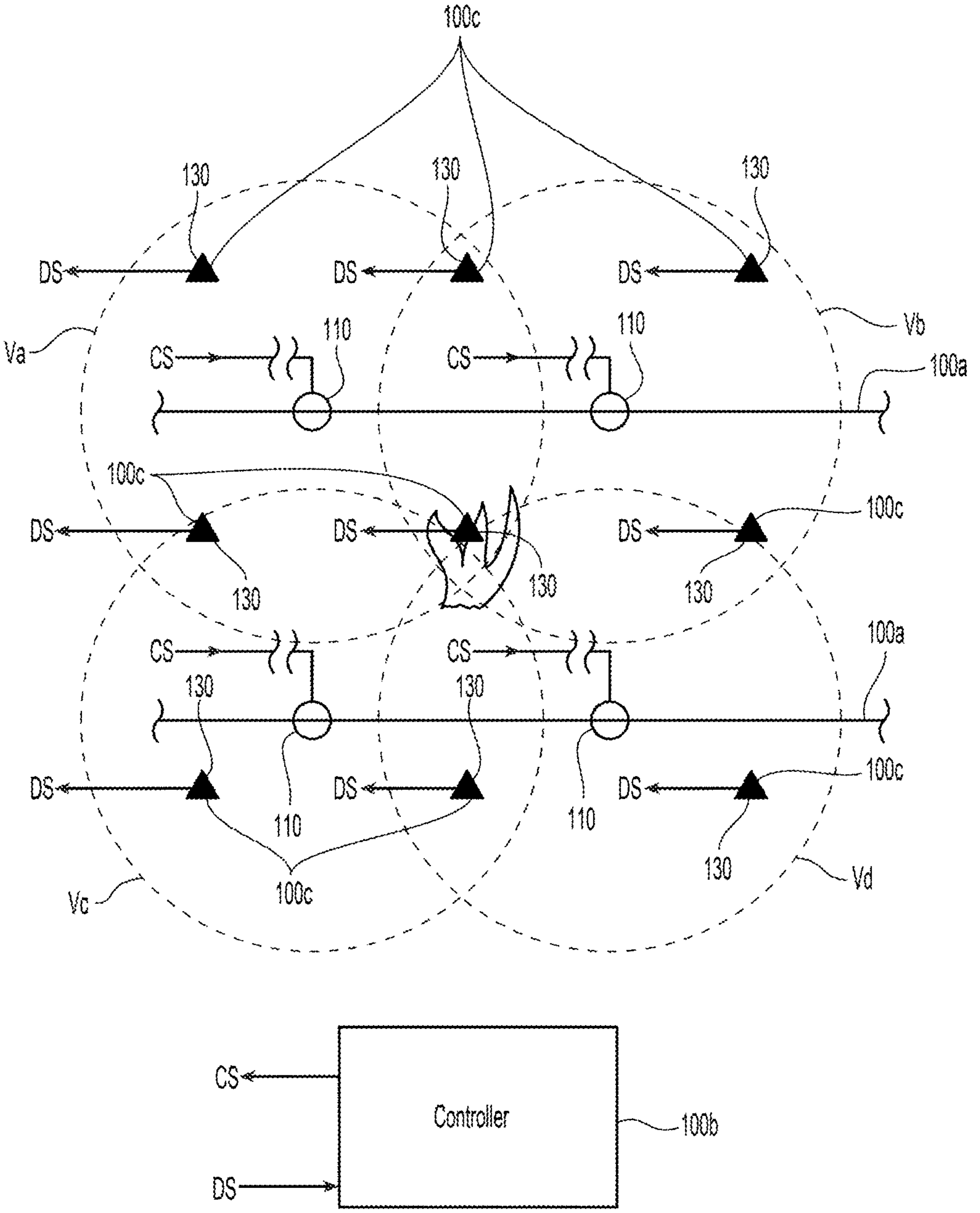
FIG. 2 is a schematic illustration of operation of the preferred system of FIG. 1.

Shown in FIGS. 1 and 2 is a preferred embodiment of a fire protection system 100 for the protection of the storage occupancy 10 and one or more stored commodities 12. The preferred systems and methods described herein utilize two principles for fire protection of the storage occupancy: (i) detection and location of a fire; and (ii) responding to the fire at a threshold moment with a controlled discharge and distribution of a preferably fixed minimized volumetric flow of firefighting fluid, such as water, over the fire to effectively address and more preferably quench the fire. Moreover, the preferred systems and methods include fluid distribution devices coupled to a preferred means to address and more preferably quench a fire.

The preferred system shown and described herein includes means for quenching a fire having a fluid distribution sub-system **100*a*, a control sub-system 100*b* and a detection sub-system 100*c*. With reference to FIG. 2, the fluid distribution and control sub-systems 100*a*, 100*b* work together, preferably by communication of one or more control signals CS, for controlled operation of selectively identified fluid distribution devices 110 defining a preferred discharge array to deliver and distribute the preferred fixed volumetric flow V of firefighting fluid preferably substantially above and about the site of a detected fire F in order to effectively address and more preferably quench the fire. The fixed volumetric flow V can be defined by a collection of distributed discharges Va, Vb, Vc, and Vd. The detection sub-system 100*c* with the control sub-system 100*b* determines, directly or indirectly, (i) the location and magnitude of a fire F in the storage occupancy 10; and (ii) selectively identifies the fluid distribution devices 110 for controlled operation in a preferred manner as described herein. The detection and control sub-systems 100*b*, 100*c* work together, preferably by communication of one or more detection signals DS, to detect and locate the fire F. As shown in FIG. 1, the fluid distribution devices are located for distribution of the firefighting fluid from a preferred position beneath the ceiling of the storage occupancy and above the commodity to provide for "ceiling-only" fire protection of the commodity. The detection sub-system 100*c* preferably includes a plurality of detectors 130 disposed beneath the ceiling and above the commodity in support of the preferably ceiling-only fire protection system. The control sub-system 100*b* preferably includes one or more controllers 120 and more preferably a centralized controller 120 coupled to the detectors 130 and fluid distribution devices 110 for the controlled operation of the selectively identified group of devices 110**.

Figure 2A:
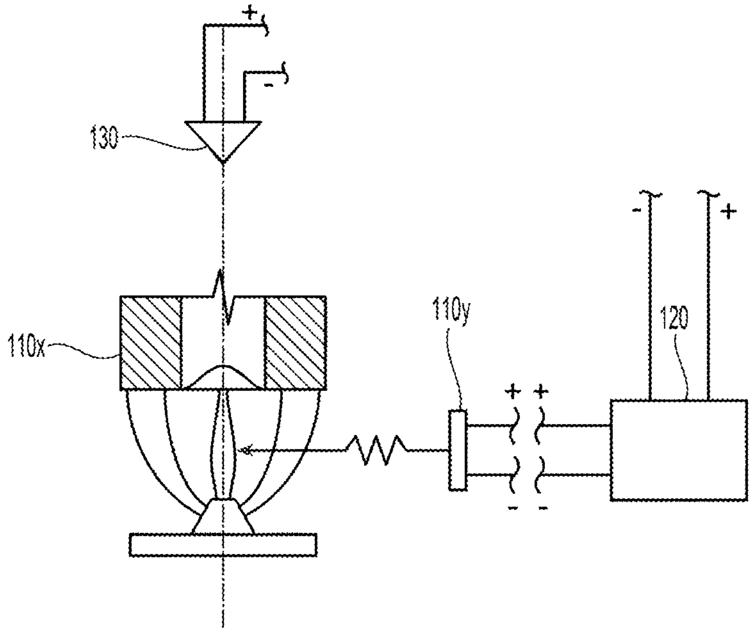
FIGS. 2A-2B are schematic illustrations of preferred fluid distribution devices arrangements for use in the preferred system of FIG. 1.
Figure 2B:
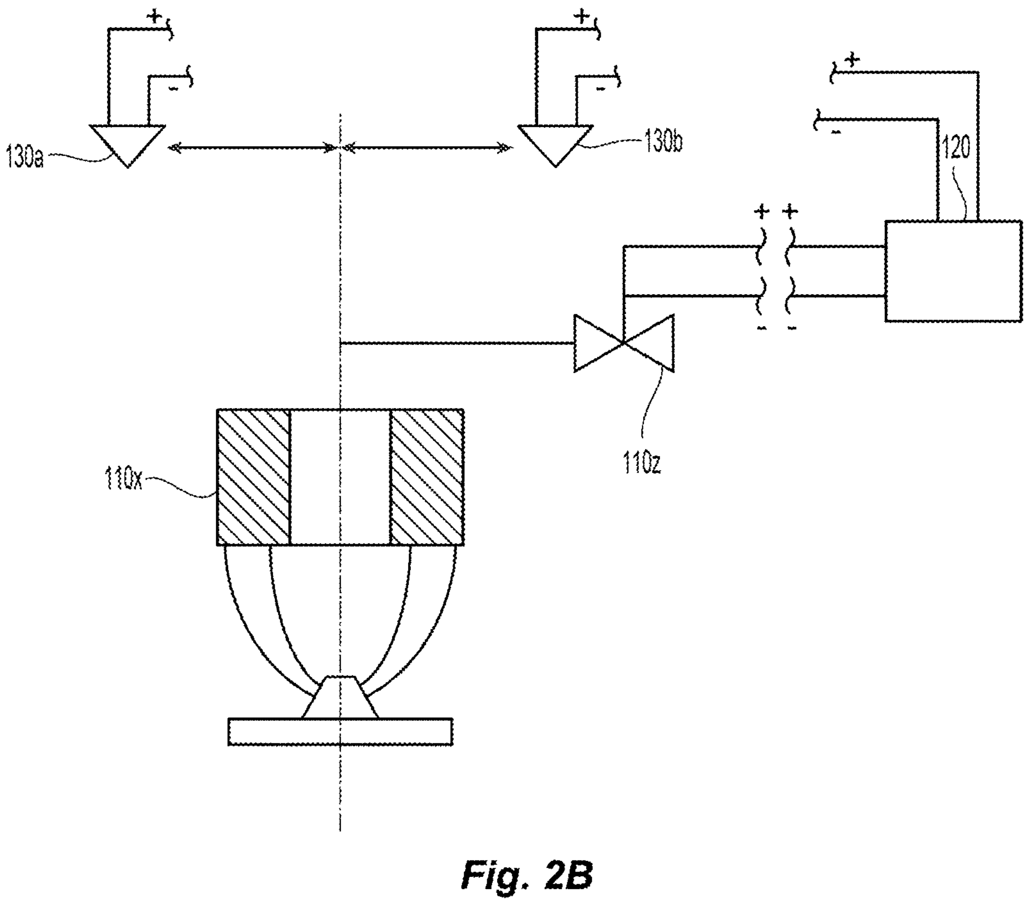

The detectors 130 of the detector sub-system **100*c* monitor the occupancy to detect changes for any one of temperature, thermal energy, spectral energy, smoke or any other parameter to indicate the presence of a fire in the occupancy. The detectors 130 can be any one or combination of thermocouples, thermistors, infrared detectors, smoke detectors and equivalents thereof. Known detectors for use in the system include TrueAlarm® Analog Sensing analog sensors from SIMPLEX, TYCO FIRE PROTECTION PRODUCTS. In the preferred embodiments of the ceiling-only system 100, as seen for example in FIG. 1, the one or more detectors 130 for monitoring of the storage occupancy 10 are preferably disposed proximate the fluid distribution device 110 and more preferably disposed below and proximate to the ceiling C. The detectors 130 can be mounted axially aligned with the sprinkler 110, as schematically shown in FIG. 2A or may alternatively be above and off-set from the distribution device 110, as schematically shown in FIGS. 2 and 2B. Moreover, the detectors 130 can be located at the same or any differential elevation from the fluid distribution device 110 provided the detectors 130 are located above the commodity to support the ceiling-only protection. The detectors 130 are coupled to the controller 120 to communicate detection data or signals to the controller 120 of the system 100 for processing as described herein. The ability of the detectors 130 to monitor environmental changes indicative of a fire can depend upon the type of detector being used, the sensitivity of the detector, coverage area of the detector, and/or the distance between the detector and the fire origin. Accordingly, the detectors 130 individually and collectively are appropriately mounted, spaced and/or oriented to monitor the occupancy 10** for the conditions of a fire in a manner described.

Figure 3:
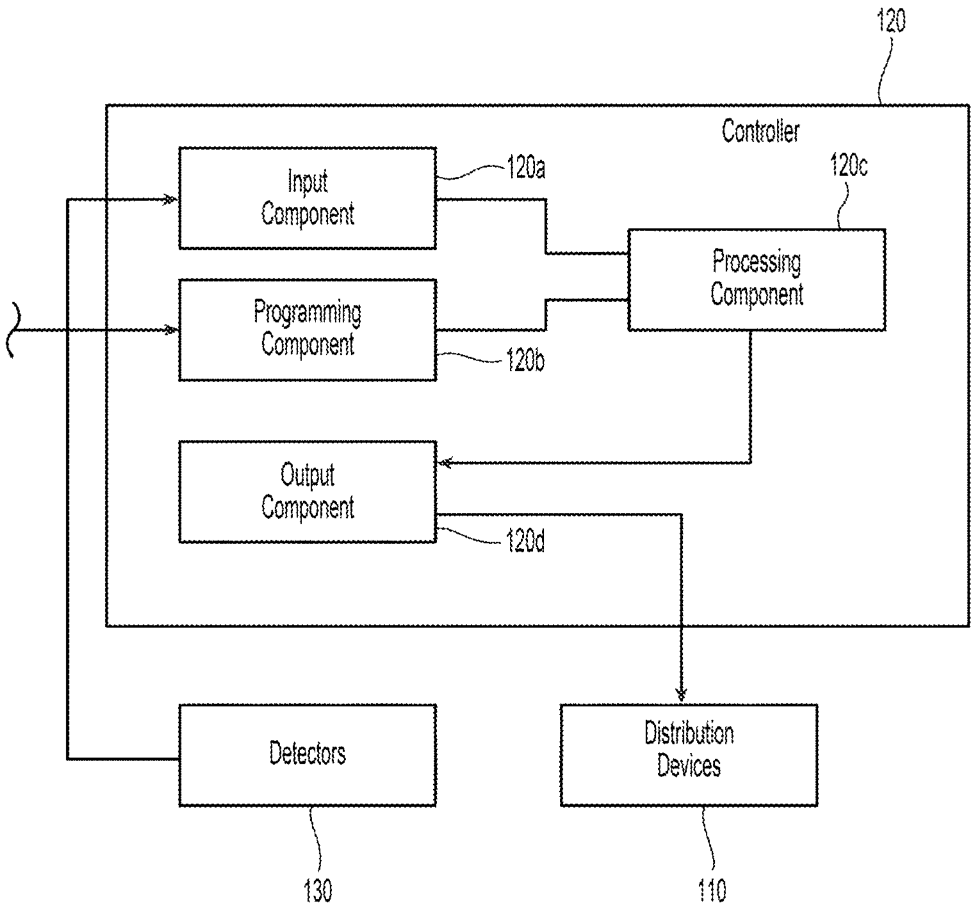
FIG. 3 is a schematic illustration of a controller arrangement for use in the system of FIG. 1.

The preferred centralized controller 120 is shown schematically in FIG. 3 for receiving, processing and generating the various input and output signals from and/or to each of the detectors 130 and fluid distribution devices 110. Functionally, the preferred controller 120 includes a data input component 120*a*, a programming component 120*b*, a processing component 120*c* and an output component 120*d*. The data input component 120*a* receives detection data or signals from the detectors 130 including, for example, either raw detector data or calibrated data, such as for example, any one of continuous or intermittent temperature data, spectral energy data, smoke data or the raw electrical signals representing such parameters, e.g., voltage, current or digital signal, that would indicate a measured environmental parameter of the occupancy. Additional data parameters collected from the detectors 130 can include time data, address or location data of the detector. The preferred programming component 120*b* provides for input of user-defined parameters, criteria or rules that can define detection of a fire, the location of the fire, the profile of the fire, the magnitude of the fire and/or a threshold moment in the fire growth. Moreover, the programming component 120*b* can provide for input of select or user-defined parameters, criteria or rules to identify fluid distribution devices or assemblies 110 for operation in response to the detected fire, including one or more of the following: defining relations between distribution devices 110, e.g., proximity, adjacency, etc., define limits on the number of devices to be operated, i.e., maximum and minimums, the time of operation, the sequence of operation, pattern or geometry of devices for operation, their rate of discharge; and/or defining associations or relations to detectors 130. As provided in the preferred control methodologies described herein, detectors 130 can be associated with a fluid distribution devices 110 on a one-to-one basis or alternatively can be associated with more than one fluid distribution device. Additionally, the input and/or programming components 120*a*, 120*b* can provide for feedback or addressing between the fluid distribution devices 110 and the controller 120 for carrying out the methodologies of the distribution devices in a manner described herein.

Accordingly, the preferred processing component 120*c* processes the input and parameters from the input and programming components 120*a*, 120*b* to detect and locate a fire, and select, prioritize and/or identify the fluid distribution devices for controlled operation in a preferred manner. For example, the preferred processing component 120*c* generally determines when a threshold moment is achieved; and with the output component 120*d* of the controller 120 generates appropriate signals to control operation of the identified and preferably addressable distribution devices 110 preferably in accordance with one or more methodologies described herein. A known exemplary controller for use in the system 100 is the Simplex® 4100 Fire Control Panel from TYCO FIRE PROTECTION PRODUCTS. The programming may be hard wired or logically programmed and the signals between system components can be one or more of analog, digital, or fiber optic data. Moreover communication between components of the system 100 can be any one or more of wired or wireless communication.

Figure 4:
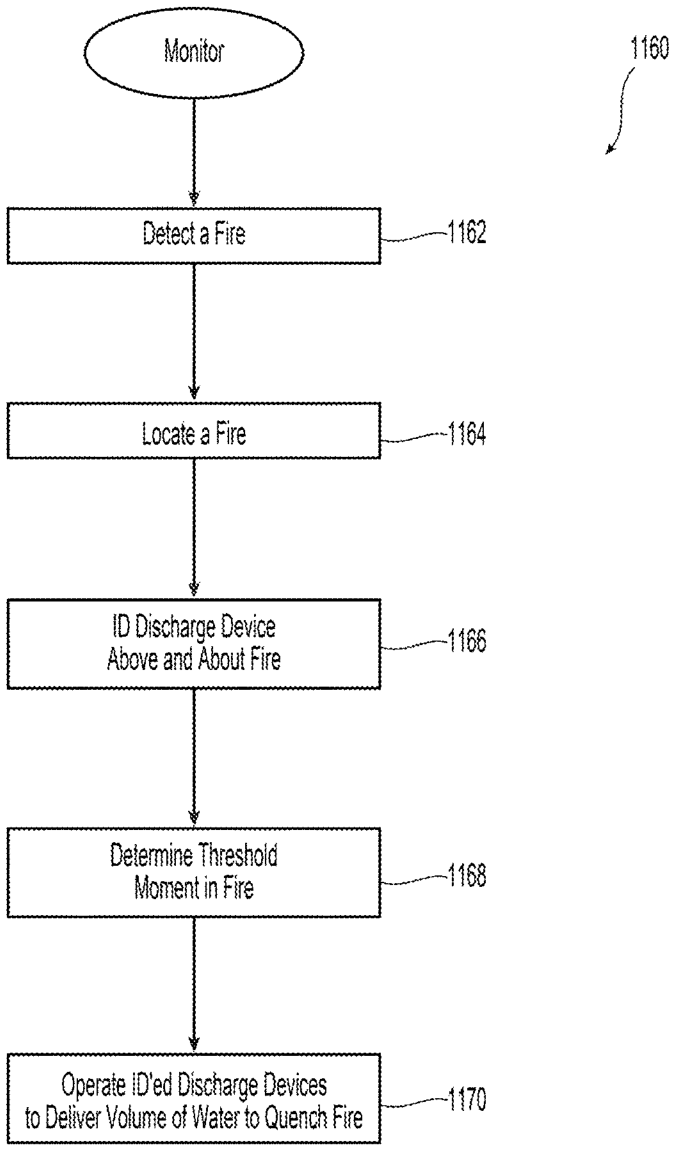
FIG. 4 is a preferred embodiment of controller operation of the system of FIG. 1

Shown in FIG. 4 is a preferred generalized embodiment of operation 1160 of the controller 120 in the system 100. In an operative state of the system, the processing component 120*c* processes the input data to detect 1162 and locate 1164 a fire F. In accordance with the preferred methodologies herein, the processing component 120*c*, based upon the detection and/or other input data or signals from the detection sub-system 100*e*, identifies 1166 the fluid distribution devices 110 which define a preferred array above and about the located fire F for controlled discharge. The processing component 120*c* preferably determines a threshold moment 1168 in the fire for operation and discharge from the selected array of fluid distribution devices. In step 1170, the processing component 120*c* with the output component 120*d* appropriately signals to operate 1170 the identified fluid distribution devices for addressing and more preferably quenching the fire.

The discharge array is preferably initially defined by a select and prioritized number of fluid distribution devices 110 and a geometry that is preferably centered above the detected fire. As described herein, the number of discharge devices 110 in the discharge array can be pre-programmed or user-defined and is more preferably limited up to a pre-programmed or user-defined maximum number of devices forming the array. Moreover, the select or user-defined number of discharge devices can be based upon on one or more factors of the system 100 and/or the commodity being protected, such as for example, the type of distribution device 110 of the system 100, their installation configuration including spacing and hydraulic requirements, the type and/or sensitivity of the detectors 130, the type or category of hazard of the commodity being protected, storage arrangement, storage height and/or the maximum height of the ceiling of the storage occupancy. For example, for more hazardous commodities such as Group A exposed expanded plastics stored beneath a rectilinear grid of distribution devices, a preferred number of fluid distribution devices forming the discharge array can preferably be eight (a 3×3 square perimeter of eight devices) or more preferably can be nine (a 3×3 grid array of devices). In another example, for Group A cartoned unexpanded plastics, a preferred number of discharge devices can be four (a 2×2 grid array of devices) as schematically shown in FIG. 2. Alternatively, for less hazardous commodities, the number of discharge devices of the array can be one, two or three substantially centered above and about the fire F. Again, the particularized number of devices in the discharge array can be defined or dependent upon the various factors of the system and the commodity being protected. The resulting discharge array preferably delivers and distributes the fixed volumetric flow V of firefighting fluid preferably substantially above and about the site of a detected fire F in order to effectively address and more preferably quench the fire.

The identification of the fluid distribution devices 110 for the discharge array and/or the shape of the array can be determined dynamically or alternatively may be of a fixed determination. As used herein, the "dynamic determination" means that the selection and identification of the particular distribution devices 110 to form the discharge array is determined preferably over a period of time as a function of the detector readings from the moment of a defined first detection of a fire up to a defined threshold moment in the fire. In contrast, in a "fixed" determination, the number of distribution devices of the discharge array and its geometry is predetermined; and the center or location of the array is preferably determined after a particular level of detection or other threshold moment. The following preferred controller operations for identification and operation of the discharge array are illustrative of the dynamic and fixed determinations.

Figure 4A:
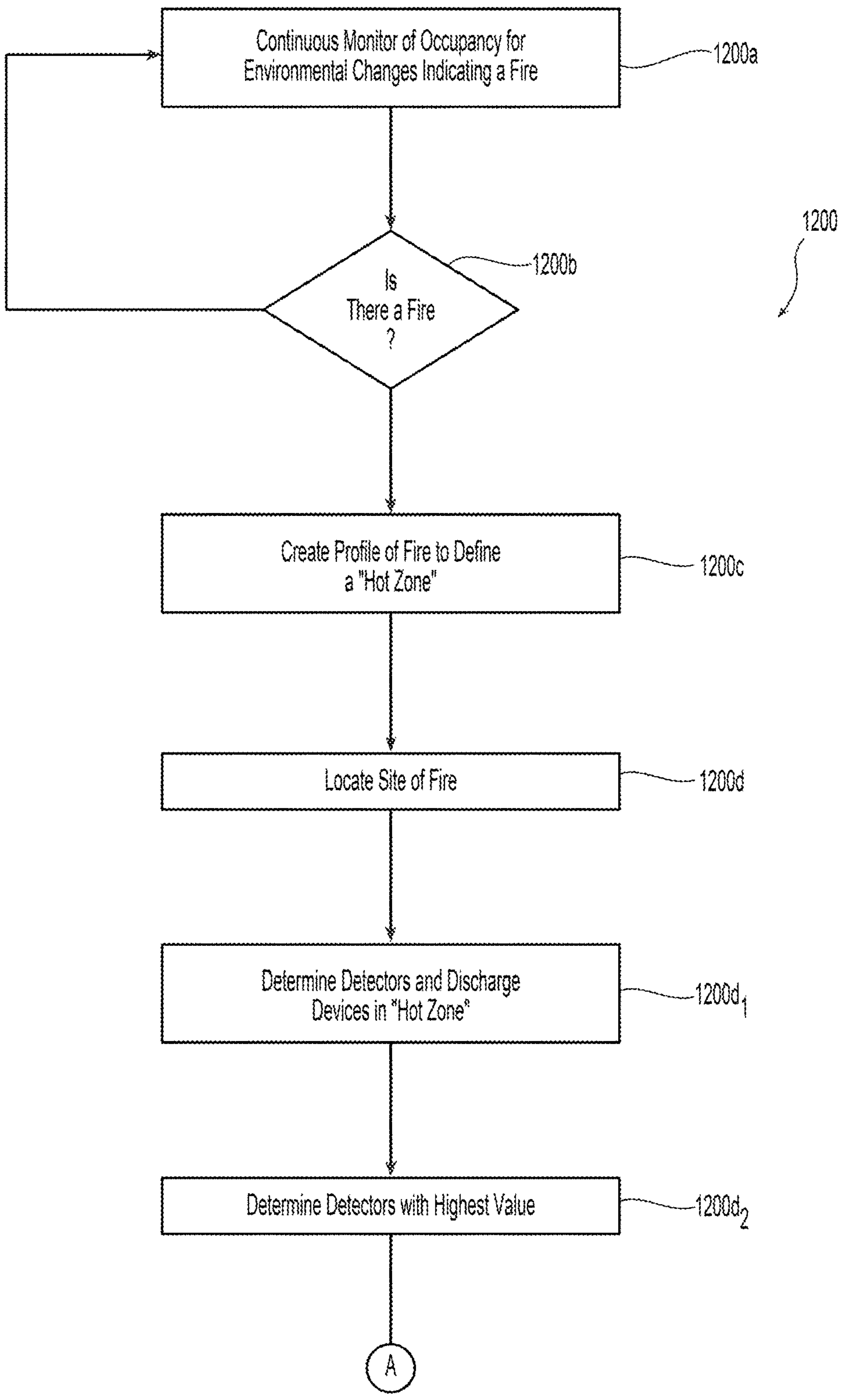
FIGS. 4A and 4B is another preferred embodiment of controller operation of the system of FIG. 1.
Figure 4B:
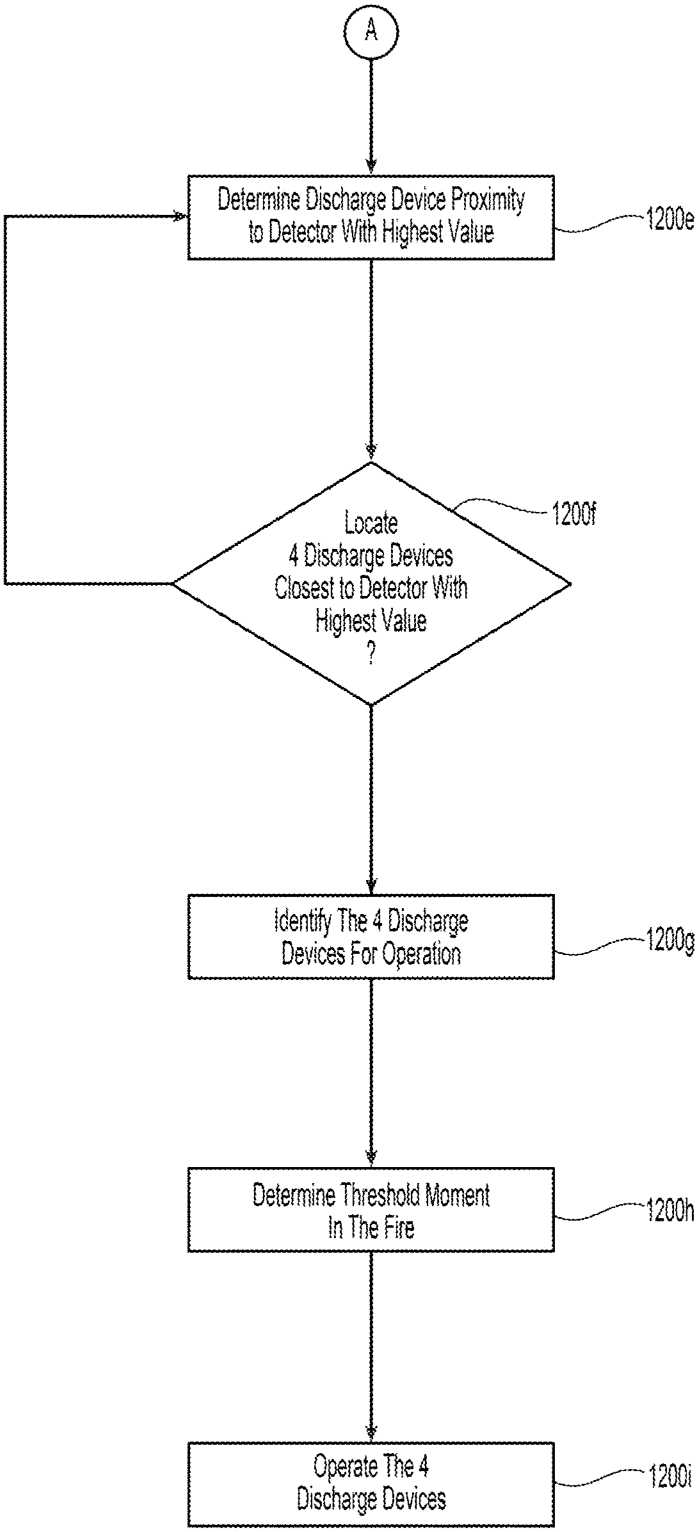

Shown in FIG. 4A and FIG. 4B, is a flowchart of another exemplary preferred operational embodiment 1200 of the controller 120 of the system 100. In a first step 1200*a*, the controller 120 continuously monitors the environment of the occupancy based upon sensed or detected input from the detectors 130. The controller 120 processes the data to determine the presence of a fire F in step 1200*b*. The indication of a fire can be based on sudden change in the sensed data from the detectors 130, such as for example, a sudden increase in temperature, spectral energy or other measured parameters. If the controller 120 determines the presence of a fire, the controller 120 develops a profile of the fire in step 1200*c* and more preferably defines a "hot zone" or area of fire growth based on incoming detection data. With the preferred profile or "hot zone" established, the controller 120 then locates the origin or situs of the fire in step 1200*d*. In one particular embodiment, the preferred controller 120 determines in step 1200*d*1 all the detectors 130 and distribution devices 110 within the fire profile or "hot zone." The controller 120 in a next step 1200*d*2 determines the detector 130 or distribution device 110 closest to the fire. In one preferred aspect, this determination can be based upon identification of the detector 130 measuring the highest measured value within the hot zone. The controller 120 can preferably determine in step 1200*e* the proximity of fluid distribution devices 110 relative to the detector 130 with the highest value.

The controller 120 further preferably identifies the fluid distribution devices 110 above, about and more preferably closest to the fire to define the preferred discharge array. For example, the controller 120 preferably dynamically and iteratively identifies in step 1200*f* the closest four discharge devices 110 about the detection device with the highest measured value or other selection criteria. Alternatively, the controller 120 can select and identify distribution devices 110 any other preferably user-defined number of devices such as, for example, eight or nine distribution devices based on the selection criteria. The closest four distribution devices 110 about and above the fire are then identified for operation in step 1200*g*. In step 1200*h*, the controller 120 preferably determines a threshold moment at which to operate the four distribution devices 110 above and about the fire. The controller 120 can be preferably programmed with a user-defined threshold value, moment or criteria in terms of temperature, heat release rate, rate of rise in temperature or other detected parameter. The threshold moment can be determined from any one or combination of system parameters, for example, the number of detectors having data readings above a user-defined threshold value, the number of fluid distribution devices in the "hot zone" reaching a user-define amount, the temperature profile reaching a threshold level, the temperature profile reaching a user-specified slope over time, the spectral energy reaching a user-defined threshold level; and/or the smoke detectors reaching a user-defined particulate level. Once the threshold moment is reached, the controller 120 signals the four distribution devices 110 for operation in step 1200L More preferably, the controller 120 operates the select four distribution devices 110 of the discharge array substantially simultaneously to address and more preferably quench the fire.

Figure 5A:
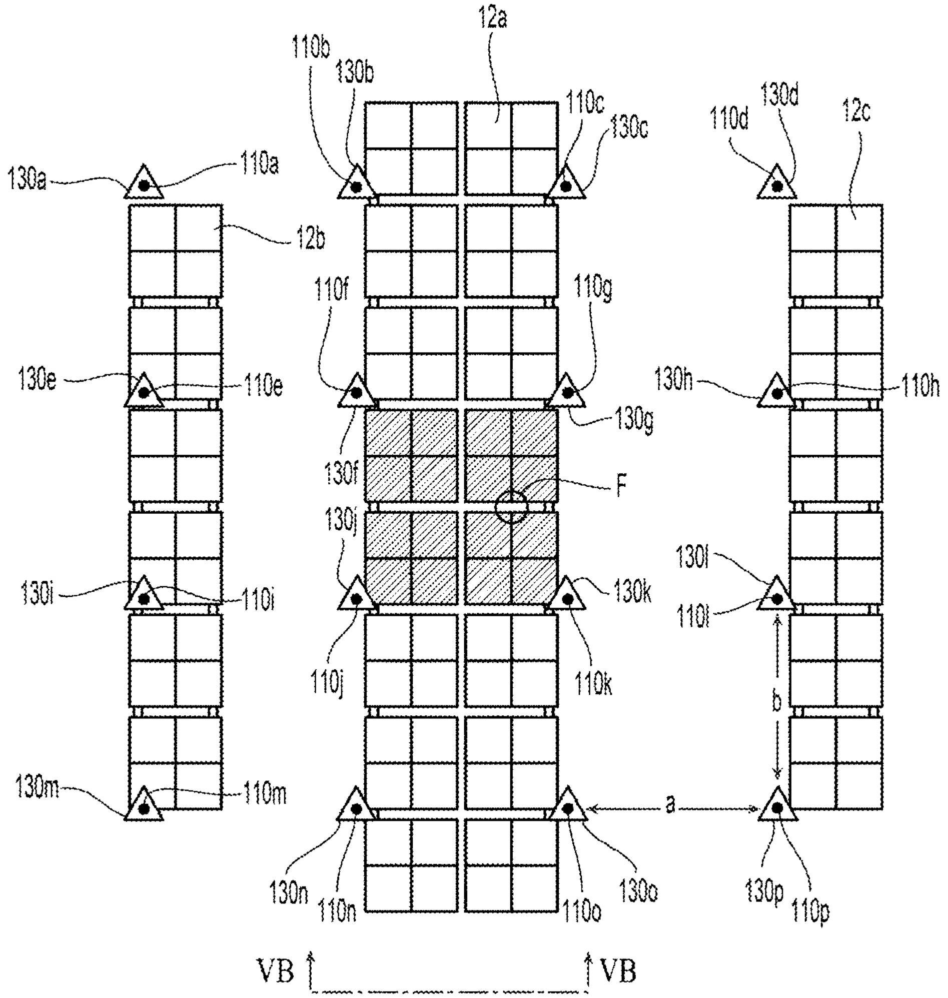
FIGS. 5A and 5B are schematic illustrations of a preferred installation of the system of FIG. 1.

Shown in FIG. 5A is a plan view of the preferred ceiling-only system 100 disposed above a stored commodity in a rack arrangement. Shown in particular is an exemplary grid of the fluid distribution devices 110*a*-110*p* and detectors 130*a*-130*p*. In an example of the methodology 1200, the detectors 130 detect a fire and the processor 120 determine the location of the fire F. Where, for example, the detector 130*g* is identified as detector with the highest reading, the fluid distribution devices 110*f*, 110*g*, 110*j*, 110*k* are identified by the controller 120 as being above and about the fire F in the "hot zone". The controller 120 operates the fluid distribution devices 110*f*, 110*g*, 110*j*, 110*k* to address the fire upon the detectors within the "hot zone" meeting or exceeding the user-defined threshold.

Figure 4C:
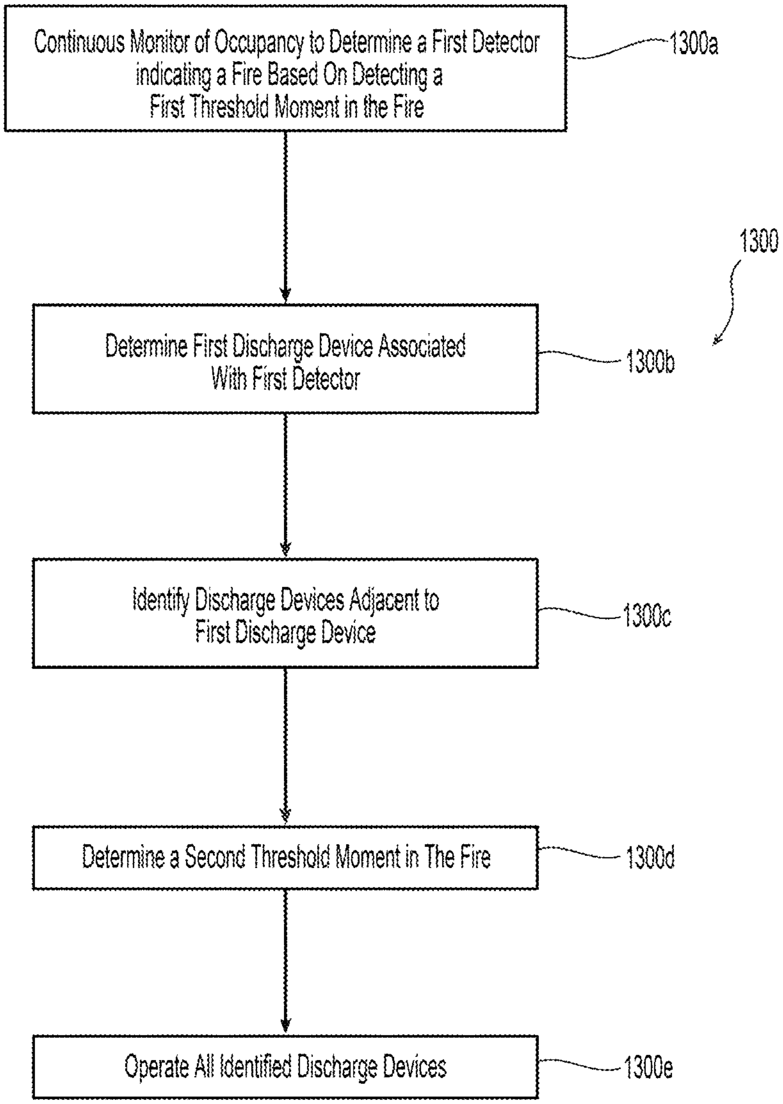
FIG. 4C is another preferred embodiment of controller operation of the system of FIG. 1.

Shown in FIG. 4C, is a flowchart showing another exemplary preferred operational embodiment 1300 of the controller of the system 100. In a first step 1300*a*, the controller 120 monitors the environment of the occupancy for the indication of a fire and preferably its location based upon sensed or detected input from the detectors 130 reading a value meeting or exceeding a first threshold moment in the fire. For example, one or more detectors 130 can return a reading meeting or exceeding a threshold rate of rise in temperature, a threshold temperature or other measured parameter. The controller 120 processes the data to preferably determine a first distribution device 110 closest to or associated with one or more detectors 130 from step 1300*b* and more preferably closest to the determined location of the fire. The controller 120 in step 1300*c* identifies a preferred discharge array to address the detected fire by identifying the distribution devices preferably immediately adjacent and more preferably surrounding the first distribution device 110 previously identified. Identification of adjacent distribution devices is preferably, based upon controller 120 programming providing an address or location of each device which can be related to identified adjacency or relative positioning between devices. Moreover, the number of devices in the preferred array can be a user-defined or preprogrammed number. The controller 120 then determines in step 1300*d* a second threshold moment in the fire preferably using the same parameters or criteria used in the determination of the first detection of step 1300*a* or by a preferably higher threshold. The second threshold can be defined by readings returned from one or more detectors 130. With the second threshold moment detected, the controller 120 then operates all identified devices 110 of the preferred array to address the detected fire in a preferred step 1300*e*.

With reference again to FIG. 5A for example, if detector 130*k* and associated distribution device 110*k* are first identified under the methodology at a first threshold, the immediately adjacent and surrounding eight distribution devices, 110*f*, 110*g*, 110*h*, 110*j*, 110*l*, 110*n*, 110*o* and 110*p* can be automatically identified for selection of a preferred discharge array. Following a determination of a second threshold moment in the fire, detected for example by the first detector 130*k* at a second preferably higher threshold value than the first, the preferred array can be operated by the controller for discharge to address and preferably quench the detected fire. Alternatively, the second threshold moment can be detected by a second detector 130*g*, for example, reading at the same or higher threshold than the first detector 130*k*. For such a preferred embodiment, the identification of adjacent and surrounding devices is preferably independent of temperature detection or other measured thermal parameter and instead based upon the preset location or preprogrammed addresses of the devices to determine adjacency or relative positioning.

Alternatively or additionally, where user defined parameters specify a smaller number of distribution devices 110 in the preferred discharge array, such as for example, four distribution devices, the identification of a second detector 130 can be used to determine how the preferred discharge array is to be located or centered. Again with reference to FIG. 5A, if detector 130*k* and associated distribution device 110*k* are first identified under a first threshold, the immediately adjacent and surrounding eight distribution devices, 110*f*, 110*g*, 110*h*, 110*j*, 110*l*, 110*n*, 110*o* and 110*p* can be identified for possible selection of a preferred discharge array. If at a second user-defined or pre-programmed threshold, detector 130*f* is identified, the controller can fixedly identify the four fluid distribution devices 110*f*, 110*g*, 110*j* and 110*k* as the preferred four-device discharge array for controlled operation. Accordingly, in one aspect, this methodology can provide for a preferred user-defined preset, fixed or preprogrammed actuation of a group or zone of distribution devices 110 upon thermal detection identifying a first distribution device.

Figure 4D:
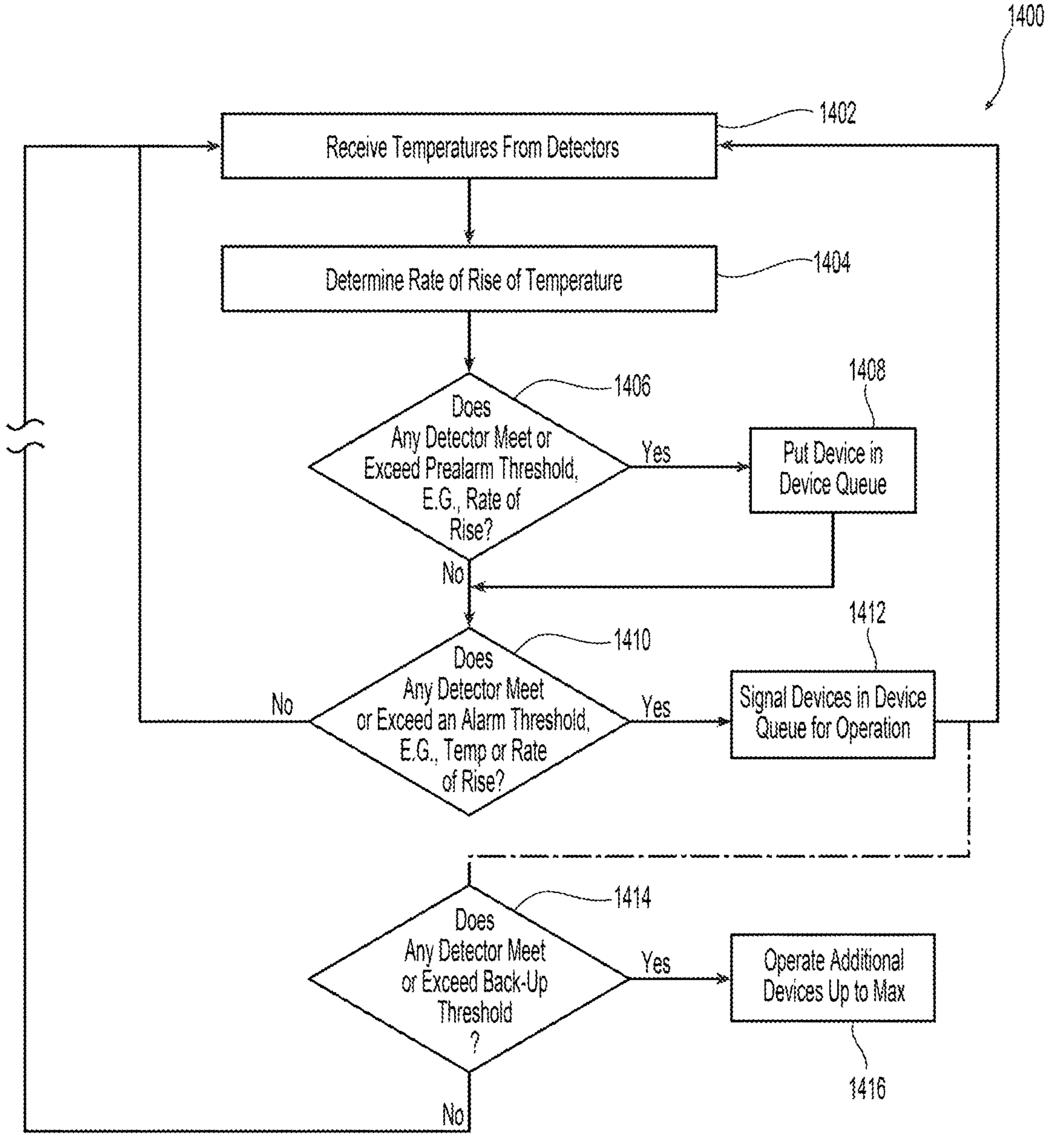
FIG. 4D is another preferred embodiment of controller operation of the system of FIG. 1.

Shown in FIG. 4D are alternate embodiments of another methodology for use in the system 100. This embodiment of the methodology dynamically identifies and operates an array of fluid distribution devices 110 above and about and more preferably centered about and surrounding the point of fire origin based on the monitoring and detection of a fire at each detector 130. Each detector 130 is preferably associated with a single discharge device 110. The methodology employs two different detector sensitivity thresholds in which one is a more sensitive or lower threshold than the other. The lower threshold defines a preferred pre-alarm threshold to identify a preferred number of distribution devices above and about the detected fire for a controlled operation. The lesser sensitive or higher threshold identifies the moment of actuation of the identified group of fluid distribution devices.

In the embodiment of the system and methods, the controller 120 is programmed to define a preferred pre-alarm threshold and a preferred higher alarm threshold. The thresholds can be one or more combination of rate of rise, temperature or any other detected parameter of the detectors 130. The controller 120 is further preferably programmed with a minimum number of distribution devices to be identified in the preferred discharge array. A device queue is preferably defined as being composed of those distribution devices associated with a detector that has met or exceeded the pre-alarm threshold. The programmed minimum number of devices 110 defines the minimum number of devices required to be in the queue before the array is actuated or operated by the controller 120 at the programmed alarm threshold. The controller 120 is further preferably programmed with a maximum number of distribution devices 110 in the device queue to limit the number of devices to be operated by the controller 120.

In an exemplary embodiment of the programmed controller 120 for the protection of double-row rack exposed expanded plastics up to forty feet (40 ft.) beneath a forty-five foot (45 ft.) ceiling, the pre-alarm threshold can be set to 20° F. per minute rate of rise with an alarm threshold at 135° F. and the minimum and maximum number of devices being four and six (4/6) respectively. In the exemplary embodiment of the methodology 1400 shown in FIG. 4D, at step 1402 the controller 120 receives temperature information from the detectors 130. In step 1404, the controller 120 looks at the historic temperature information from each of these detectors 130 and the current temperature detected by each of the detectors 130 to determine a rate of rise of the temperature at each of these detectors. In step 1406, it is determined whether or not the rate of rise of any detector 130 is greater than the pre-alarm threshold rate of rise. If it is determined that a detector meets or exceeds the pre-alarm threshold, then the distribution device 110 associated with the detector 130 is placed in the device queue at step 1408. At step 1410, the detectors 130 continue to monitor the occupancy to detect a rate of rise equal to or exceeding the alarm threshold. If the alarm threshold is met or exceeded and the number of distribution devices 110 in the device queue is equal to or exceeds the minimum number of devices up to the maximum number of distribution devices in the device queue, the devices in the queue are signaled for operation at step 1412. Again, the controller 120 can limit or control the total number of device operations up to the maximum identified in the program of the controller 120.

With reference to FIG. 5A and an exemplary fire event F, the detectors 130 monitor the storage occupancy. Where for example, eight detectors 130 detect the temperature and/or rate of rise exceeding the programmed pre-alarm threshold, the queue of devices is built sequentially up to a maximum of six distribution devices 110 with each device being associated with one of the eight detectors 130. The distribution devices 110 in the queue can include, for example, 110*b*, 110*c*, 110*f*, 110*g*, 110*j*, 110*k*. Once the alarm threshold is equal or exceeded, the six devices 110 defining the device queue can be operated and more preferably simultaneously operated to address the fire F.

The controller 120 can be additionally or optionally programmed with a backup threshold, which is a detected or derived parameter which can be the same as or different from the pre-alarm and alarm threshold to define a condition or moment at which additional devices for controlled operation after the device queue has been actuated. An exemplary backup threshold for the previously described protection system can be 175° F. Additionally, the controller can be programmed with a preferred maximum number of additional distribution devices 110, such as for example three (3) devices to be operated following operation of the initial device queue for a total of nine devices. Optionally shown in FIG. 4D of the method of operation 1400 and after the operation of the queue of distribution devices 110, additional devices up to the maximum number of additional can be identified and operated in respective steps 1414, 1416 for controlled operation if the detectors 130 detect directly or indirectly a value that equals or exceeds the backup threshold. Accordingly, where the program is programmed with the maximum distribution devices of six(6) to define the device queue and three (3) maximum additional devices a total of eight device may be operated by the controller 120 when the detectors 130 continue to detect fire parameters equal or exceeding the backup threshold. For example, devices, 110*a*, 110*e*, 110*i* are actuated if their associated detectors 130 meet or exceed the backup threshold.

Figure 4E:
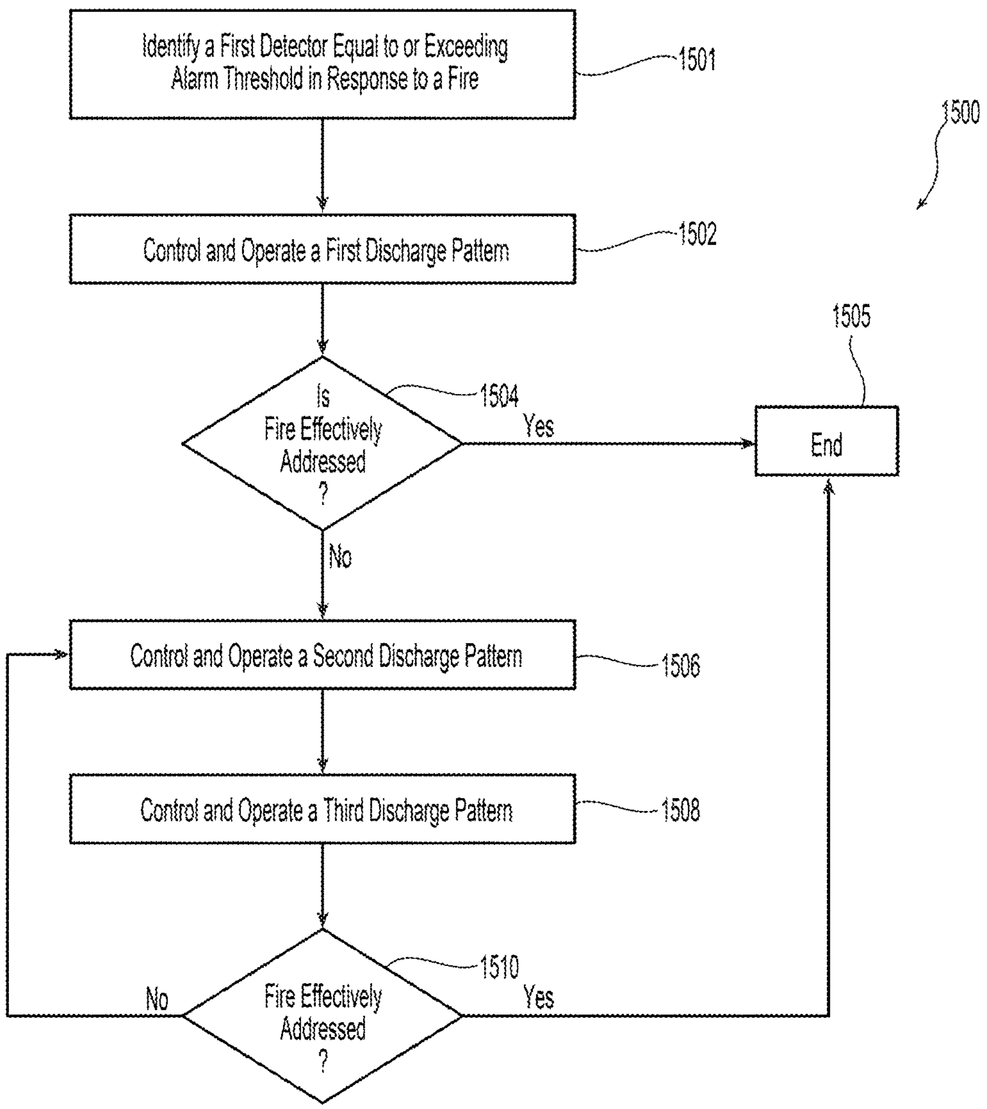
FIG. 4E is another preferred embodiment of controller operation of the system of FIG. 1.

Shown in FIG. 4E is another embodiment of a methodology 1500 of operation of the controller 120 in the system 100. This embodiment of the methodology continuously monitors the condition of the fire and as needed, address the fire with a desired fixed group of fluid distribution devices that preferably addresses the fire and minimizes the volume of discharge. Operation of the fluid distribution devices of the methodology 1500 can be controlled by the controller 120 and more preferably, the fluid distribution devices are preferably configured for fluid control in which the controller 120 can cease and reinitiate discharge and more preferably control flow from the fluid distribution devices 110.

In preferred first step 1501, a first detector 130 is preferably identified by the controller 120 in response to detection reading equal to or exceeding a programmed alarm threshold condition, such as for example, a threshold temperature, rate of rise or other detected parameter. In step 1502, one or more fluid distribution devices 110 is operated preferably based upon a programmed association or programmed proximity to the identified first detector 130. A detector 130 can be associated with a fluid distribution device on a one-to-one basis or alternatively can be associated with more than one fluid distribution device, such as for example, a group of four distribution devices 110 surrounding and centered about a single detector 130. With reference to FIGS. 4E and 5A, in one preferred embodiment of the methodology and step 1502, the controlled fluid distribution devices preferably includes the combination of a single primary distribution device 110*g* associated with the identified first detector 130*g* and eight secondary distribution devices 110*b*, 110*c*, 110*d*, 110*f*, 110*h*, 110*j*, 110*k*, 110*l* centered about the primary distribution device 110*g*. The primary and secondary devices 110 are activated to define a first discharge pattern for a period or duration of operation, such as for example, two minutes in step 1502.

Following the first discharge pattern period, a determination is made at step 1504 whether or not the fire has been suppressed, controlled or otherwise effectively addressed. The detectors 130 and controller 120 of the system continue to monitor the occupancy to make the determination. If it is determined that the fire has been effectively addressed and more preferably quenched, then all of the fluid distribution devices 110 can be deactivated and the method 1500 is terminated. However, if it is determined that the fire has not been effectively addressed, then the fluid distribution devices 110 are again activated in the same first discharge pattern or more preferably a different second discharge pattern at step 1506 to continue to target the fire with firefighting fluid. The fluid distribution devices 110 defining the second pattern are maintained open by the controller 120 for a programmed period or duration of, for example, thirty seconds (30 sec.). The total amount of water that is used to address the fire is preferably minimized. Accordingly, in one preferred embodiment, the second discharge pattern is preferably defined by four secondary 110*c*, 110*f*, 110*h*, 110*k* centered about the primary distribution device 110*g*. Additionally or alternatively, the second discharge pattern can vary from the first discharge pattern by altering the flow of firefighting fluid from one or more distribution devices 110 or the period of discharge to provide for the preferred minimized fluid flow.

In a preferred step 1508, the controller again preferably alters the secondary distribution devices 110 about the primary distribution device to define a third discharge pattern. For example, secondary distribution devices 110*b*, 110*d*, 110*j*, 110*l* are operated to define the third discharge pattern. The third pattern is discharge for a thirty seconds (30 sec.) or other programmed period or duration of discharge. The preferred sequential activation of second and third discharge patterns facilitate formation and maintenance of a perimeter of fluid distribution devices 110 preferably above and about the fire, while minimizing water usage and thus, minimizing potential water damage on the other. Following steps 1506 and 1508, it is again determined if the fire is effectively addressed in step 1510. If the fire is effectively addressed and more preferably quenched, then all of the discharge devices are deactivated in step 1505. However, if it is determined that the fire is not effectively addressed the controller repeats steps 1506 through 1508 to continue to discharge firefighting fluid in the sequential second and third patterns previously described.

For the preferred ceiling-only fire protection systems, the ability to effectively address and more particularly quench a fire can depend upon the storage occupancy and the configuration of the stored commodity being protected. Parameters of the occupancy and storage commodity impacting the system installation and performance can include, ceiling height HI of the storage occupancy 10, height of the commodity 12, classification of the commodity 12 and the storage arrangement and height of the commodity 12 to be protected. Accordingly, the preferred means for quenching in a ceiling-only system can detect and locate a fire for operation of the preferred number and pattern of fluid distribution devices defining a preferred discharge array to address and more preferably quench a fire at a maximum ceiling and storage height of a commodity of a maximum hazard commodity classification including up to exposed expanded Group A plastics.

Referring to FIG. 1, the ceiling C of the occupancy 10 can be of any configuration including any one of: a flat ceiling, horizontal ceiling, sloped ceiling or combinations thereof. The ceiling height HI is preferably defined by the distance between the floor of the storage occupancy 10 and the underside of the ceiling C above (or roof deck) within the storage area to be protected, and more preferably defines the maximum height between the floor and the underside of the ceiling C above (or roof deck). The commodity array 12 can be characterized by one or more of the parameters provided and defined in Section 3.9.1 of NFPA-13. The array 12 can be stored to a storage height H2, in which the storage height H2 preferably defines the maximum height of the storage and a nominal ceiling-to-storage clearance CL between the ceiling and the top of the highest stored commodity. The ceiling height HI can be twenty feet or greater, and can be thirty feet or greater, for example, up to a nominal forty-five feet (45 ft.) or higher such as for example up to a nominal fifty feet (50 ft.), fifty-five (55 ft.), sixty feet (60 ft.) or even greater and in particular up to sixty-five feet (65 ft.) Accordingly, the storage height H2 can be twelve feet or greater and can be nominally twenty feet or greater, such as for example, a nominal twenty-five feet (25 ft.) up to a nominal sixty feet or greater, preferably ranging nominally from between twenty feet and sixty feet. For example, the storage height can be up to a maximum nominal storage height H2 of forty-five feet (45 ft.), fifty feet (50 ft.), fifty-five (55 ft.), or sixty feet (60 ft.). Additionally or alternatively, the storage height H2 can be maximized beneath the ceiling C to preferably define a minimum nominal ceiling-to-storage clearance CL of any one of one foot, two feet, three feet, four feet, or five feet or anywhere in between.

The stored commodity array 12 preferably defines a high-piled storage (in excess of twelve feet (12 ft.)) rack arrangement, such as for example, a single-row rack arrangement, preferably a multi-row rack storage arrangement; and even more preferably a double-row rack storage arrangement. Other high-piled storage configurations can be protected by the system 100, including non-rack storage arrangements including for example: palletized, solid-piled (stacked commodities), bin box (storage in five sided boxes with little to no space between boxes), shelf (storage on structures up to and including thirty inches deep and separated by aisles of at least thirty inches wide) or back-to-back shelf storage (two shelves separated by a vertical barrier with no longitudinal flue space and maximum storage height of fifteen feet). The storage area can also include additional storage of the same or different commodity spaced at an aisle width W in the same or different configuration. More preferably, the array 12 can includes a main array 12*a*, and one or more target arrays 12*b*, 12*c* each defining an aisle width W1, W2 to the main array, as seen in FIGS. 5A and 5B.

The stored commodity 12 can include any one of NFPA-13 defined Class I, II, III or IV commodities, alternatively Group A, Group B, or Group C plastics, elastomers, and rubbers, or further in the alternative any type of commodity capable of having its combustion behavior characterized. With regard to the protection of Group A plastics, the preferred embodiments of the systems and methods can be configured for the protection of expanded and exposed plastics. According to NFPA 13, Sec. 3.9.1.13, "Expanded (Foamed or Cellular) Plastics" is defined as "Whose plastics, the density of which is reduced by the presence of numerous small cavities (cells), interconnecting or not, disposed throughout the mass." Section 3.9.1.14 of NFPA 13 defines "Exposed Group A Plastic Commodities" as "[t]hose plastics not in packaging or coverings that absorb water or otherwise appreciably retard the burning hazard."

By responding and more particularly quenching a fire in storage commodity in a manner as described herein, the preferred systems 100 provide for a level of fire protection performance that significantly limits and more preferably reduces the impact of the fire on the storage commodity. This is believed to provide less damage to the stored commodity as compared to previously known fire protection performances, such as for example, suppression or fire control. Moreover, in the protection of exposed expanded plastic commodities the preferred systems and methods provide for ceiling only-protection at heights and arrangements not available under the current installation standards. Additionally or alternatively, the preferred systems and methods provide for ceiling only-protection of a exposed expanded plastic commodities without accommodations such as for example, a vertical or horizontal barriers. As described herein, actual fire testing can be conducted to demonstrate the preferred quenching performance of the preferred systems and methods described herein.

Figure 5B:
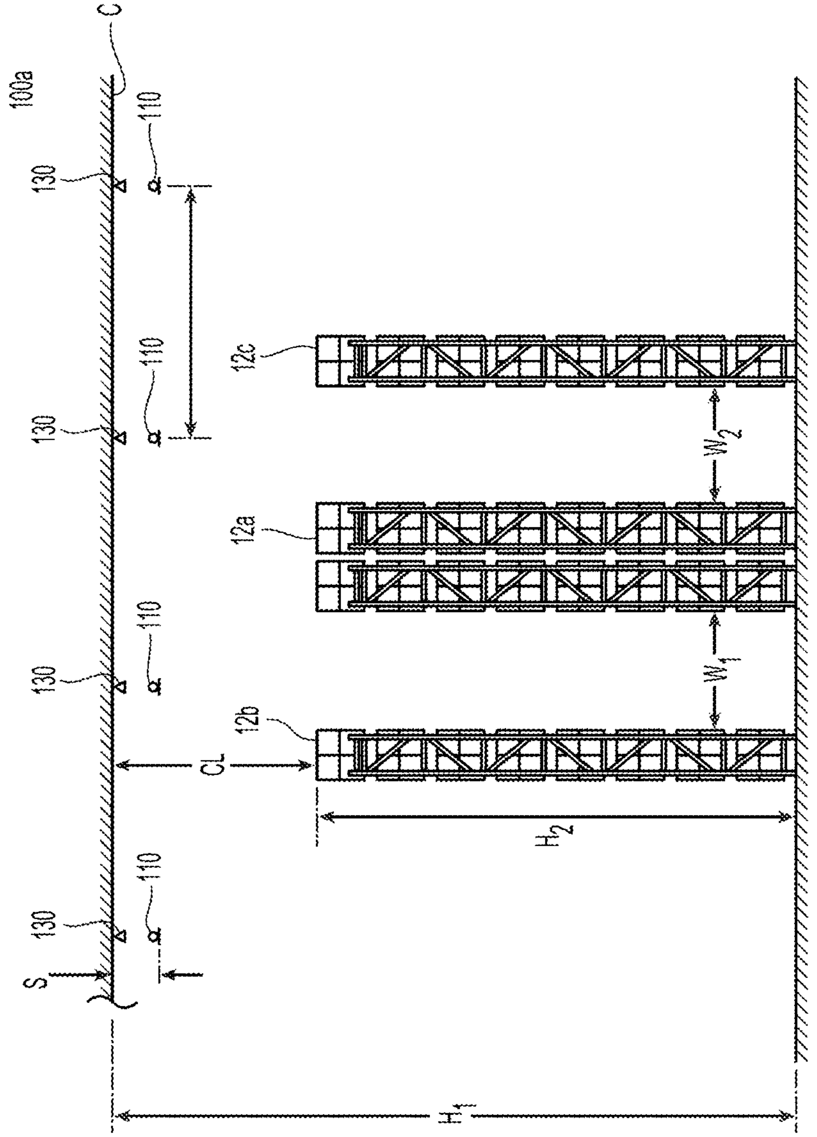

In the preferred ceiling-only arrangement of the preferred system 100, the fluid distribution devices 110 are installed between the ceiling C and a plane defined by the storage commodity as schematically shown in FIGS. 1, 5A and 5B. The fluid distribution subsystem 100*a* includes a network of pipes 150 having a portion suspended beneath the ceiling of the occupancy and above the commodity to be protected. In the preferred embodiments of the system 100, the plurality of fluid distribution devices 110 are mounted or connected to the network of pipes 150 to provide for the ceiling-only protection. The network of pipes 150 preferably includes one or more main pipes 150*a* from which one or more branch lines 150*b*, 150*c*, 150*d* extend. The distribution devices 110 are preferably mounted to and spaced along the spaced-apart branch pipes 150*b*, 150*c*, 150*d* to form a desired device-to-device spacing a×b. Preferably disposed above and more preferably axially aligned with each distribution device 110 is a detector 130. The distribution devices 110, branch lines and main pipe(s) can be arranged so as to define either one of a gridded network or a tree network. The network of pipes can further include pipe fittings such as connectors, elbows and risers, etc. to interconnect the fluid distribution portion of the system 100 and the fluid distribution devices 110.

The network of pipes 150 connect the fluid distribution devices 110 to a supply of firefighting liquid such as, for example, a water main 150*e* or water tank. The fluid distribution sub-system can further include additional devices (not shown) such as, for example, fire pumps, or backflow preventers to deliver the water to the distribution devices 110 at a desired flow rate and/or pressure. The fluid distribution sub-system further preferably includes a riser pipe 150*f* which preferably extends from the fluid supply 150*e* to the pipe mains 150*a*. The riser 150*f* can include additional components or assemblies to direct, detect, measure, or control fluid flow through the water distribution sub-system 110*a*. For example, the system can include a check valve to prevent fluid flow from the sprinklers back toward the fluid source. The system can also include a flow meter for measuring the flow through the riser 150*f* and the system 100. Moreover, the fluid distribution sub-system and the riser 150*f* can include a fluid control valve, such as for example, a differential fluid-type fluid control valve. The fluid distribution subsystem 100*a* of system 100 is preferably configured as a wet pipe system (fluid discharges immediately upon device operation) or a variation thereof including, i.e., non-interlocked, single or double-interlock preaction systems (the system piping is initially filled with gas and then filled with the firefighting fluid in response to signaling from the detection subsystem such that fluid discharges from the distribution devices at its working pressure upon device operation).

A preferred embodiment of the fluid distribution device 110 includes a fluid deflecting member coupled to a frame body as schematically shown in FIGS. 2A and 2B. The frame body includes an inlet for connection to the piping network and an outlet with an internal passageway extending between the inlet and the outlet. The deflecting member is preferably axially spaced from the outlet in a fixed spaced relation. Water or other firefighting fluid delivered to the inlet is discharged from the outlet to impact the deflecting member. The deflecting member distributes the firefighting fluid to deliver a volumetric flow which contributes to the preferred collective volumetric flow to address and more preferably quench a fire. Alternatively, the deflecting member can translate with respect to the outlet provided it distribute the firefighting fluid in a desired manner upon operation. In the ceiling-only systems described herein, the fluid distribution device 110 can be installed such that its deflecting member is preferably located from the ceiling at a desired deflector-to-ceiling distance S as schematically shown in FIG. 5B. Alternatively, the device 110 can be installed at any distance from the ceiling C provided the installation locates the device above the commodity being protected in a ceiling-only configuration.

Accordingly, the fluid distribution device 110 can be structurally embodied with a frame body and deflector member of a "fire protection sprinkler" as understood in the art and appropriately configured or modified for controlled actuation as described herein. This configuration can include the frame and deflector of known fire protection sprinklers with modifications described herein. The sprinkler frame and deflectors components for use in the preferred systems and methods can include the components of known sprinklers that have been tested and found by industry accepted organizations to be acceptable for a specified sprinkler performance, such as for example, standard spray, suppression, or extended coverage and equivalents thereof. For example, a preferred fluid distribution device 110 for installation in the system 100 includes the frame body and deflector member shown and described in technical data sheet "TFP312: Model ESFR-25 Early Suppression, Fast Response Pendent Sprinklers 25.2 K-factor" (November 2012) from TYCO FIRE PRODUCTS, LP having a nominal 25.2 K-factor and configured for electrically controlled operation.

As used herein, the K-factor is defined as a constant representing the sprinkler discharge coefficient, that is quantified by the flow of fluid in gallons per minute (GPM) from the sprinkler outlet divided by the square root of the pressure of the flow of fluid fed into the inlet of the sprinkler passageway in pounds per square inch (PSI). The K-factor is expressed as $GPM/(PSI)^{1/2}$. NFPA 13 provides for a rated or nominal K-factor or rated discharge coefficient of a sprinkler as a mean value over a K-factor range. For example, for a K-factor 14 or greater, NFPA 13 provides the following nominal K-factors (with the K-factor range shown in parenthesis): (i) 14.0 (13.5-14.5) $GPM/(PSI)^{1/2}$; (ii) 16.8 (16.0-17.6) $GPM/(PSI)^{1/2}$; (iii) 19.6 (18.6-20.6) $GPM/(PSI)^{1/2}$; (iv) 22.4 (21.3-23.5) $GPM/(PSI)^{1/2}$; (v) 25.2 (23.9-26.5) $GPM/(PSI)^{1/2}$; and (vi) 28.0 (26.6-29.4) $GPM/(PSI)^{1/2}$; or a nominal K-factor of 33.6 $GPM/(PSI)^{1/2}$ which ranges from about (31.8-34.8 $GPM/(PSI)^{1/2}$). Alternate embodiments of the fluid distribution device 110 can include sprinklers having the aforementioned nominal K-factors or greater.

U.S. Pat. No. 8,176,988 shows another exemplary fire protection sprinkler structure for use in the systems described herein. Specifically shown and described in U.S. Pat. No. 8,176,988 is an early suppression fast response sprinkler (ESFR) frame body and embodiments of deflecting member or deflector for use in the preferred systems and methods described herein. The sprinklers shown in U.S. Pat. No. 8,176,988 and technical data sheet TFP312 are a pendent-type sprinklers; however upright-type sprinklers can be configured or modified for use in the systems described herein. Alternate embodiments of the fluid distributing devices 110 for use in the system 100 can include nozzles, misting devices or any other devices configured for controlled operation to distribute a volumetric flow of firefighting fluid in a manner described herein.

The preferred distribution devices 110 of the system 100 can include a sealing assembly, as seen for example, in the sprinkler of U.S. Pat. No. 8,176,988 or other internal valve structure disposed and supported within the outlet to control the discharge from the distribution device 110. However, the operation of the fluid distribution device 110 or sprinkler for discharge is not directly or primarily triggered or operated by a thermal or heat-activated response to a fire in the storage occupancy. Instead, the operation of the fluid distribution devices 110 is controlled by the preferred controller 120 of the system in a manner as described herein. More specifically, the fluid distribution devices 110 are coupled directly or indirectly with the controller 120 to control fluid discharge and distribution from the device 110. Shown in FIGS. 2A and 2B are schematic representations of preferred electro-mechanical coupling arrangements between a distribution device assembly 110 and the controller 120 technical data sheet TFP312. Shown in FIG. 2A is a fluid distribution device assembly 110 that includes a sprinkler frame body 110*x* having an internal sealing assembly supported in place by a removable structure, such as for example, a thermally responsive glass bulb trigger. A transducer and preferably electrically operated actuator 110*y* is arranged, coupled, or assembled, internally or externally, with the sprinkler 110*x* for displacing the support structure by fracturing, rupturing, ejecting, and/or otherwise removing the support structure and its support of the sealing assembly to permit fluid discharge from the sprinkler. The actuator 110*y* is preferably electrically coupled to the controller 120 in which the controller provides, directly or indirectly, an electrical pulse or signal for signaled operation of the actuator to displace the support structure and the sealing assembly for controlled discharge of firefighting fluid from the sprinkler 110*x*.

Alternate or equivalent distribution device electro-mechanical arrangements for use in the system are shown in U.S. Pat. Nos. 3,811,511; 3,834,463 or 4,217,959. Shown and described in FIG. 2 of U.S. Pat. No. 3,811,511 is a sprinkler and electrically responsive explosive actuator arrangement in which a detonator is electrically operated to displace a slidable plunger to rupture a bulb supporting a valve closure in the sprinkler head. Shown and described in FIG. 1 of U.S. Pat. No. 3,834,463 is a sensitive sprinkler having an outlet orifice with a rupture disc valve upstream of the orifice. An electrically responsive explosive squib is provided with electrically conductive wires that can be coupled to the controller 120. Upon receipt of an appropriate signal, the squib explodes to generate an expanding gas to rupture disc to open the sprinkler. Shown and described in FIG. 2 of U.S. Pat. No. 4,217,959 is an electrically controlled fluid dispenser for a fire extinguishing system in which the dispenser includes a valve disc supported by a frangible safety device to close the outlet orifice of the dispenser. A striking mechanism having an electrical lead is supported against the frangible safety device. The patent describes that an electrical pulse can be sent through the lead to release the striking mechanism and fracture the safety device thereby removing support for the valve disc to permit extinguishment to flow from the dispenser.

Shown in FIG. 2B, is another preferred electro-mechanical arrangement for controlled actuation that includes an electrically operated solenoid valve 110*z* in line and upstream from an open sprinkler or other frame body 110*x* to control the discharge from the device frame. With no seal assembly in the frame outlet, water is permitted to flow from the open sprinkler frame body 110*x* upon the solenoid valve 110*z* receiving an appropriately configured electrical signal from the controller 120 to open the solenoid valve depending upon whether the solenoid valve is normally closed or normally open. The valve 110*z* is preferably located relative to the frame body 110*x* such that there is negligible delay in delivering fluid to the frame inlet at its working pressure upon opening the valve 110*z*. Exemplary known electrically operated solenoid valves for use in the system 100 can include the electric solenoid valve and equivalents thereof described in ASCO® technical data sheet "2/2 Series 8210: Pilot Operated General Service Solenoid Valves Brass or Stainless Steel Bodies ⅜ to 2½ NPT" available at <http:

htt://www.ascovalve.com/Common/PDFFiles/Product/8210R6.pdf>. In one particular solenoid valve arrangement in which there is a one-to-one ratio of valve to frame body, the system can effectively provide for controlled micro-deluge systems to address and more preferably quench a fire thereby further limiting and more preferably reducing damage to the occupancy and stored commodity as compared to known deluge arrangements.

A preferred system 100 as previously described was installed and subject to actual fire testing. A plurality of preferred fluid distribution devices 110 and detectors 130 were installed above rack storage of cartoned unexpanded Group A plastic stored to a nominal storage height of forty feet (40 ft.) under a forty-five foot (45 ft.) horizontal ceiling to define a nominal clearance of five feet (5 ft.). More specifically, sixteen open sprinkler frame bodies and deflector members of an ESFR type sprinkler, each having a nominal K-factor of 25.2 GPM/PSI.$^{1/2}$, were arranged with a solenoid valve in a fluid distribution assembly, as shown for example in FIG. 2B, to define an effective K-factor of 19.2 GPM/PSI.$^{1/2}$ Disposed above and about each fluid distribution assembly were a pair of detectors 130. The distribution devices 110 were installed on 10 ft.×10 ft. spacing and supplied with water so as to provide a flow from each sprinkler that is equivalent to a nominal K-factor of 25 GPM/PSI.$^{1/2}$ supplied with an operating pressure of water at 35 psi. The assemblies were installed beneath the ceiling so as to locate the deflector member of the sprinkler twenty inches (20 in.) beneath the ceiling.

The sprinkler assemblies were installed above Group A Plastic commodity that included single wall corrugated cardboard cartons measuring 21 in.×21 in. containing 125 crystalline polystyrene empty 16 ox. cups in separated compartments within the carton. Each pallet of commodity was supported by a two-way 42 in.×42 in.×5 in. slatted deck hardwood pallet. The commodity was stored in a rack arrangement having a central double-row rack with two single-row target arrays disposed about the central rack to define four foot (4 ft.) wide aisles widths W1, W2, as seen in FIG. 5B, between the central array and the target arrays. The central double-row rack array includes 40 ft. high by 36-inch wide rack members arranged with four 96 inch bays, eight tiers in each row, and nominal 6 inch longitudinal and transverse flue spaces throughout the test array.

The geometric center of the central rack was centered below four fluid distribution assemblies 110. Two half-standard cellulose cotton igniters were constructed from 3 in.×3 in. long cellulosic bundle soaked with four ounces (4 oz.) gasoline and wrapped in a polyethylene bag. The igniters were positioned at the floor and offset 21 inches from the center of the central double row rack main array. The igniters were ignited to provide a single fire F test of the system 100. The system 100 and a preferred methodology located the test fire and identified the fluid distribution devices 110 for addressing the fire in a manner as previously described. The system 100 continued to address the test fire for a period of thirty-two minutes; and at the conclusion of the test, the commodity was evaluated.

The test fire illustrates the ability of a preferred system configured for quenching to substantially reduce the impact of the fire on the stored commodity. A total of nine distribution devices were identified for operation and operated within two minutes of ignition. Included among the nine identified devices are the four distribution devices 110*q*, 110*r*, 110*s*, 110*t* immediately above and about the fire F. The four operated devices 110*q*, 110*r*, 110*s*, 110*t* defined a discharge array that effectively quenched the ignition by limiting propagation of the fire in the vertical direction toward the ceiling, in the fore and aft directions toward the ends of the central array 12*a*, and in the lateral direction toward the target arrays 12*b*, 12*c*. Thus, the fire was confined or surrounded by the four most immediate or closest fluid distribution devices 110*q*, 110*r*, 110*s*, 110*t* above and about the fire.

Figure 6A:
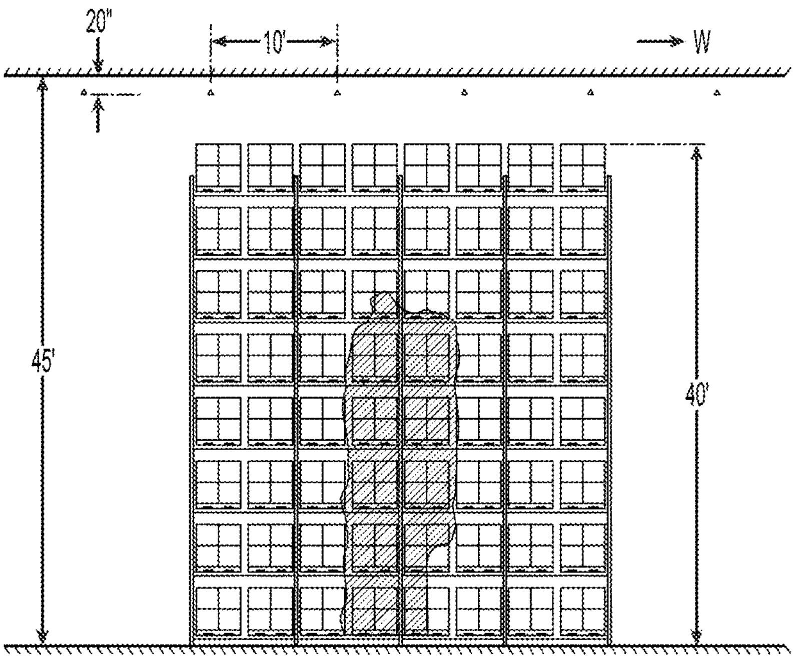
FIGS. 6A and 6B are graphic illustrations of damage to a stored commodity from a test fire addressed by another embodiment of the preferred system.
Figure 6B:
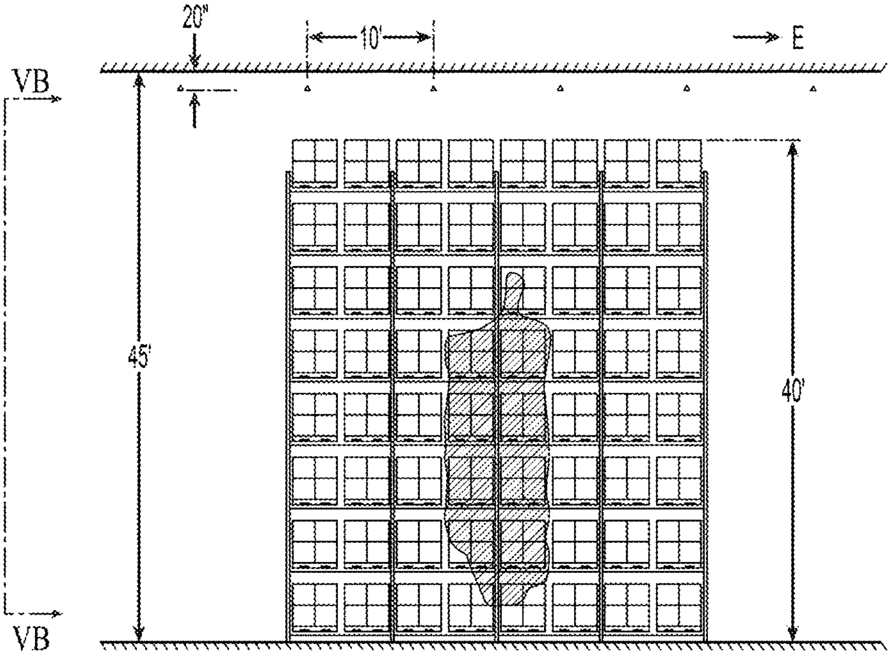

The damage to the main array is graphically shown in FIGS. 5B, 6A and 6B. Damage to the commodity was focused to the central core of the central array as defined by the centrally disposed pallets indicated in shading. In the direction toward the ends of the array, the fire damage was limited to the two central bays. It was observed that the damage to the cartons was minimized. Accordingly, in one preferred aspect, the quenching system confined the fire within a cross-sectional area defined by the preferred four fluid distribution devices most closely disposed above and about the fire. With reference to FIGS. 6A and 6B, the fire damage was also vertically limited or contained by the preferred quenching system. More specifically, the fire damage was limited vertically so as to extend from the bottom of the array to no higher than the sixth tier from the bottom of the stored commodity. Given that quenching performance confines the propagation of the fire, quenching performance can be further characterized by the ability of the preferred system to prevent the test fire from jumping across the aisles to the target arrays 12*b*, 12*c*.

Quenching performance can be observed by the satisfaction of one or more parameters or a combination thereof. For example, vertical damage can be limited to six or fewer tiers of commodity. Alternatively or additionally, vertical damage can be limited to 75% or less than the total number of tiers of the test commodity. Lateral damage can also be quantified to characterize quenching performance. For example, lateral damage subject to quenching performance can be limited to no more than two pallets and is more preferably no more than one pallet in the direction toward the ends of the array.

Additional fire testing has shown that the preferred systems and methods described herein can be used in the ceiling-only protection of exposed expanded plastic commodities at heights and arrangements not available under the current installation standards. For example in one preferred system installation, a plurality of preferred fluid distribution devices 110 and detectors 130 can be installed above rack storage of exposed expanded Group A plastic stored to a nominal storage height ranging from twenty-five (25 ft.) to forty feet (40 ft.) under a forty-five foot (45 ft.) horizontal ceiling to define a nominal clearance ranging from five feet (5 ft.) to twenty feet (20 ft.). Provided the ceiling is of a sufficient height, preferred embodiments of the systems and methodologies herein can protect up to a maximum fifty to fifty-five feet (50-55 ft.). In one preferred storage arrangement, wherein the ceiling height is forty-eight (48 ft.) and the nominal storage height is forty-three feet (43 ft.)

In one particular embodiment of the preferred system, a group of an ESFR type sprinkler frame bodies with internal sealing assembly and deflector member, each having a nominal K-factor of 25.2 GPM/PSI.$^{1/2}$, are preferably arranged with an electrically operated actuator in a fluid distribution assembly, as shown for example in FIG. 2A. Disposed above and about each fluid distribution assembly are a pair of detectors 130. The distribution devices 110 are preferably installed on 10 ft.×10 ft. spacing in a looped piping system and supplied with water at operating pressure of 60 psi. to provide a preferred discharge density of 1.95 gpm/ft$^2$. The fluid distribution devices are preferably installed beneath the ceiling so as to locate the deflector member at a preferred deflector-to-ceiling distance S of eighteen inches (18 in.) beneath the ceiling. Each detector and fluid distribution device is coupled to a preferably centralized controller for detection of a fire and operation of one or more fluid distribution devices in a manner as described herein. The system and its controller 120 is preferably programmed to identify nine distribution devices 110 to define an initial discharge array for addressing a detected fire.

As previously described, a preferred embodiment of the fluid distribution device 110 can be structurally embodied as a fire protection sprinkler, nozzle, misting devices or any other devices configured for electrically controlled operation to distribute a volumetric flow of firefighting fluid in a manner described herein. The following describes preferred and/or alternate embodiments of the fluid distributing device for use in the system 100. Unlike the prior art sprinklers or fluid dispensers previously described in which a sealing valve disc or closure is ruptured or its supporting bulb or frangible safety device is fractured to open the sprinkler, the preferred fluid distribution devices described below incorporate innovative preferred embodiments of electronically operated releasing mechanisms which are collapsed or contracted to remove its support of a sealing assembly within a sprinkler or nozzle frame to open the preferred fluid distribution device.

Figure 7:
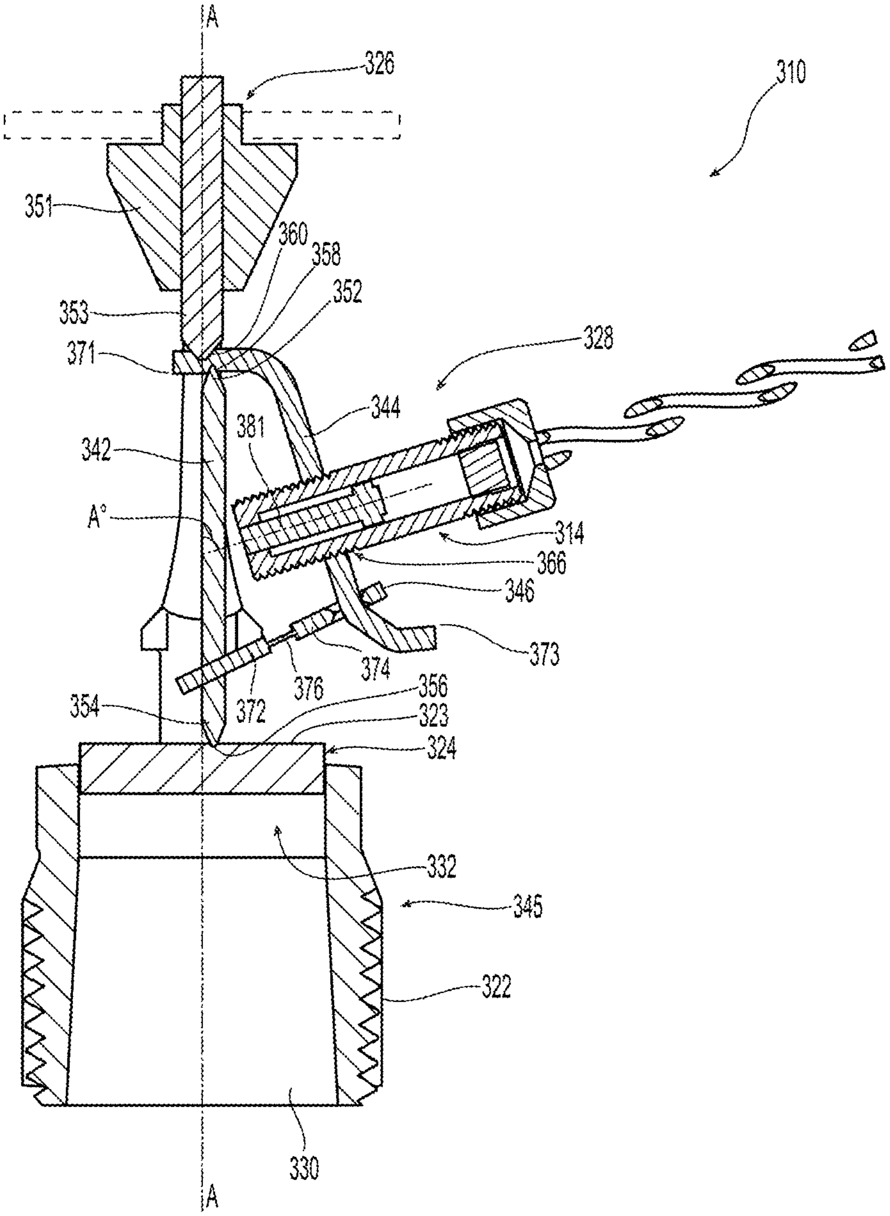
FIG. 7 is a schematic cross-sectional view of a preferred embodiment of a fluid distribution device in an unactuated state.

Shown in FIG. 7 is a schematic cross-sectional view of one embodiment of a fluid distribution device preferably embodied as a fire protection sprinkler 310 shown in an unactuated state. The sprinkler 310 includes a sprinkler frame 345 having a first end and a second end. The sprinkler 310 includes a frame body 322 having an inlet 330 at the first end of the frame and an outlet 332 located between the first end and the second end of the frame 345. The inlet 330 can be connected to the piping network as previously described. In an unactuated state of the sprinkler 310, the outlet 332 is occluded or sealed by a sealing assembly 324 to control discharge from the device 310. The sealing assembly 324 generally includes a sealing button, body or plug 323 disposed within the outlet 332 coupled to or engaged with a biasing member such as, for example, a Belleville spring or other resilient ring which acts to bias the button 323 out of the outlet 32. Supporting the sealing assembly 324 within the outlet 332 is a preferred electrically operated releasing mechanism 328. The preferred releasing mechanism 328 defines a first unactuated configuration or arrangement to maintain the sealing assembly 324 within the outlet 332. The releasing mechanism 328 also defines an actuated second configuration or state in which the releasing mechanism 328 operates to release its support of the sealing assembly 324 and permit ejection of the sealing assembly 324 from the outlet 332 and discharge of the firefighting fluid from the outlet 332.

Generally the preferred releasing mechanism 328 provides for a unique hook and strut assembly with a designed fracture region. A preferred link couples the hook and strut with a preferably electrically operated linear actuator that breaks the link to uncouple the hook and strut. In a preferred embodiment, the releasing mechanism 328 includes a strut member 342, a lever member preferably embodied as a hook member 344, a tension link 346, a screw or other threaded member 353, and an actuator 314. The preferred tension link 346 includes a designed fracture region to provide for a controlled break at which at which the releasing mechanism 328 operates. The screw 353 forms a threaded engagement with the frame 345 and applies a load axially aligned with the longitudinal axis A A. The hook and strut arrangement 342, 344 transfer the axial load of the screw 353 to the sealing assembly 324 to keep the assembly seated against the internally formed sealing seat. More specifically, in the unactuated configuration of the releasing mechanism 328, a first end 352 of the strut 342 is in contact with the hook member 344 at a notch 358 to define a fulcrum, and the second strut end 354 is engaged with a groove 356 formed on the button 323 of the sealing assembly 324 and preferably located along the longitudinal axis A-A. The axially acting screw 353 applies its load on the hook member 344 at a second notch 360 to a first side of the fulcrum to define a first moment arm relative to the fulcrum defined by the first end 352 of the strut member 342. Accordingly, the first end 352 of the strut 342 is preferably disposed slightly offset from the longitudinal axis A-A. Countering the moment generated by the load screw 353 is the link 346 which couples the hook member 344 to the strut member 342 to statically maintain the hook and strut arrangement for supporting the sealing assembly 324 against the bias of the sealing spring or fluid pressure delivered to the sprinkler. More specifically, the link 346 engages the hook member 344 at a location between the first end 371 and the second end 373 of the hook member 344 relative to the first end 352 of the strut 342 to define a second moment arm which is sufficient to maintain the hook member 344 in a static position with respect to the strut 342 in the unactuated state of the releasing mechanism 328.

As shown in FIG. 7, the hook member 344 preferably includes an opening or recess 366 having an internal thread for threaded engagement with an externally threaded portion of the actuator 314. Alternatively, the actuator 314 may be coupled with the hook member 344 via a different method using, e.g., bolts, strap, clip, etc. In an unactuated state, the piston 381 of the actuator 314 is in a retracted position and the actuator 314 is spaced from the strut 342, the distance preferably being less than 10 mm. While the actuator 314 is disposed such that the actuator 314 forms an angle $A^0$ relative to the longitudinal axis A-A, which is less than 90° in the embodiment shown in FIG. 7, the angle $A^0$ may be equal to or greater than 90° in other embodiments. The profile of the hook member 344 may be varied to accommodate the various angle $A^0$ to meet the design needs without departing from the spirit of the present disclosure.

Upon electronic actuation of the actuator 314, the piston 381 is caused to extend to an extended position and the actuator 314 applies a force on the strut 342. As the applied force exceeds the maximum tensile load of the tension link 346, the tension link 346 fails (or parts into two or more pieces) permitting the hook member 344 to pivot about the first end 352 of the strut member 342 in a pivoted engagement; and the releasing mechanism 328 collapses allowing the sealing assembly 324 to be released from the outlet 332. That is, the releasing mechanism 328 transitions from the first configuration (or unactuated state) to the second configuration (or actuated state). Subsequently, water contained in the frame body is allowed to be discharged to address a fire in a preferred manner as described herein. The actuator 314 can be one of various types of actuators such as, for example, a pyrotechnic actuator or a solenoid actuator. Preferably, the actuator 314 is a pyrotechnic actuator such as Metron Protractor™ made by Chemring Energetics UK Ltd, e.g., DR2005/C1 Metron Protractor™. The Metron™ actuator (or Metron™ protractor) is a pyrotechnic actuator that utilizes a small explosive charge to drive a piston. This device is designed to create mechanical work through fast movement when the piston is driven by the combustion of a small quantity of explosive material.

Figure 7A:
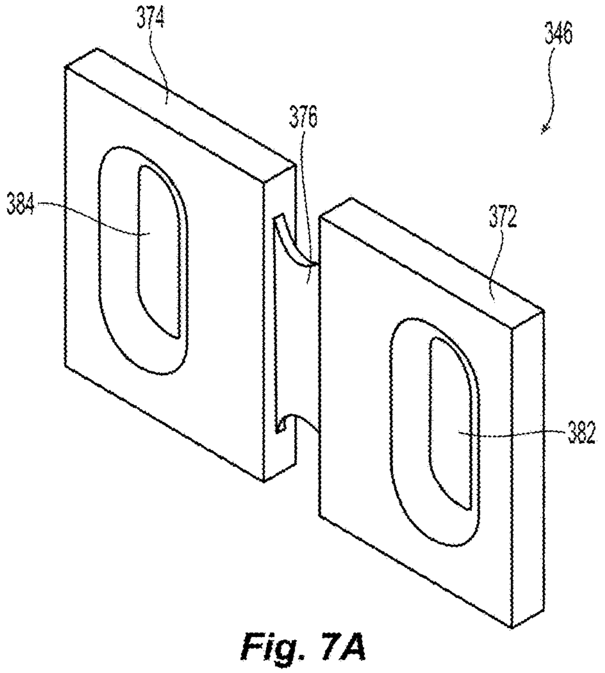
FIG. 7A is a perspective view of a preferred embodiment of a thermally insensitive link used in the device of FIG. 7.
Figure 7B:
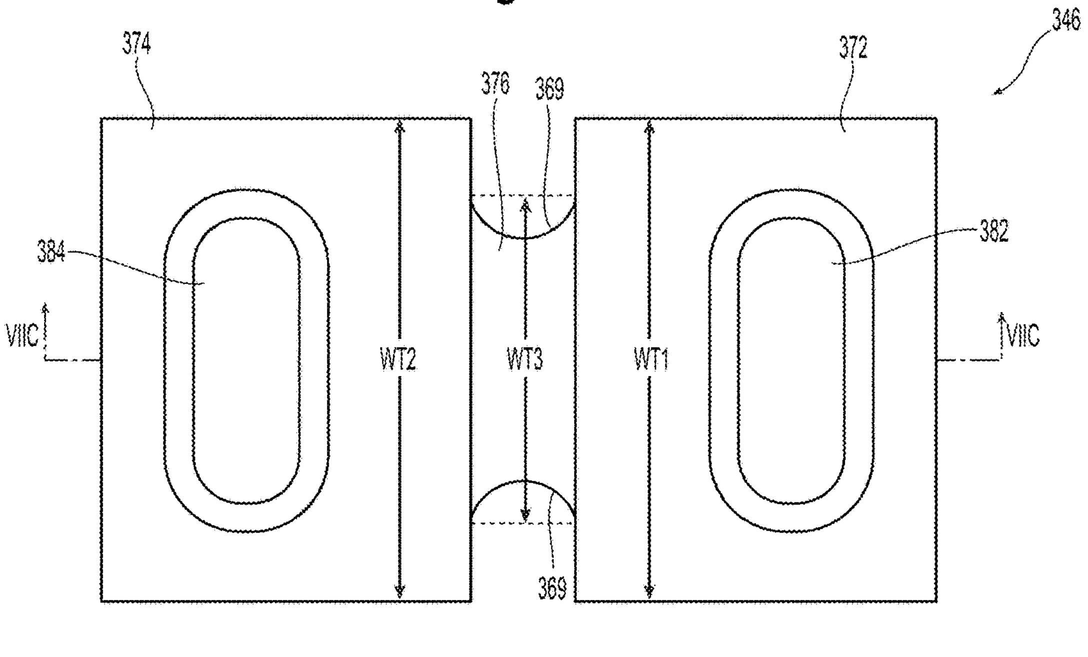
FIG. 7B is a top view of the link of FIG. 7A.

FIG. 7A is a perspective view of a preferred embodiment of the tension link 346. FIG. 7B is a top view and FIG. 7B is a cross-sectional view of the tension link 346 taken along line IA-IA. Preferably, the tension link 346 includes a first portion 372 and a second portion 374. The first and second portions 372, 374 are connected by a third portion (or an intermediate portion) 376. In the unactuated state of the sprinkler and releasing mechanism 328, the first portion 372 is engaged with the strut 342 and the second portion 374 is engaged with the hook member 344 in the first configuration. Preferably, the first and second portions 372, 374 include first and second openings 382, 384, respectively. As shown in FIG. 7, the first portion 372 is coupled with the strut 342 through the first opening 382 and the second portion 374 is coupled with the hook member 344 through the second opening 384.

The third portion (or intermediate portion) 376 is designed to collapse (or fail) when the force applied to the strut 342 by the actuator 314 exceeds a threshold value. Thus, the third portion 376 is designed to be a fracture point or region when the tensile load on the tension link 346 caused by the actuator 314 exceeds a predetermined design value or capacity of the fracture region. For this reason, the maximum tensile load or capacity that the third portion 376 can withstand before failure is preferably less than the maximum tensile load that either the first or second portion 372, 374 can withstand before failure. Stated differently, the maximum tensile strength or capacity of the third portion 376 is less than the maximum tensile strength of either the first or second portion 372, 374. Such a design can be achieved in various ways. For example, the third portion 376 may have a thickness less than that of the first and/or second portions, a width less than that of the first and/or second portions, one or more perforated portions, cut-out portions, notches, grooves, or any combination thereof, etc. In some cases, a brittle material such as ceramics or gray cast iron may be used for the tension link 346 to facilitate failure caused by impact or explosive force from, e.g., a Metron™ actuator. As long as the maximum tensile strength of the third portion 376 is less than the maximum tensile strength of either the first or second portion 372, 374, any design of the tension link may be employed.

Figure 7C:
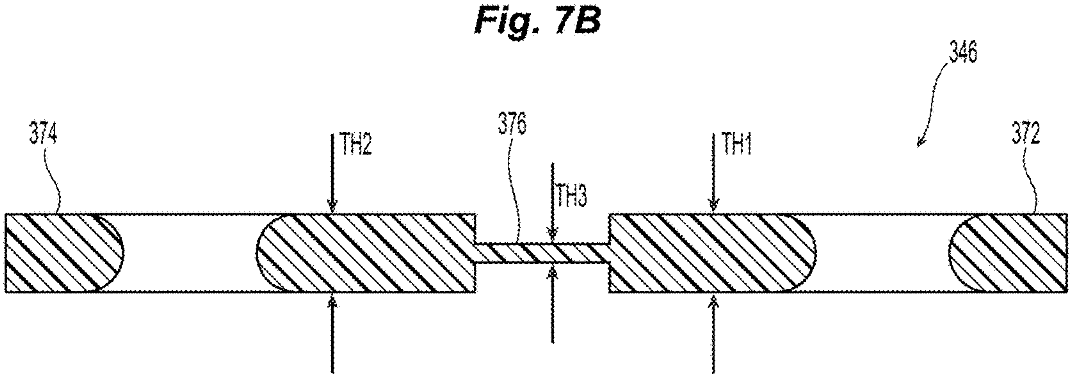
FIG. 7C is a cross-sectional view of the tension link of FIG. 7B taken along line VIIC-VIIC.

As shown in FIGS. 7A-7C, the preferred tension link 346 includes the third portion 376 that has a thickness TH3 less than a thickness TH1, TH2 of the first and second portions 372, 374, and a width WT3 less than a width WT1, W2 of the first and second portions 372, 374. Preferably, the thickness TH3 of the third portion 376 is less than half the thickness 1/2*TH1, 1/2*TH2 of the first and second portions 372, 74. In the plan or top view of the link 346, notches 369 are preferably formed about the intermediate third portion 376 which can define or be subject to stress concentration under tensile loading. Thus, the preferred tension link 346 has an intermediate portion 376 that includes the features of a smaller thickness, a smaller width, and notches to induce stress concentration to ensure that the fracture occurs in the intermediate portion 376 at a predetermined tensile force from the actuator 314.

The design of the tension link 346 is, for example, based on i) determination of desired failure load applied by the strut 342 and the hook member 344 to the tension link 346 when the actuator 314 is actuated and ii) the tensile strength of the chosen material for the tension link 346. Subsequently, the cross-sectional area of each portion of the tension link 346 can be calculated and appropriate dimensions can be derived to achieve the failure at the intermediate portion 376. The tensile link 346 may be made of a single component or material such as steel, plastic, metal alloy, ceramics etc. Alternatively, the tensile link 346 may be composed of two or more materials. For example, the intermediate portion 376 may be made of a material whose tensile strength is less than that of the first and second portions 372, 374. The tensile link 346 can be formed by a suitable technique, such as, for example, stamping, casting, deep drawing or a combination of stamping, casting, deep drawing or machining.

Figure 8A:
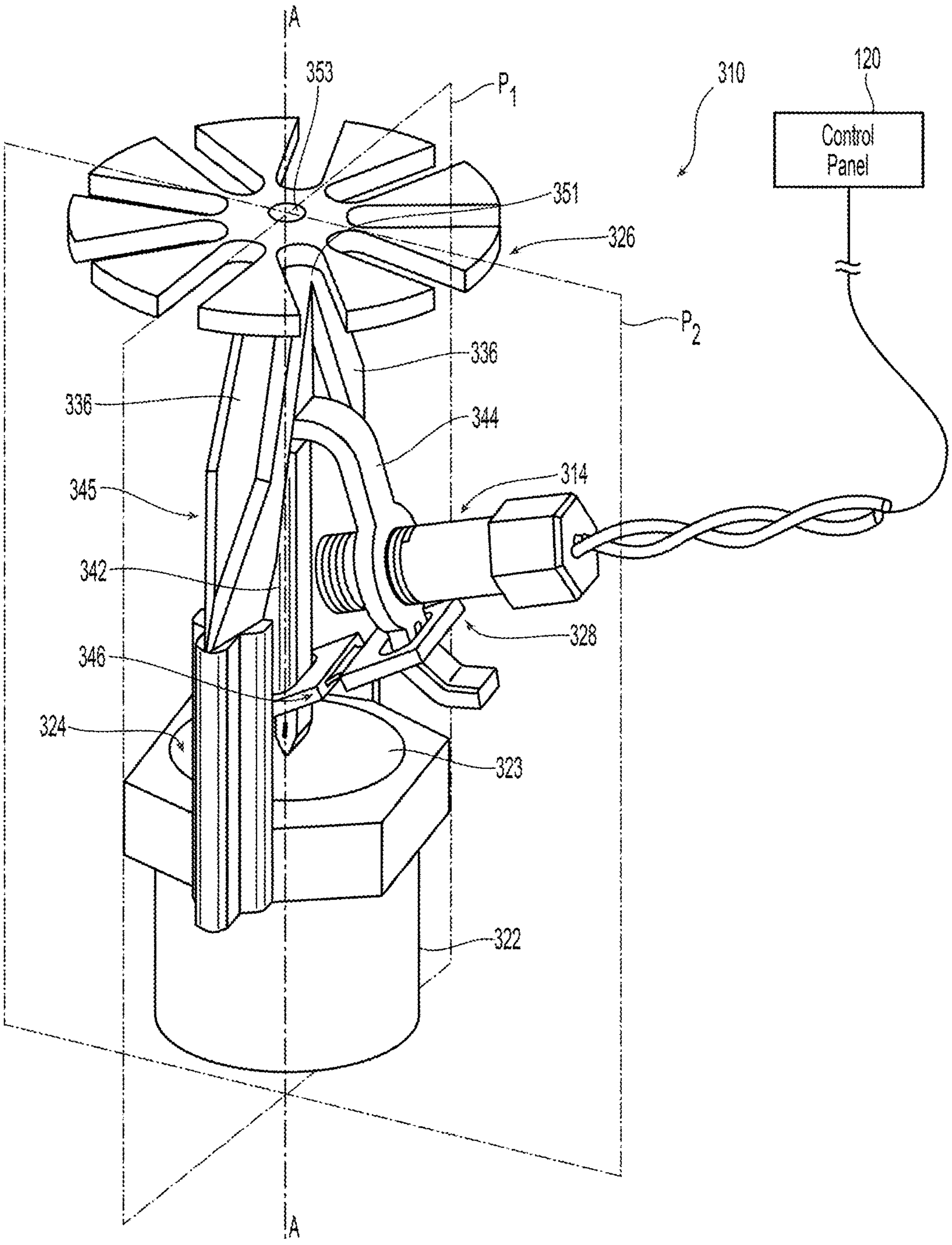
FIG. 8A is a perspective schematic view of an exemplary embodiment of a preferred sprinkler system with the sprinkler of FIG. 7 in an unactuated state.
Figure 8B:
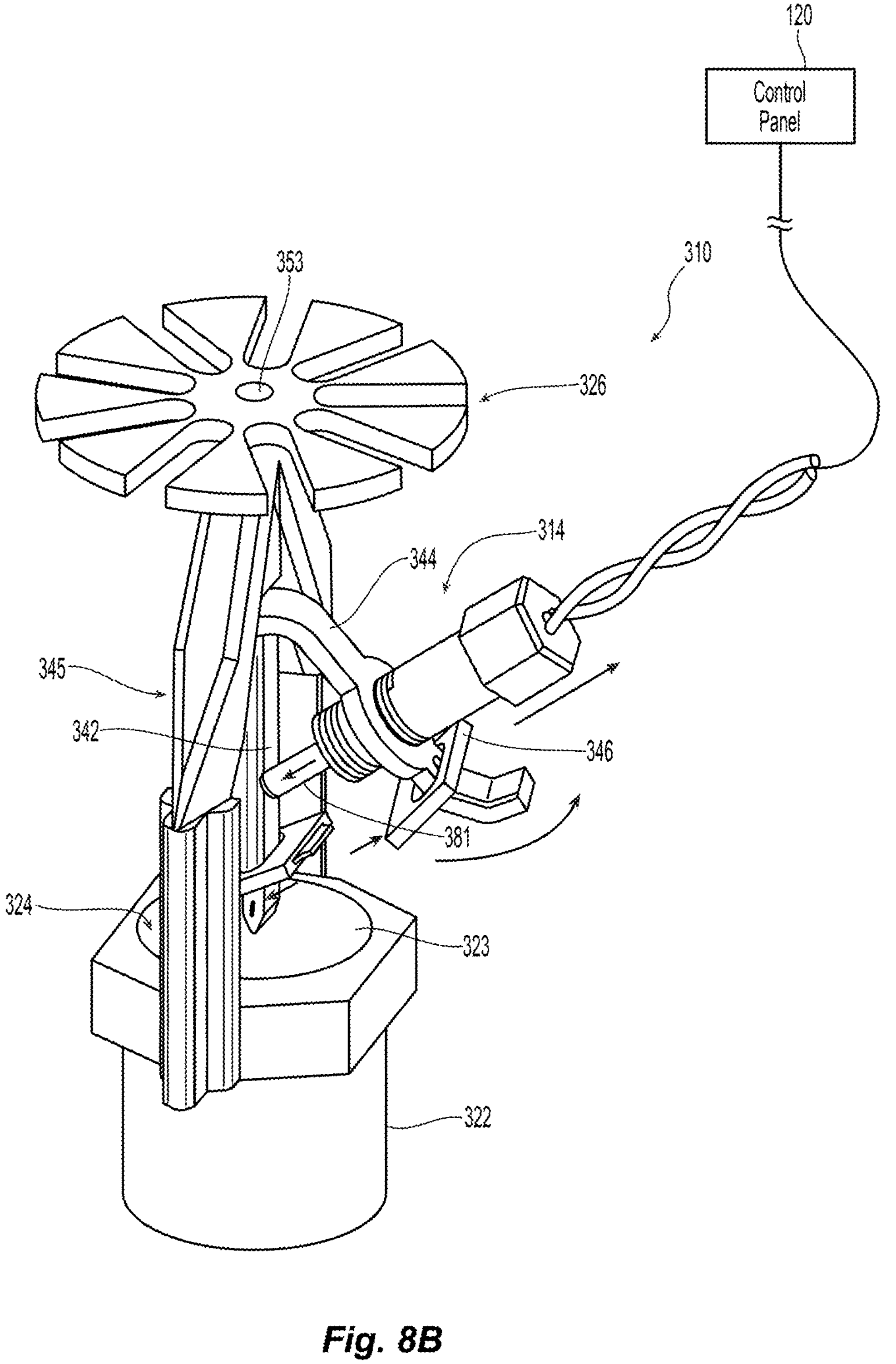
FIG. 8B illustrates actuation of the sprinkler of FIG. 8A.

The operation of the preferred fluid distribution device or sprinkler 310 is not triggered or operated by a thermal or heat-activated response. Instead, the operation of the sprinkler 310 can be electrically controlled, for example, by the preferred controller 120 of the system previously described. FIGS. 8A-8B show a schematic perspective view of the sprinkler 320 in a preferred system installation and operation. More specifically, FIG. 8A shows an unactuated state of the sprinkler 310 coupled to the controller 120 that is in communication with the detectors (not shown) as previously described. The actuator 314 may communicate with the control panel 120 through one or more lines or through a suitable communication interface such as, for example, telephone, wireless digital communication or via an Internet connection. Upon receiving an appropriate control or command signal from the controller 120, the actuator 314 operates and applies a force on the strut 342 in a manner as previously described to actuate the sprinkler 310. Preferably, the actuator 314 is configured such that the actuator 314 applies its force in a second plane P2 that intersects a first plane PI preferably defined by a pair of frame arms 336.

FIG. 8B illustrates the sprinkler 320 in an actuated state. As described above, upon receiving a command signal from the controller 120, the actuator 314 is actuated to apply a force to the strut 342. In the preferred actuator 314 shown in FIG. 8B, the piston 381 is extended to apply the force to the strut 342, thereby applying a tensile load in the tension link 346. When the applied tensile load exceeds the predetermined design failure load or capacity (e.g., a maximum tensile load preferably ranging from 50 pounds (lbs.) to 100 (lbs.), the tension link 346 fails. The failure preferably initiates at the intermediate portion 376 of the tension link 346 and the tension link 346 parts into two separate pieces. Once the tension link 346 is parted, the hook member 344 pivots about the fulcrum and is ejected out of or away from the sprinkler frame 345 along with the actuator 314, and subsequently the strut 342 and then the sealing assembly 324 are ejected or released and the internal passageway is cleared for discharge of fluid from the outlet 332.

Accordingly, the preferred sprinkler 310 and its releasing mechanism do not operate passively by exposure to an increasing temperature from a fire. Unlike known strut and link style sprinklers that include a thermally sensitive element, e.g., a metal laminate joined by a solder with a low melting point, a preferred embodiment of the releasing mechanism 328 of the sprinkler 310 does not include a thermally sensitive link nor include a thermally sensitive element for its operation. That is, the tension link 346 is preferably a thermally insensitive link. Elimination of the heat sensitive link from the releasing mechanism 328 can enhance controllability of operation via the controller 120 and prevents inadvertent operation.

Moreover, unlike known actuator driven sprinklers that have at least a portion of the actuator disposed inside the sprinkler frame, the preferred actuator 314 of the device 310 is disposed external to the sprinkler frame 345, i.e. external to the frame body 322 and frame arms 336. The actuator 314 is mounted on the hook member 344, thus requiring no separate mounting in the sprinkler frame 345 for installation of the actuator 314. When the actuator 314 is actuated, the actuator 314 and the releasing mechanism 328 are ejected away from the sprinkler frame 345. Thus, there is no obstruction (or disruption) in the waterway due to the actuator 314 and/or the releasing mechanism 328. Moreover, the actuator 314 can be easily mounted on the conventional strut and link style sprinkler without the need for significant structural modifications. Upon actuation of the releasing mechanism 328 and sprinkler 310, water is discharged to impact a deflector assembly 326 and redistributed in a manner described herein. The deflector assembly 326 preferably includes a deflector that is preferably disposed at a fixed distance from the outlet in the longitudinal direction. The frame 345 preferably includes a pair of frame arms 336 disposed about the frame body 322 and the outlet 32 in the first plane PI. The pair of frame arms 336 converge toward an apex 351, which includes an internally threaded portion through which the screw or load member 353 is in a threaded engagement.

Figure 9A:
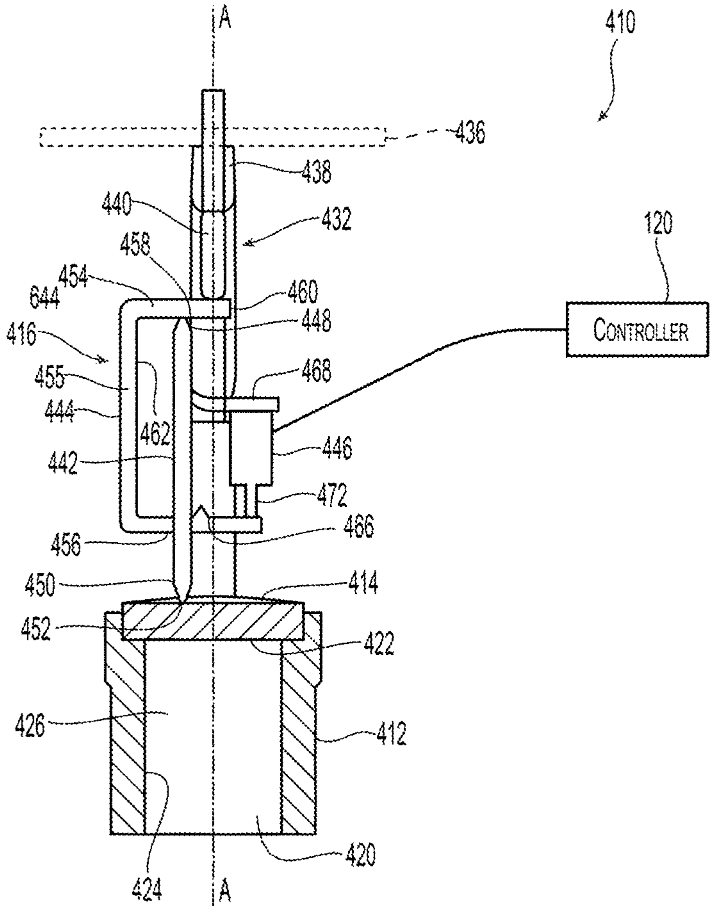
FIG. 9A is a schematic view of another embodiment of a fluid distribution device.
Figure 9B:
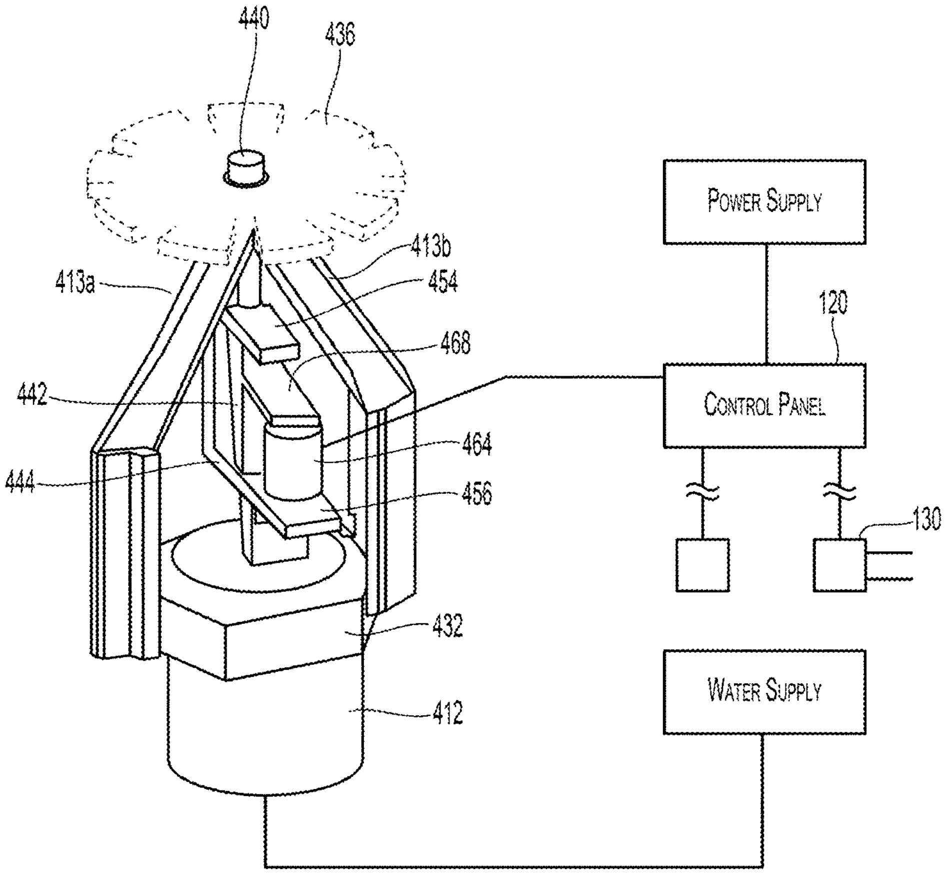
FIG. 9B is a perspective schematic view of an installation of the device of FIG. 9A.

Shown in FIGS. 9A and 9B is another fluid distribution device 410 for use in the system 100 having an alternate preferred embodiment of an electrically operated releasing mechanism 416. The preferred releasing mechanism 416 includes a hook and strut assembly in a latched arrangement with an electrically operated linear actuator to unlatch the hook and strut members.

The sprinkler 410 preferably includes a frame 432 including a frame body 412 having an inlet 420, an outlet 422, and an internal surface 424 defining a passageway 426 extending between the inlet 420 and the outlet 422. The inlet 420 can be connected to the piping network as previously described. The frame 432 preferably includes at least one frame arm and more preferably includes two frame arms 413*a*, 413*b* disposed about the body 412 that converge toward an apex 438 that is preferably integrally formed with the frame arms axially aligned along the sprinkler longitudinal axis A-A. Shown in an unactuated state of the sprinkler 410, the outlet 422 is occluded or sealed by a sealing assembly to prevent the discharge of a firefighting fluid from the outlet 422. The sealing assembly 414 generally includes a sealing body, plug or button disposed in the outlet 422 coupled to or engaged with a biasing member (not shown) such as, for example, a Bellville spring or other resilient ring which is to assist ejecting the sealing body out of the outlet 422.

Supporting the sealing assembly within the outlet 422 is a preferred releasing mechanism 416. The releasing mechanism 416 defines a first unactuated configuration or arrangement to maintain the sealing assembly 414 within the outlet 422 and properly engaged with a sealing seat (not shown) formed about the outlet 422. The releasing mechanism 416 also defines a second actuated configuration or state in which the releasing mechanism 416 disengages the sealing assembly 414 to permit ejection of the sealing assembly 414 from the outlet 422 and the discharge of fluid. In a preferred embodiment, the releasing mechanism 416 includes a strut member 442, a lever member preferably embodied as a hook member 444, a screw 440, and a linear actuator 446. The strut member 442 has a first strut end 448 and a second strut end 450. The screw 440 forms a threaded engagement with the frame 432 and applies a load axially preferably aligned with the longitudinal axis A-A. The preferred hook and strut arrangement 442, 444 transfer the axial load of the screw 440 to the sealing assembly to keep the assembly seated.

In the unactuated configuration of the releasing mechanism 416, the first end 448 of the strut member 442 is in contact with the hook member 444 at a first notch 458 to define a fulcrum, and the second strut end 450 of the strut member 442 is engaged with a groove formed on the button of the sealing assembly 414. The strut member 442 is preferably disposed parallel and offset to the longitudinal sprinkler axis A-A. The axially acting screw 440 applies its load on the hook member 444 at the second notch 460 to a first side of the fulcrum to define a first moment arm relative to the fulcrum defined by the first end 452 of the strut member 442. The amount of load placed on the first lever portion 454 by the screw 440 can be controlled by adjusting the torque of the screw 440 through the internally threaded portion of the apex 438. In this way, the screw (or compression screw member) 440 places a sealing force on the sealing body in the outlet 422 in the unactuated state.

As shown, the hook member 444 is preferably U-shaped. The hook member 444 has a first lever portion 454, a second lever portion 456, and a connecting portion 455 between and connecting the first and second lever portion 454, 456. The connecting portion 455 preferably extends parallel to the longitudinal axis A-A. The first and second lever portions 454, 456 extend preferably parallel to each other and perpendicular to the longitudinal axis A-A in the unactuated state. The screw 440 acts on the first lever portion 454 at a first side of the fulcrum defined by the first end 448 of the strut member 442. In the unactuated state of the releasing mechanism 416, the second lever portion 456 is in a frictional engagement with the strut member 442. Preferably, the second lever portion 456 includes a catch portion 466. The catch portion 466 is in a frictional engagement with a portion of the strut member 442 such that the hook 444 is prevented from pivoting about the fulcrum to statically maintain the releasing mechanism in the unactuated state under the load of the screw 440. Accordingly, in a preferred aspect, the strut member 442 and hook member 444 are in a direct interlocked engagement with each other in the first configuration of the releasing mechanism. The preferred trigger assembly further includes a linear actuator to act on one of the strut member and hook member to release the direct interlocked engagement in the second configuration of the trigger assembly. In this way, the load (or sealing force) from the screw 440 is transferred to the sealing assembly 414, thereby supporting the sealing assembly in the outlet 422. The catch portion 466 may be integrally formed with the second lever portion 456. Alternatively, the catch portion 466 may be made separately from the hook 44 and attached to the hook 44.

Figure 10A:
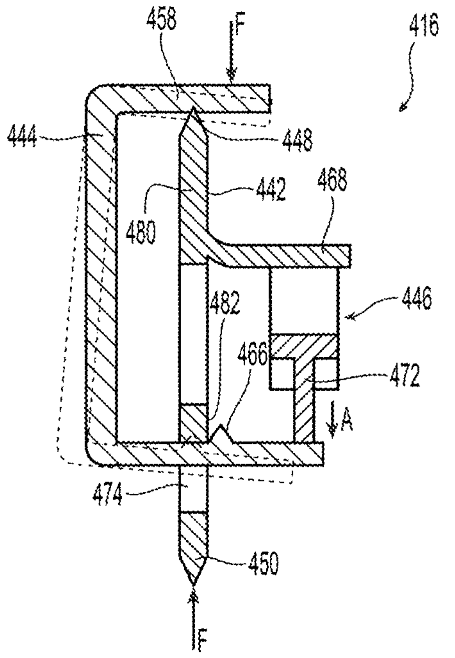
FIG. 10A is an enlarged sectional view of the releasing mechanism in the device of FIG. 9A in the unactuated state.
Figure 10B:
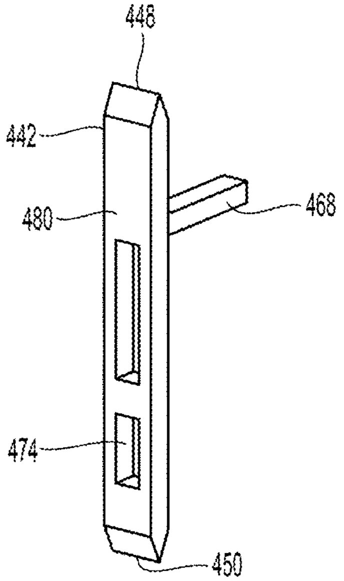
FIG. 10B is a perspective view of a preferred embodiment of a strut with an actuator mount in the releasing mechanism of FIG. 10A.

FIG. 10A shows a sectional view of the releasing mechanism 416, and FIG. 10B shows a perspective view of a preferred embodiment of the strut member 442. The preferred strut member 442 has an intermediate portion 480 between the first end 448 and the second end 450. The intermediate portion 480 preferably defines a window, slot or opening 474 therein, through which the second lever portion 456 of the hook member 444 extends in the first configuration (or unactuated state). Specifically, the strut 442 has an internal edge 482 defining the window 474 and the catch portion 466 preferably latches or interlocks with the internal edge 482 of the strut 442 by being in direct contact with the strut 442 in the first configuration or unactuated state of the releasing mechanism 416.

The preferred releasing mechanism 416 includes a linear actuator 446 to operate the releasing mechanism and actuate the sprinkler 410. The linear actuator 446 defines a retracted configuration in the unactuated state of the sprinkler 410 and an extended configuration in the actuated state of the sprinkler 410. The actuator 446 is preferably mounted or coupled to the strut member 442. In a preferred embodiment, the strut member includes a mount or platform 468 for mounting the linear actuator 446. More preferably, the mount 468 is formed from the intermediate portion 480 between the first and second ends 448, 450 of the strut member 444. The linear actuator 446 is attached or coupled to the mount 468 by any appropriate means to permit the movable member 472 of the linear actuator 446 to linearly translate in a manner as described herein. As shown in FIGS. 1 and 2, the actuator 446 includes a movable piston 472; and the actuator 446 is mounted such that the piston 472 translates axially preferably substantially parallel to the sprinkler axis A-A from the retracted configuration to the extended configuration preferably in a direction from the first portion 458 of the hook member 444 and toward the second portion 456 of the hook member. Moreover, the actuator 446 is mounted such that the linearly axial translation of the movable piston 472 contacts and displaces the second portion 456 of the hook member 444 so as to operate the releasing mechanism in a manner as described herein. The actuator 446 can be embodied by any one of various types of actuators such as, for example, a pyrotechnic actuator or a solenoid actuator. In some applications, the actuator 446 is a pyrotechnic actuator such as for example, Metron Protractor™ made by Chemring Energetics UK Ltd, e.g., DR2005/C1 Metron Protractor™.

Preferably, the sprinkler 410 does not operate passively by exposure to an increasing temperature from a fire, for example, as do automatic sprinklers having a thermally responsive trigger, link or bulb. Instead, the sprinkler 410 is actively operated to enable controlled actuation and discharge from the fire sprinkler 410. Shown in FIG. 9A is a schematic preferred illustrative installation of the sprinkler 410 with the releasing mechanism 416 and its actuator 446 coupled to, for example, a controller 120 of the system 100 previously described. The connection or communication between the releasing mechanism 416 and controller 120 can be a wired communication connection or a wireless communication connection. To actuate the sprinkler 410, the controller 120 signals operation for the preferred actuator 446 to switch from its retracted configuration to its extended configuration. In the preferred system 100, the electrical signal from the controller 120 can be automatically initiated from the detectors 130 which are coupled to the controller 120.

Upon receipt of the appropriate operating signal, the preferred actuator 446 operates to unlatch the hook member 444 from the strut member 442 so as to alter the releasing mechanism 416 from its first unactuated configuration to its second actuated configuration. More specifically, the preferred piston 472 of the actuator 446 is extended to contact and push down the second lever portion 456 so as to displace or bend the second lever portion 456 of the hook member such that the catch portion 466 disengages or unlatches from the strut member 442, as shown in phantom in FIG. 10A, and the hook member 444 rotates about the fulcrum under the load of the screw 440.

In the actuated configuration, the releasing mechanism 416 collapses to remove its support of the sealing assembly thereby allowing the sealing assembly 414 to be released from the outlet 422 and fluid to be discharged to address a fire in manner described herein. Firefighting fluid is discharged to impact a deflector assembly 436 coupled to the sprinkler frame 432 and is redistributed in a desired manner to address a fire. The deflector assembly 436 preferably includes a deflector member (shown generically) that is preferably disposed at a fixed distance from the outlet 422 in the longitudinal direction. The frame arms disposed about the body 412 extend and converge toward the apex 438 that is axially aligned along the longitudinal axis A-A. The deflector member is preferably supported at the fixed distance from the outlet 422 by the arms and apex of the sprinkler frame.

For the preferred releasing mechanism 416, the actuator 446 is preferably mounted on the strut member 442 thus requiring no separate mounting in the sprinkler frame 432 for installation of the actuator 446. Moreover, when the sprinkler is actuated, the actuator 446 and the releasing mechanism 416 are ejected away from the sprinkler frame 432. Thus, there is no obstruction (or disruption) in the waterway between the outlet 422 to the deflector assembly 436 by the actuator 446 and/or the releasing mechanism 416. Furthermore, the preferred releasing mechanism 416 of the present disclosure does not include a separate link that connects a hook to a strut. Instead, the hook and its preferred catch portion also function as a link between the hook member and the strut member, thereby removing the need for a separately provided link and simplifying the design of the releasing mechanism.

Figure 11:
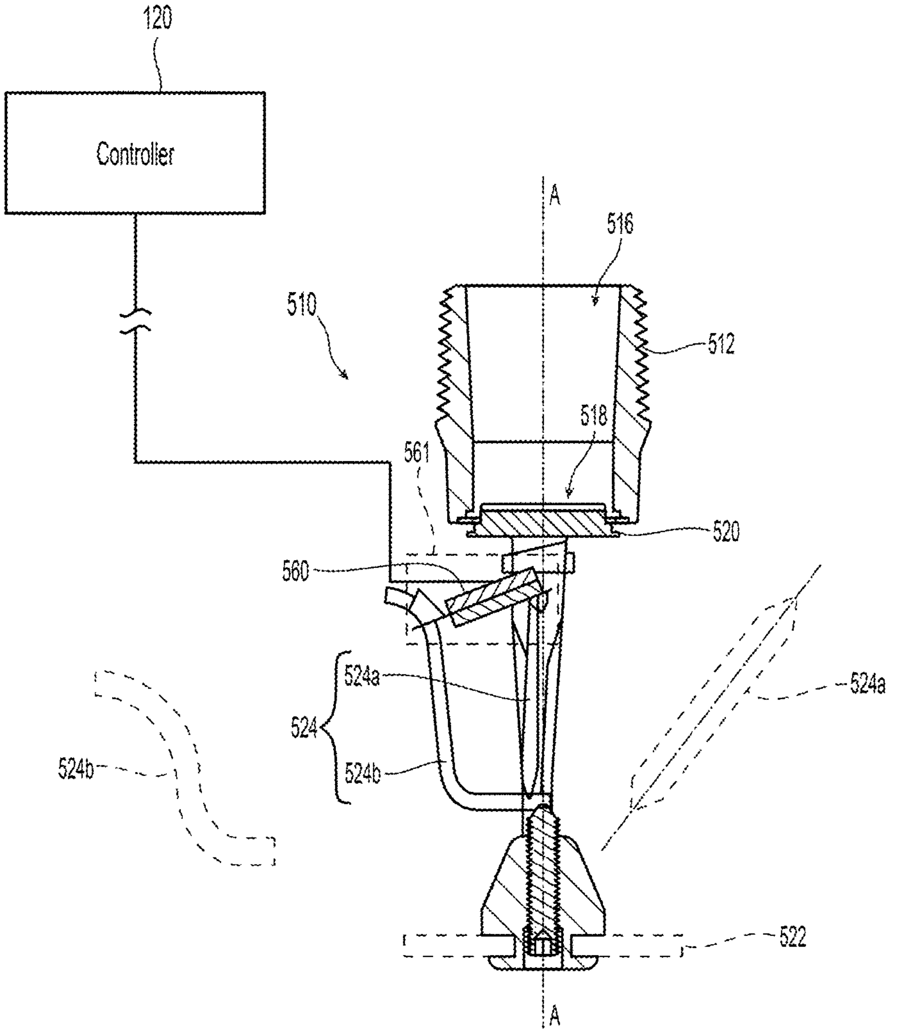
FIG. 11 is a schematic view of another embodiment of fluid distribution device in an installation with a preferred releasing mechanism.

Shown in FIG. 11 and FIGS. 12A-12C are another fluid distribution device 510 for use in the system 100 and alternate preferred embodiments of an electrically operated releasing mechanism 524. Generally, the preferred releasing mechanism 524 includes a strut and lever or hook assembly and which is operated by resistance heating. Shown in FIG. 11 is a schematic illustrative embodiment of a sprinkler 510 including a preferred releasing mechanism 524 to provide for controlled actuation of the sprinkler 510. The sprinkler includes a sprinkler frame body 512 with an inlet 516 for connection to, for example, the network of pipes of the system 100 and an outlet 518. In an unactuated state of the sprinkler 510, the outlet is occluded or sealed by a sealing assembly 520. The sealing assembly 520 generally includes a plate or other plug disposed within an outlet coupled or engaged with a biasing member such as, for example, a Bellville spring or other resilient ring which acts to bias the plate or plug out of the outlet 18. Preferably axially spaced at a preferably fixed distance from the outlet 518 is a deflector 522 for distributing the fluid discharged from the outlet upon sprinkler actuation. Supporting the sealing assembly 520 within the outlet 518 is a preferred releasing mechanism 524. The releasing mechanism 524 defines a first configuration or arrangement in which to maintain the sealing assembly 520 seated within the outlet 518. The releasing mechanism 524 also defines a second configuration or state to permit ejection of the sealing assembly 520 from the outlet 518 and the discharge of fluid from the outlet 518.

Specifically shown is a preferred releasing mechanism 524 having a strut 524*a*, and a hook or lever 524*b*. In the first unactuated configuration or arrangement, the strut 524*a* at one end acts against the sealing assembly 520 and at the opposite end is supported and loaded by a load screw threaded into a boss or apex formed and spaced from the outlet 518 in a manner as previously described with other embodiments of strut and lever actuator assemblies. The strut 524*a* and lever 524*b* can be arranged with the frame 512 and sealing assembly 520 as the strut and lever shown and described in U.S. Pat. Nos. 7,819,201 and 7,165,624. Shown in phantom is the support assembly 524 in its second actuated state disengaged from the sealing assembly 520 to permit ejection of the sealing assembly 520 from the outlet 518 and the discharge of fluid from the outlet 518.

The releasing mechanism 524 is shown in FIG. 11 with an actuator and more preferably link arrangement 560 to provide controlled operation of the sprinkler 10. More specifically, the preferred releasing mechanism and installation provide for controlled actuation to alter the releasing mechanism 524 between its first configuration and its second configuration. Generally, the preferred releasing mechanism 524 includes a link 560 in which two metal members are held together about the support assembly 24 so as to hold the preferred strut and lever members 524*a*, 524*b* in their first configuration and support the sealing assembly 20 within the outlet 18 of the sprinkler body 12. In a preferred electrically controlled operation, the two metal members separate thereby to collapse the releasing mechanism and remove its support of the sealing assembly 520 and permit the discharge of fluid from the sprinkler outlet 518.

The preferred actuator 524 has two modes of actuation: a passive mode in which the solder is melted in response to a fire or other sufficient heat source to permit the metal members to separate; and an active mode in which a controlled electrical signal is delivered to the link 560 to heat the actuator so as to melt the solder and permit separation of the metal members. Accordingly, the active mode provides for controlled actuation of the sprinkler 510 in which the electrical signal can be delivered to the sprinkler 510 and the link 560 by, for example, the controller 120. Alternatively, the link 560 and the releasing mechanism 524 can be configured only for active actuation by an appropriate electrical control signal. Referring again to FIG. 11, the actuator 100 is shown outlined in phantom to schematically illustrate an optional insulation 561 about the link 560. With the link insulated, heat transfer from a fire cannot melt the solder to passively operate the actuator assembly 564. Accordingly, the fully active mode releasing mechanism 524 can only be operated by an appropriate electrical control signal to melt the solder and permit separation of the link metal members.

Figure 12A:
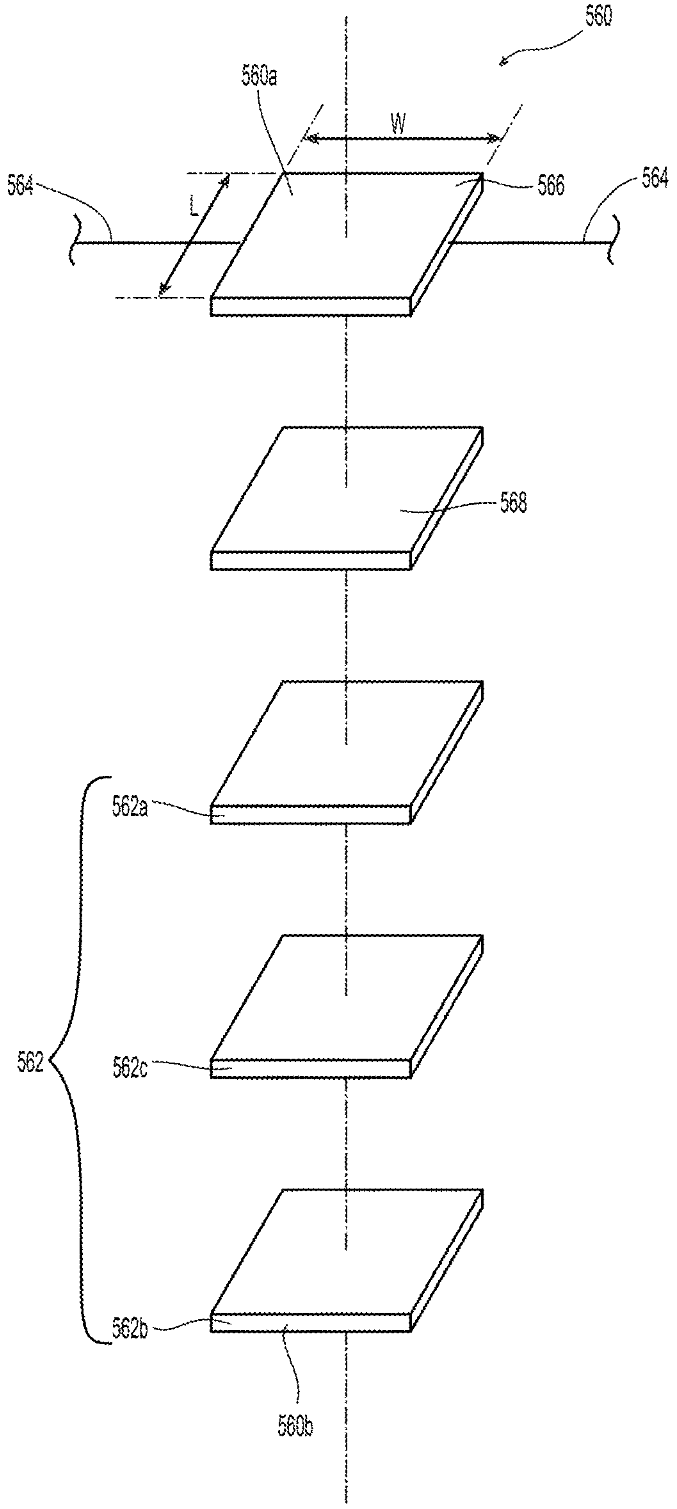
FIG. 12A is one preferred embodiment of an actuator for use in the releasing mechanism of the device in FIG. 11.

Shown in FIG. 12A is a schematic illustration of one preferred embodiment of the link 560 having a first end 560*a* and a second end 560*b*. The preferred actuator preferably includes a solder link 562 having two metal members 562*a*, 562*b* with a thermally responsive solder 562*c* disposed between the two metal members 562*a*, 562*b* to provide the preferred passive operation of the releasing mechanism 524. The preferred link 560 further includes one or more electrical contacts 564 to heat the link 560 and more preferably heat and melt the solder 562*c* so as to permit the two metal members 562*a*, 562*b* to place the releasing mechanism 524 in its second configuration and release the sealing assembly 520 in a manner as previously described. The electrical contacts 564 are preferably disposed to define a continuous electrical path over the solder link.

In one preferred embodiment of the link 560, a layer of conductive material 566 formed or deposited on one of the metal members 562*a* of the link 562. The layer of conductive material 566 is of a defined resistivity preferably defined by the thickness, width and length of the conductive material based on the following relation:

$$R = \rho \cdot \frac{w}{L * t}$$

wherein in the preferred embodiment, the width (W) defines the preferred direction of the electrical flow path which preferably extends perpendicular to the actuator length (L) direction from the first end 560*a* to the second end 560*b*. The conductive material 566 is of a preferred resistivity (p) such that the solder can be melted by a preferred 24 volt supply applied across the electrical contacts 564. In one preferred embodiment, the electrical contacts 564 are disposed across the width of the link 560. Accordingly, where the first end and second end 560*a*, 560*b* and conductive layer 566 preferably define a plane, the continuous electrical flow path is preferably directed parallel to the plane. The link 560 further preferably includes an insulator layer 568 disposed between the conductive material 566 and the one metal member 562*a* over which the conductive material 566 is deposited. The insulator material 568 is preferably configured to prevent the electrical signal from flowing directly through the link 560. In a preferred actuation, a preferred voltage of 24 volts or smaller can be applied across the electrical contacts 564 so as to heat the preferred link 560 to melt the solder 562*c* and permit separation of the metal members 562*a*, 562*b*.

Figure 12B:
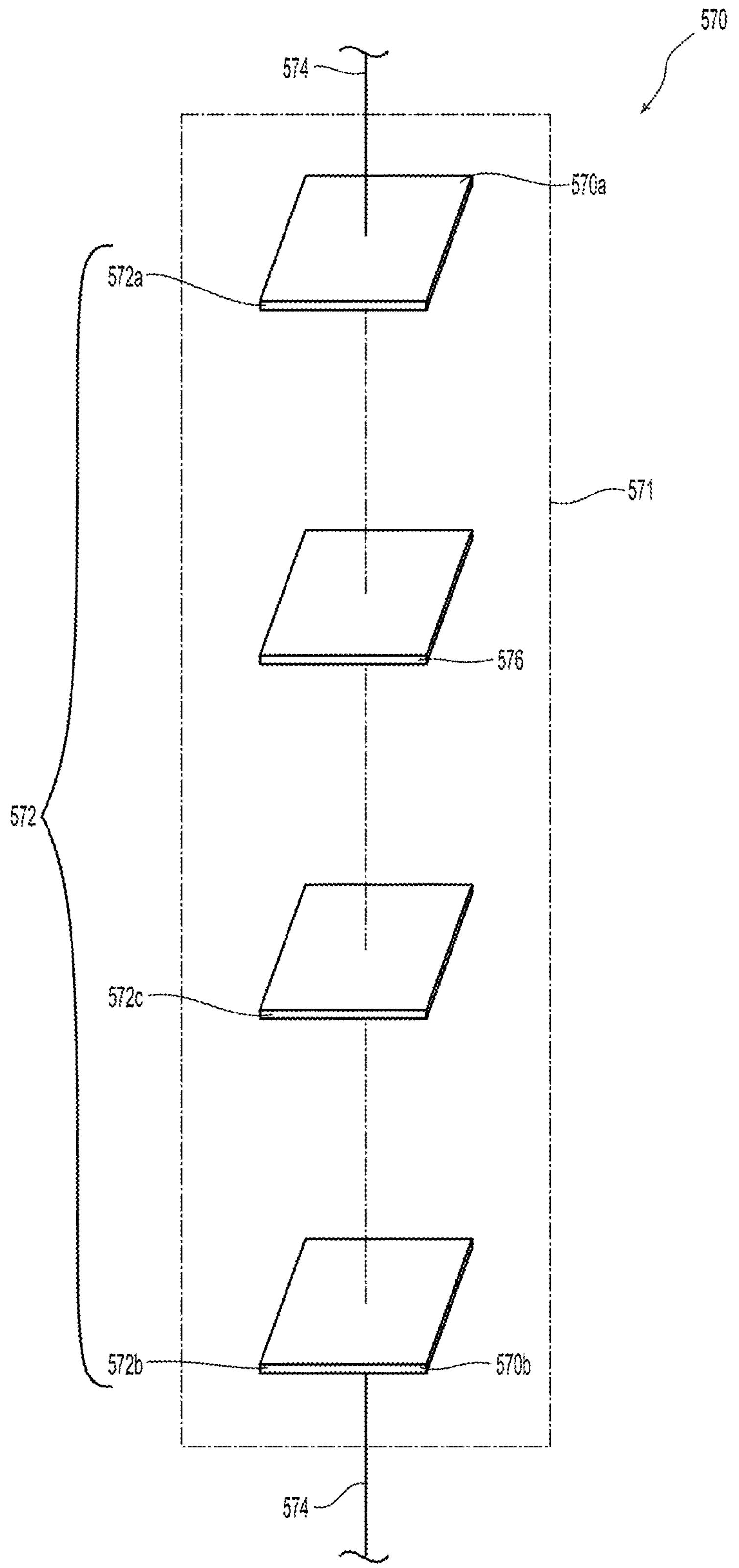
FIG. 12B is another preferred embodiment of an actuator for use in the releasing mechanism of the device in FIG. 11.
Figure 12C:
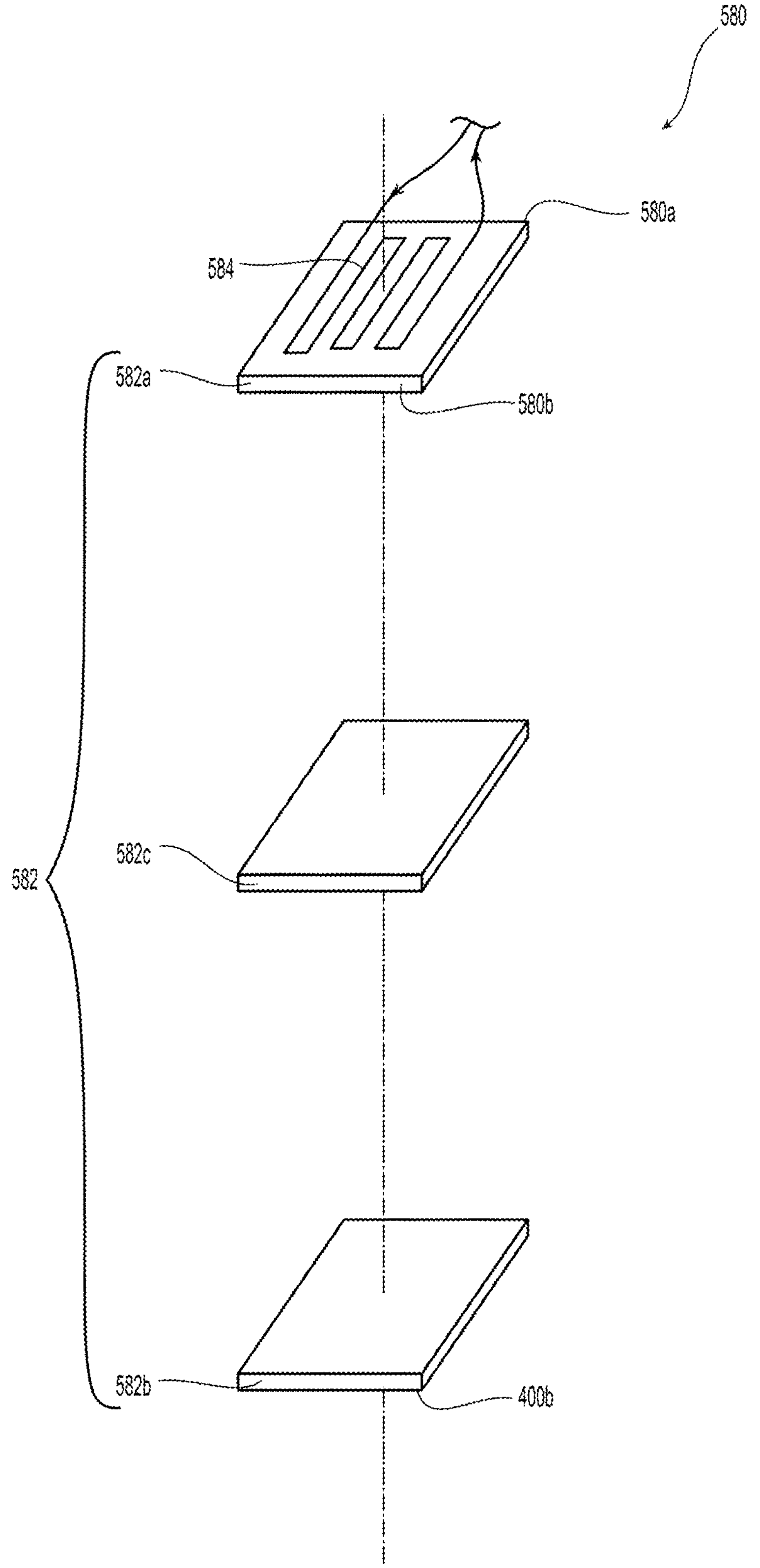
FIG. 12C is yet another preferred embodiment of an actuator for use in the releasing mechanism of the device in FIG. 11.

Another preferred embodiment of the link 570 for use in the releasing mechanism 524 is shown in FIG. 12B. The link again includes two metal members 572*a*, 572*b* with a thermally responsive solder 572*c* disposed between the two metal members 572*a*, 572*b* to provide passive operation of the link 570. The link 570 further includes a layer of conductive material 576 of a defined resistivity between one of the metal members 572*a* and the solder material 572*c*. The two spaced apart metal members 572*a*, 572*b* act as a pair of electrical contacts to define a continuous electrical flow path 574 directed perpendicular to the plane defined by the metal members 572*a*, 572*b* and more particularly perpendicular to the plane defined by the width and the length of the actuator. In a preferred actuation, an electrical control signal, such as an electrical voltage signal, is preferably applied across the metal members 572*a*, 572*b* so as to heat the link 570 to melt the solder 572*c* and permit separation of the metal members 572*a*, 572*b*. The conductive material 576 is preferably of uniform and more preferably constant thickness to minimize or eliminate concentrations of heat in the link 570. Moreover, the defined resistivity of the conductive material 576 is such that the solder can be melted by a 24 volt supply or smaller applied across the metal members 572*a*, 572*b*. Moreover, the conductive material 576 preferably defines a preferred resistivity of 50 ohms. Schematically shown in FIG. 12B is an insulation coating 571, which can be optionally incorporated into any one of the preferred embodiments of an actuator described herein. With the optional insulation 571, heat transfer from a fire cannot melt the solder to passively operate the actuator 524 with the link 570. Accordingly, the fully active mode link 570 can only be operated by an appropriate electrical control signal to melt the solder and permit separation of the link metal members.

Another preferred embodiment of a link 580 for use in the releasing mechanism 524 is shown in FIG. 12. The link 580 again includes having two metal members 582*a*, 582*b* with a thermally responsive solder 582*c* disposed between the two metal members 582*a*, 582*b*. The link 580 provides for passive mode operation of the releasing mechanism 524. An electrical contact is provided and preferably embodied as insulated wire 584 repetitively extending over one of the metal members 582*a* between first and second ends 580*a*, 580*b* of the link 580 to define a preferably continuous electrical path. The insulated contact 584 is preferably embodied as an electrical foil bonded to the external surface of the one metal member 582*a*. In one preferred embodiment, one metal member 582*a* is disposed between the electrical foil 584 and the solder 582*c*. In one preferred configuration, the electrical contact 584 is disposed so as to initiate at one end 590*a* of the actuator and terminate at an opposite end 590*a*. In a preferred operation of the releasing mechanism 524 with the link 580, an electrical signal and preferably an electrical current flows through the electrical contact 584 to generate heat. Through resistance heating, the solder 582*c* melts allowing the metal members 582*a*, 582*b* to separate and permit discharge from the sprinkler in a manner as previously described.

Figure 13:
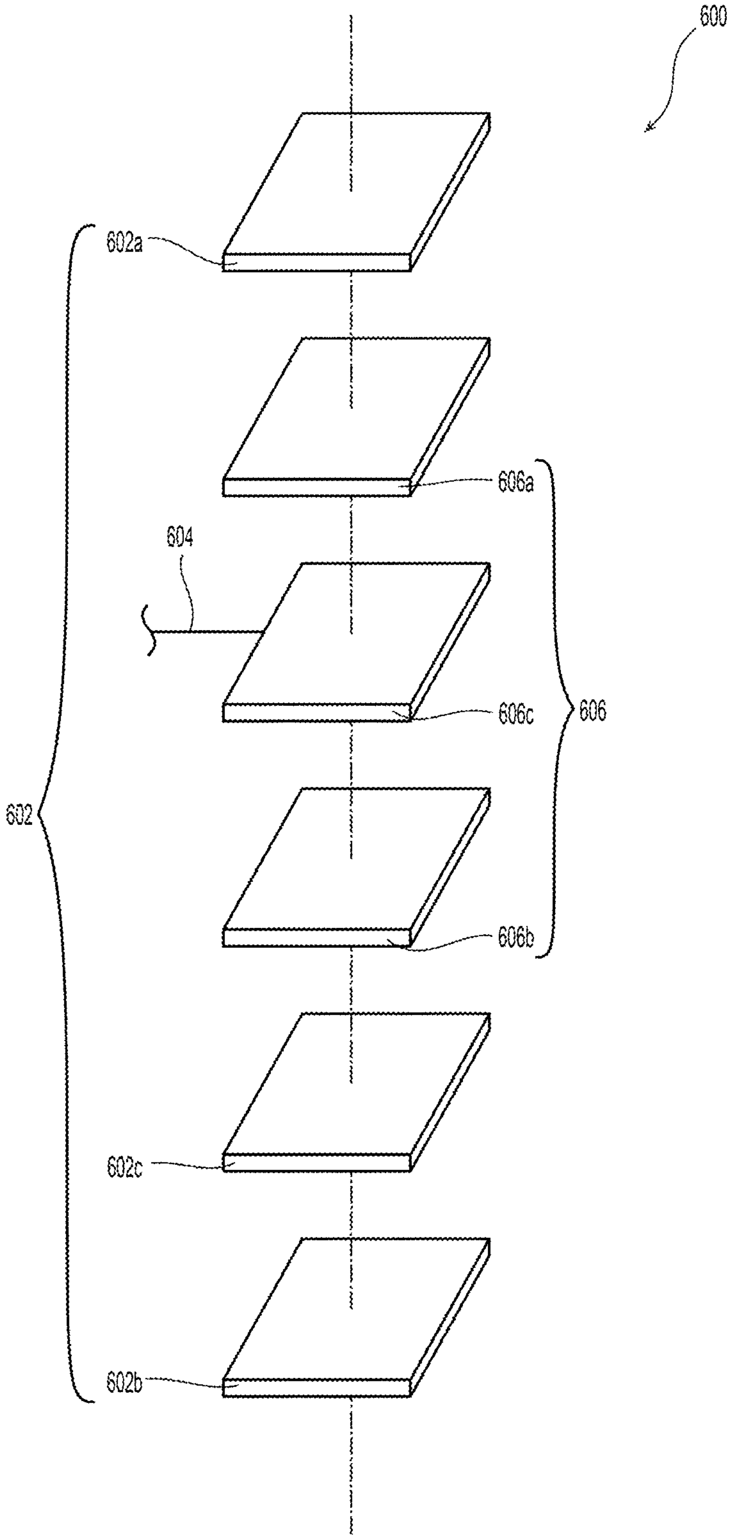
FIG. 13 is another preferred embodiment of an actuator for use in the releasing mechanism of the device of FIG. 11.

In another alternate embodiment of the releasing mechanism 524, the strut and lever assembly is a reactive strut and link assembly operated or collapsed by a preferably reactive link. Shown in FIG. 13 is a preferred embodiment of the preferred link 600 for incorporation into the releasing mechanism 524. The preferred link 600 includes two metal members 602*a*, 602*b* with a thermally responsive solder 602*c* disposed between the two metal members 602*a*, 602*b*. Accordingly, the link provides for passive mode operation of the releasing mechanism 524. The preferred link 600 further preferably includes a reactive layer 606 disposed between one of the metal members 602*a* and the solder material 602*c*. The reactive layer 606 preferably includes a first insulation layer 606*a*, and a second insulation layer 606*b* coupled to a thermite structure 606*c* disposed between the first and second insulation layers 606*a*, 606*b*. One or more electrical contacts or wires 604 define a preferably continuous electrical path through the thermite structure 606*c*. Alternatively and more preferably, the link 600 can have a single contact or ignition point 604 at which an electrical signal is delivered. The thermite structure 606*c* is preferably a nano thermite multilayer structure. A preferred embodiment of the nano thermite multilayer structure includes alternating oxidizers and reducers. In one preferred embodiment, the oxidizer is copper oxide and the reducer is preferably aluminum (Al). In another preferred embodiment of the reactive layer 106, the second insulation layer preferably includes a coating of a wetting layer for adherence to the solder.

In a preferred operation of the releasing mechanism 524 and link 600, an electrical signal and preferably an electrical current is applied to the electrical contact or wire 504 to heat the contact. The heat in the contact ignites the thermite structure 606*c*. The resulting combustion generates a heat release which is sufficient to melt the solder 602*c*, permitting the metal members 602*a*, 602*b* to separate to release the seal assembly 520 and permit discharge from the sprinkler 510 in a manner as previously described. The preferred first and second insulators 606*a*, 606*b* are made from $SiO_2$ and minimize or prevent the flow of the actuating current through the link 102 such that the electrical current alone does not heat and melt the solder 602*c* to prematurely separate the metal members 602*a*, 602*b* and operation of the sprinkler. A preferred electrical contact or wire 604 for ignition of the thermite layer includes a nichrome wire.

Figure 14A:
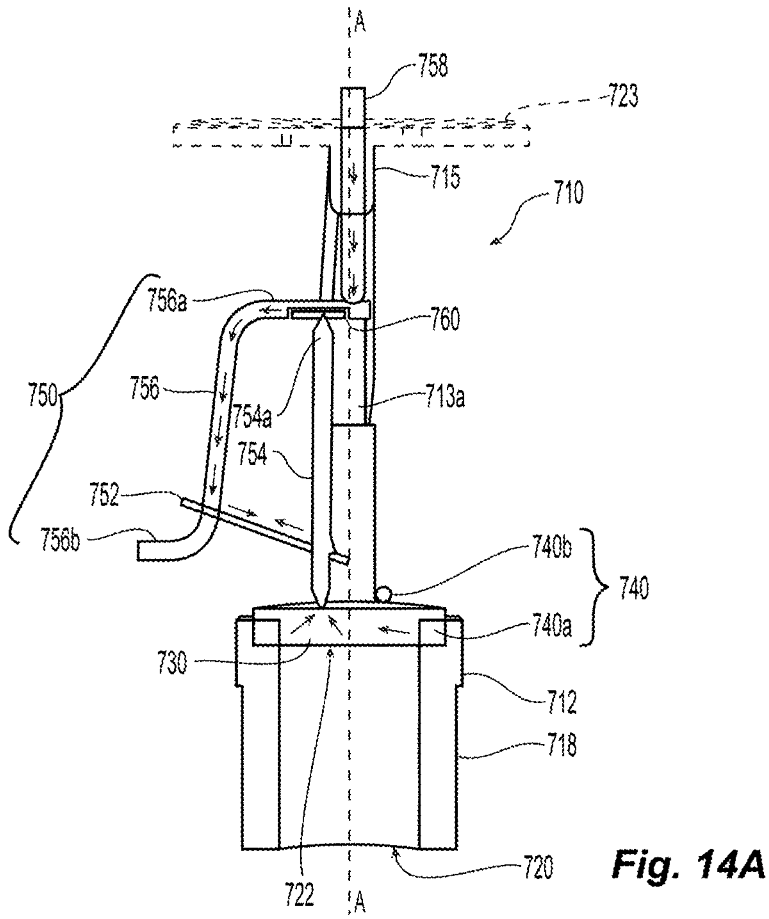
FIG. 14A is a cross-sectional view of another embodiment of a fluid distribution device having a preferred releasing mechanism.
Figure 14B:
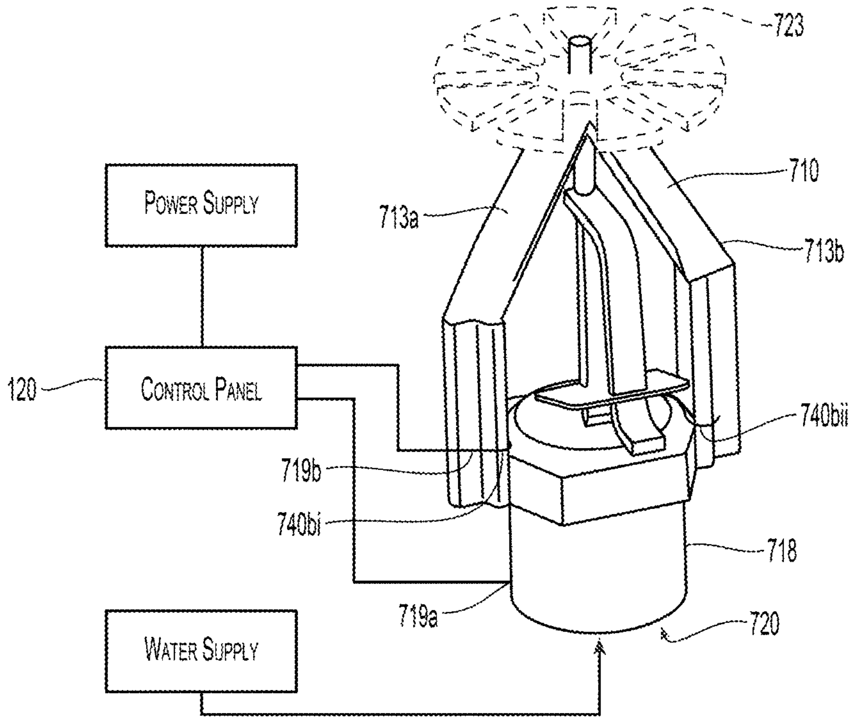
FIG. 14B is a perspective and schematic installed view of the device of FIG. 14A.

The previously described embodiments of the actuator assembly provide for an electrical control or operating signal being is directed through the link of the releasing mechanism. An alternate preferred embodiment of a fluid distribution device and releasing mechanism provide for a preferred defined electronic flow path through which an electronic signal can flow to actuate the sprinkler. Shown in FIGS. 14A and 14B is another fluid distribution device embodied as a fire protection sprinkler 710 with an alternate preferred embodiment of an electrically operated releasing mechanism 750 for use in the system 100. Generally, the releasing mechanism 750 has an unactuated state to support the sealing assembly 730 in the outlet 722. The releasing mechanism 750 also has an actuated state to release support from the sealing body. The preferred releasing mechanism 750 includes a preferably thermally responsive link 752 to control actuation of the trigger assembly from its unactuated state to its actuated state. The link 752 also responds to an appropriately configured electrical control signal. Once the control signal is received, the link 752 operates to alter the configuration of the releasing mechanism 750 to release its support of the sealing assembly 730 and permit discharge of a firefighting fluid from the outlet 722 similarly to the previously described embodiments. The preferred embodiment of the sprinkler 710 and its releasing mechanism 750 provides for an electrical actuation path. As used herein, an "electrical actuation path" is defined as a controlled flow path for the electrical or other actuating signal to the link 752 to electrically actuate or operate the releasing mechanism 750 from its unactuated state to its actuated state. The electrical actuation path preferably is directed from a first electrical pole to a second electrical pole and through the link 752, which is located between the first and second electrical poles along the electrical actuation path. Referring to FIG. 14B, the sprinkler frame 712 is constructed, formed, cast and/or machined from a conductive material. A portion of the frame 712 provides for a first electrical pole 719*a*. In a preferred embodiment, the body 718 includes an appropriate contact or lead to serve as a first electrical pole 719*a* for coupling to an electrical control signal. The sprinkler 710 includes a second electrically conductive component or member to serve as a second electrical pole 719*b* at a lower or differential potential from the first pole 719*a*. In the preferred embodiment, the ejection spring 740*b* serves as the second pole 719*b* and preferably includes a portion or lead that is coupled to a lower potential, such as for example, an electrically grounded connection. For the preferred embodiments described herein, the electrical actuation path extends or flows from sprinkler frame body 718, through the releasing mechanism 750 and its link 752 and to the ejection spring 740*b* and its ground connection.

To define the preferred electrical actuation path and prevent a short circuit between the first and second electrical poles, the electrical poles are electrically insulated from one another. In a preferred embodiment, the ejection spring 740*b* is electrically insulated from the sprinkler frame 712. For example, the ejection spring 740*b* can have an insulated coating to insulate the spring 740*b* from the sprinkler frame 712. Alternatively and more preferably, the sprinkler frame 712 has an insulated coating about the portion that is engaged by the ends of the ejection spring. With reference FIG. 14B, a preferred embodiment of the sprinkler frame 712 includes a pair of frame arms 713*a*, 713*b* that depend axially from and about the frame body 718. Each of the frame arms 713*a*, 713*b* are insulated proximate the body 718 in the regions that are engaged by the ends 740*bi*, 740*bii* of the ejection spring 740*b*. In the unactuated state of the sprinkler 710, the ejection spring is engaged with the sealing button 3 that is seated against the valve seat formed in the outlet 722 of the frame body 718. Accordingly, the sealing assembly 730 is insulated from the sprinkler frame 718. For example, the Teflon coating on the Belleville spring 740*a* is sufficient to insulate the sealing assembly 730 from the sprinkler frame 718.

The preferred releasing mechanism 750 includes a strut member 754, a hook member 756, a screw or other threaded member 758, and a thermally responsive soldered link 752. The screw 758 forms a threaded engagement with the frame 718 and applies a load axially aligned with the longitudinal axis A-A. More specifically, the screw 758 is in threaded engagement with the an apex 715 preferably formed integrally with the frame arms 713*a*, 713*b*. Similar to the previously described embodiments, the hook and strut arrangement 754, 756 transfer the axial load of the screw

758 to the seal assembly 730 to keep the seal assembly 730 in the unactuated configuration of the releasing mechanism 750. The preferred solder link 752 couples the hook member 756 to the strut member 754 to statically maintain the hook and strut arrangement for supporting the seal assembly 730 against the bias of the sealing spring or water pressure delivered to the sprinkler.

Figure 15:
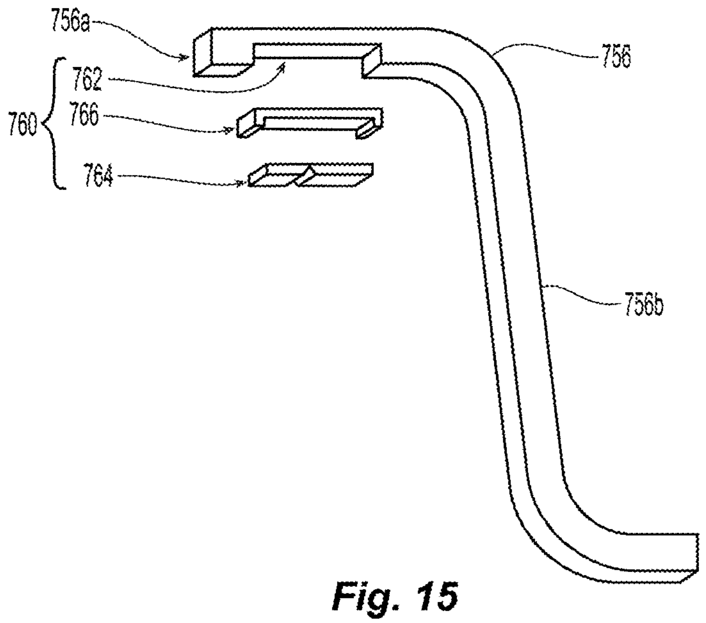
FIG. 15 is an exploded view of a preferred hook member for use in the releasing mechanism of FIG. 14A.

The preferred embodiment of the releasing mechanism 750 defines the direction of the electrical actuation path (indicated in part by arrows) to be directed along the length of the preferred thermally responsive link 752. Accordingly, to eliminate an undesired short circuit of the electrical actuation path from the apex to the ejection spring 740*b* by way of the strut member 754, the preferred releasing mechanism 750 preferably includes an insulated contact between the hook member 756 and the first end 754*a* of the strut member 754. In one preferred embodiment, the first portion 756*a* of the hook member 756 includes an insulated region 760 in contact with the first end 754*a* of the strut member 754 in the unactuated state of the releasing mechanism 750 such that the electrical path is defined through the frame arms 713*a*, the hook member 756 and across the thermally responsive link 752. With reference to the exploded view of the hook member 756 in FIG. 15, the insulated region 760 of the hook member 756 includes a recess 762 formed in the first portion 756*a* of the hook member 756, a strut engagement plate 764 received in the recess having a notch formation for receiving the first end 574*a* of the strut member 754; and an insulator 766 made of an appropriate electrical insulator disposed between the recess 762 and the strut engagement plate 764.

Referring again to FIG. 14B, a preferred installation of the sprinkler 710 is shown. The frame body 718 is coupled to the piping network; and the controller 120 is preferably coupled to the sprinkler 710 at the first electrical pole preferably located along the frame body 718 to deliver an electrical actuating signal to the frame body 718. The ejection spring 740*b* is preferably coupled to a grounding wire or alternatively coupled to an opposite lead wire from the controller 120. The controller 120 can be coupled to a power source to generate an appropriate preferred electrical actuating signal. When in service, the controller 120 can deliver the actuating signal to the sprinkler 710 in an automated control response to a detector 130 in a manner of system 100 operation previously described.

Figure 16:
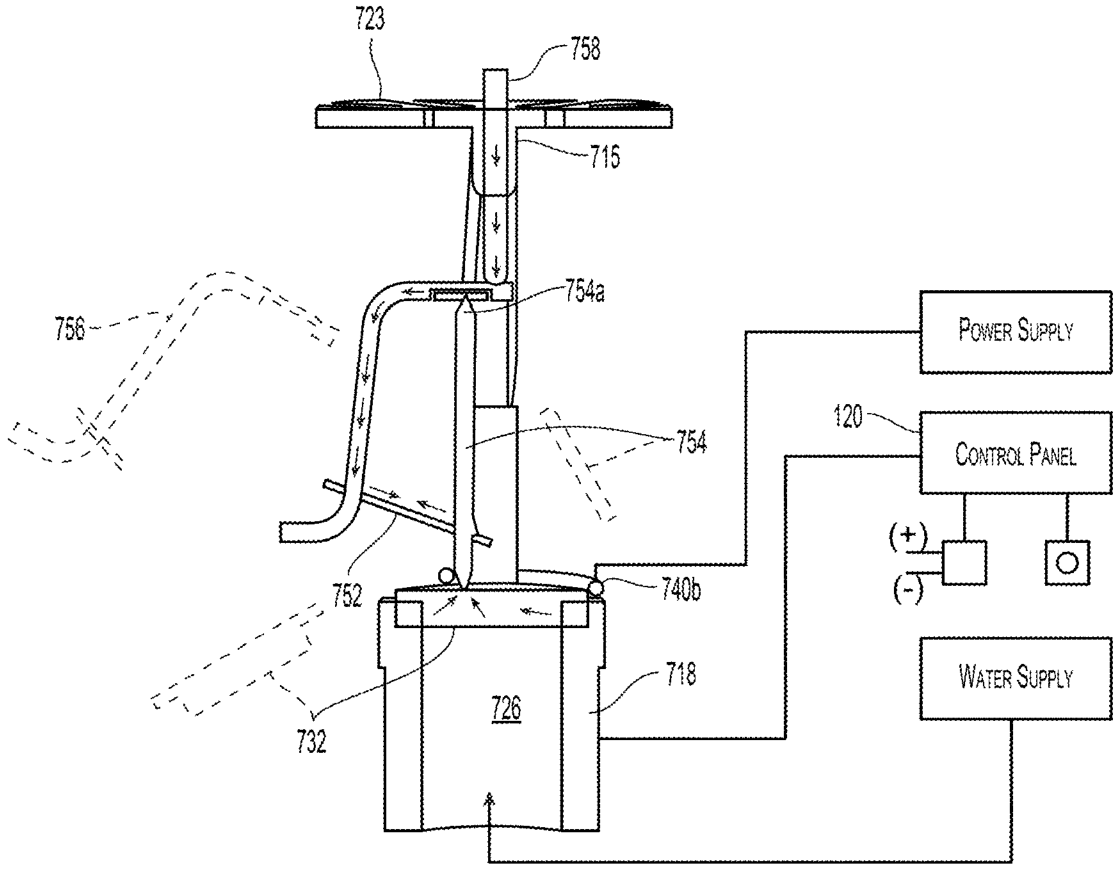
FIG. 16 is a cross-sectional schematic view of the device of FIG. 14A in operation.

In an appropriate response to the detection or manual signal, the controller 120 of the system 100 delivers a controlled electrical actuating signal to the sprinkler 710. The electrical signal travels the preferred electrical actuation path, as illustrated in FIG. 16, from the body 718, up the frame arms 713*a*, 713*b*, to the apex 715, down the load screw 758, through the hook member 756 and through the preferred solder link actuator 752 preferably through its length. The preferred electrical actuating signal is sufficient to melt the solder of the link 752 to permit the link to separate or operate. The releasing mechanism 750 takes the actuated configuration and removes its support against the sealing assembly 730. Under the bias of the ejection spring 740*b*, the delivered water pressure and/or the Belleville spring 40*a*, the sealing assembly 730 is ejected to permit the discharge of pressure.

Figure 17A:
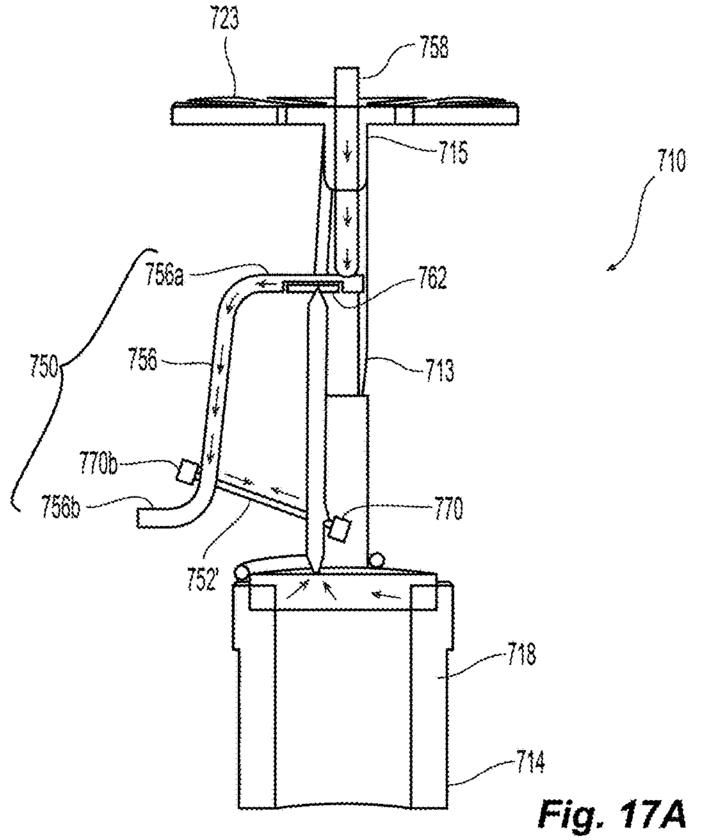
FIG. 17A is another fluid distribution device with another preferred embodiment of a releasing mechanism.
Figure 17B:
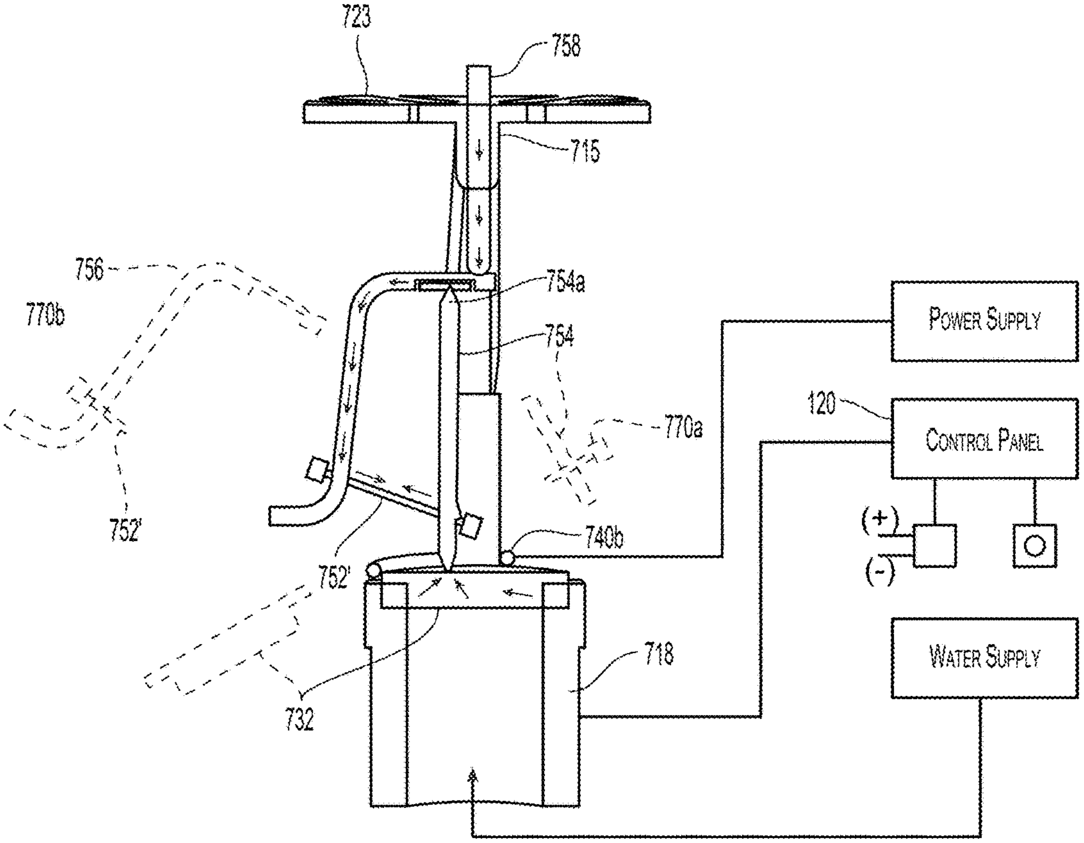
FIG. 17B is a cross-sectional schematic view of the device of FIG. 17A in operation.

Shown in FIGS. 17A and 17B is an alternate embodiment of the sprinkler 710 and releasing mechanism 750 with an alternate link 752'. The sprinkler 710 again includes the preferred sprinkler frame 712 with a first electric pole, a preferred sealing assembly 730 and conductive ejection spring member 40*b* as previously described. Like the prior embodiment, the sprinkler 710 includes a releasing mechanism 750 with a hook and strut assembly. However, instead of including a thermally responsive link type actuator, the releasing mechanism 750 includes an electrically fusible link that is thermally insensitive at temperatures of up to 1000° F., which are anticipated for high challenge fires. Accordingly, the sprinkler 710 and its releasing mechanism 750 is actuated only by the actuating electric signal delivered to the sprinkler 710 and more preferably delivered via a preferred electrical actuation path.

The preferred releasing mechanism 750 is embodied as another unique hook and strut arrangement that includes a strut member 754, a hook member 756, a screw or other threaded member 758, and an electric fusible link 752'. The screw 758 forms a threaded engagement with the frame 718 at the apex 715 and applies a load axially aligned with the longitudinal axis A-A. In the unactuated configuration of the releasing mechanism 750, the first end 754*a* of the strut member 754 is in contact with a first portion 756*a* of the hook member 756 and defines a fulcrum preferably offset from the longitudinal axis A-A; and the second strut end 454*b* is engaged with the sealing assembly 730 and preferably located along the longitudinal axis A-A. Countering the moment generated by the load screw 758 is the preferred electric fusible link 752' which couples the hook member 756 to the strut member 754 to statically maintain the hook and strut arrangement in its unactuated state for supporting the seal assembly 730 against the bias of the sealing spring or water pressure delivered to the sprinkler. The link 752' engages a second portion 756*b* of the hook member 756 relative to the first end 754*a* of the strut member 154 to define a second moment arm which is sufficient to maintain the hook member 756 in a static position with respect to the strut member 754 in the unactuated state of the releasing mechanism 750.

The electric fusible link 752' is preferably a resistive metal wire, preferably of a nickel chromium (NiChrome) alloy held in tension to statically maintain the releasing mechanism 750 in its unactuated state for supporting the sealing assembly in the outlet 722. Upon receipt of the electrical actuating signal of an appropriate power, the wire link 752' breaks to permit the hook member 756 to pivot about the fulcrum and collapse the releasing mechanism 750. To attach the link 752' to each of the hook member 756 and strut member 754, the wire 752' can be threaded through respective openings or penetrations formed in each of the hook and strut members 754, 756, and held in place under tension by appropriate fastening members 760*a*, 760*b* such as for example, a crimp, buckle or other device. Alternate forms of fastening the wire link 752' to each of the strut and hook members 754, 756 are possible, such as for example soldering, so long as the wire link is held under appropriate tension to maintain the trigger assembly in its unactuated configuration.

Once installed, preferably in a manner as previously described, an electrical actuating signal can be delivered to the sprinkler 710 and its first electrical pole to actuate the releasing mechanism 750. The preferred embodiment of the releasing mechanism 750 preferably defines or controls the direction of the electrical actuation path to be directed along the length of the preferred electric fusible link 752'. To eliminate an undesired short circuit of the electrical actuation path, the preferred releasing mechanism 750 includes an insulated contact between the hook member 756 and the first end 754*a* of the strut member 754 in a manner as previously described such that the electrical actuation path is defined through the frame 712, for example, through the frame arms

713*a*, 713*b*, through the hook member 756 and across the electronic fusible link 752'. Accordingly, the first portion 756*a* of the hook member 756 preferably includes an insulated region configured as shown and described in the insulation region 760 in the hook member of FIG. 15. Moreover in a preferred embodiment, insulation is applied to the electronic fusible link 752' to reduce the thermal losses of the link thereby reducing the required power needed to actuate or break the link 752'.

Again, when actuation is desired an electric current of sufficient power can be sent through the preferred electric fusible link 752' in a sufficient way as to cause rapid heating of the link to the point at which it loses its tensile properties causing it to break and allow the actuator assembly to collapse and release its support of the sealing assembly. Upon operation of the releasing mechanism 750 water is discharged from the outlet 722 to impact a deflector assembly 723 and redistributed in a desired manner to address a fire. Preferably, the deflector assembly 723 is coupled to the frame 712 and preferably includes a deflector member that is shown generically and preferably disposed at a fixed distance from the outlet 722 in the longitudinal direction by the pair of frame arms 713*a*, 713*b*. Moreover, each of the embodiments of the sprinkler 710 is shown with the releasing mechanism 750 and deflector assembly 723 disposed below or axially spaced from the frame body 718 and the ejection spring 740*b*. Accordingly, the wires connected to the preferred first and second electrical poles can be routed or located outside the operational area of the sprinkler 710 about the longitudinal axis so as not to interfere with the operational components of the sprinkler including not interfering with the collapse of the releasing mechanism 750, the ejection of the sealing assembly 730 or the fluid path impacting the deflector assembly 723.

Figure 18:
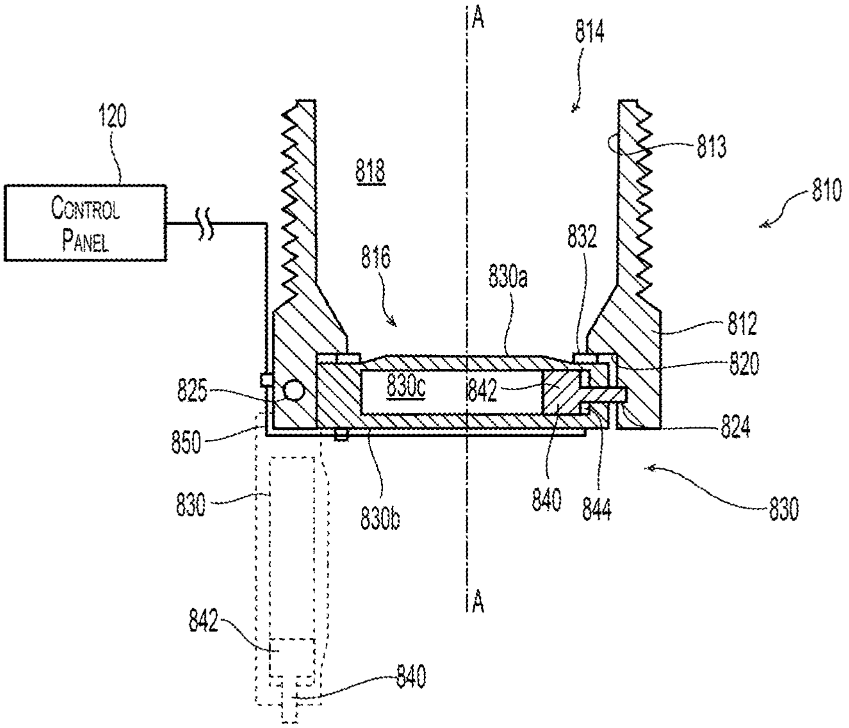
FIG. 18 is another embodiment of a fluid distribution device with a preferred embodiment of a releasing mechanism.

Alternate embodiments of a fluid distribution device for use in the system 100 are shown in FIGS. 18-18C, 19-19A, and 20 in which the device includes a frame body having a sealed outlet that is opened by the operation of a linear actuator from an extended configuration to a retracted configuration. Shown in FIG. 18 is a first preferred embodiment of a fire fluid distribution device 810 having a frame body 812 having an internal surface 813 defining an inlet 814, an outlet 816 and internal passageway 818 extending from the inlet 814 to the outlet 816 to define a longitudinal axis A-A. An exemplary frame body 812 of the fire protection device 810 can be substantially configured and/or dimensioned as a nozzle body similar to, for example, the TYCO TYPE HV HIGH VELOCITY directional spray nozzle or the MULSIFYRE NOZZLE directional spray nozzle, each from Tyco Fire Products, LP of Lansdale, PA provided the nozzles are configured for automatic or controlled operation in manner as detailed herein. These known nozzles are respectively shown and described in the following technical data sheets: (i) "TFP815: Type HV High Velocity Directional Spray Nozzles, Open, Non-Automatic" (August 2013); and (ii) "TFP810: Model F822 thru F834 Mulsifyre Directional Spray Nozzles, Open, High Velocity" (February 2014), each of which is available from Tyco Fire Products, LP at <http://www.tyco-fire.com>.

Shown preferably disposed within the frame body 812 is one preferred embodiment of a preferred sealing assembly having a sealing body 830 proximate the outlet 816 that defines the unactuated state of the fire protection device in which sealing body 830 occludes the passageway to prevent the flow of fluid along a discharge path from the inlet 814 through the passageway 818 and out the outlet 816. The discharge path includes any portion of the resulting spray pattern formed from the fluid discharged from the outlet under the working or design pressure of the device 810. In one preferred aspect of the device 810, a shoulder is preferably formed along the internal surface 813 to define a sealing surface 820 and the outlet 816. The sealing body 830 includes a first surface 830*a* and an opposite surface 830*b* spaced along the longitudinal axis A-A to define the thickness or height of the preferred body 830. In the unactuated state of the device 810, the first surface 100*a* is configured to form a fluid tight seal with the sealing surface 820. More preferably, the body 830 includes a sealing member 832 centered on the first surface 830*a* of the sealing body 830 to form the fluid tight seal with the sealing surface 820 in the unactuated state of the device 810. An exemplary sealing member 832, can be a Belleville Spring Seal that is disposed or secured about a central post, projection or other formation on the first surface 830*a*.

Also shown in FIG. 18 in phantom is the preferred sealing body 830 in a position spaced from the outlet 816 to define an actuated state of the device 810. To control the position of the sealing body 830 and the state of the device 810, the sealing assembly further includes a linear actuator 840 which in an extended configuration supports and/or secures the sealing body 830 in the position proximate the outlet 816 of the unactuated state of the device 810 and in a retracted configuration releases the sealing body 830 to a position spaced from the outlet 816 in the actuated state of the device 830.

In the preferred embodiment of the fire protection device 810 of FIG. 18, the sealing body 830 is shown in phantom pivoted out of the discharge path from its sealed position. Accordingly, the preferred embodiment of the device 810 in FIG. 18 provides for a hinged connection 825 between the frame body 812 and the sealing body 830. Within the preferred sealing body 830, the linear actuator provides for the preferred releasing mechanism 840 that preferably includes an axial rod or member, and more preferably a piston 842, housed within an internal chamber or passageway 830*c* formed between the first and second surfaces 830*a*, 830*b* of the body 830. Preferably associated with, disposed about or coupled to the piston 842 is an electrical solenoid or contact 844 of the releasing mechanism 840 that, when energized, controls the motion of the piston 842 from its extended configuration to a retracted configuration. Alternatively or more specifically, the linear actuator of the mechanism 840 can be embodied as an electrically operated pull type METRON actuator from Chemring Energetics UK, of Ayrshire, Scotland, UK and shown and described at <http://www.chemringenergetics.co.uk>. Control signals or energizing pulses can be provided to the releasing mechanism 840 by, for example, the controller 120 of the system 100 via an external cable or wiring 850.

In its extended configuration, the piston 842 extends preferably radially beyond the sealing body 830 to engage a groove, recess or detent 824 formed along the inner surface 813 of the frame body 812 proximate the outlet 816 and preferred sealing surface 820. The engagement of the piston 842 in the recess 824 supports the sealing body in its unactuated position and more preferably loads or locks the sealing body 830 against the sealing surface 820 to compress the sealing member 832 and resist fluid pressure delivered to the device 810 upon installation. To actuate the device 810, an actuating signal is delivered to the electrical contact or solenoid; and in response the piston 842 is retracted out of engagement with the recess 824 and released such that the sealing body 830 pivots out of the discharge path of the device to its actuated position under the force of fluid delivered to the device 810. Additionally or alternatively, the hinge connection 825 can include a biasing element, such as for example a torsion spring to bias the sealing body 830 to its fully pivoted position outside the discharge path.

The hinged connection 825 is shown schematically in FIG. 18 as a pin connection between the sealing body 832 and the frame body 812 and internal at least with respect to the outer surface of the frame body 812. The internal hinge connection 825 can be, for example, a pin or ring disposed along the inner surface 813 of the frame body 812 about which the sealing body 830 can pivot. Moreover, although the sealing body 830 is shown as being of unitary construction, it should be understood that the body is constructed as many components necessary to house the linear actuator 840 and its associated components and to provide sufficient openings for the positioning and translating the piston from each of its extended and retracted configurations.

Figure 18A:
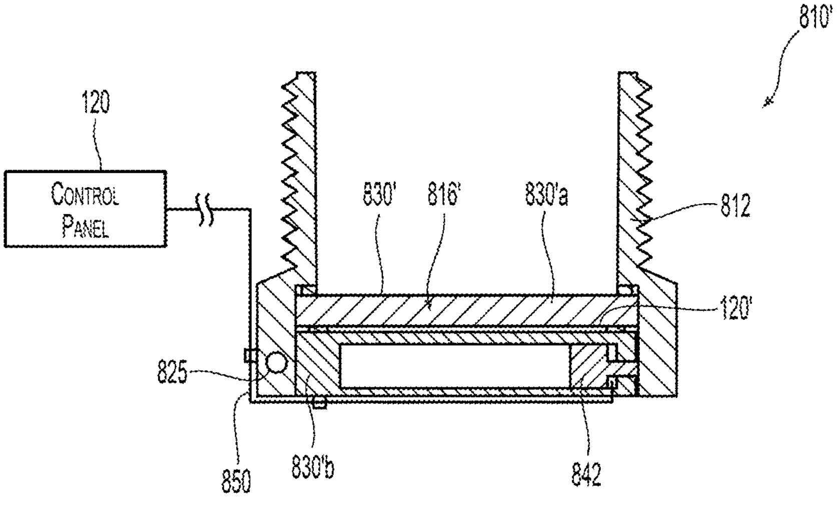
FIG. 18A is another embodiment of a fluid distribution device with a preferred embodiment of a releasing mechanism.
Figure 18B:
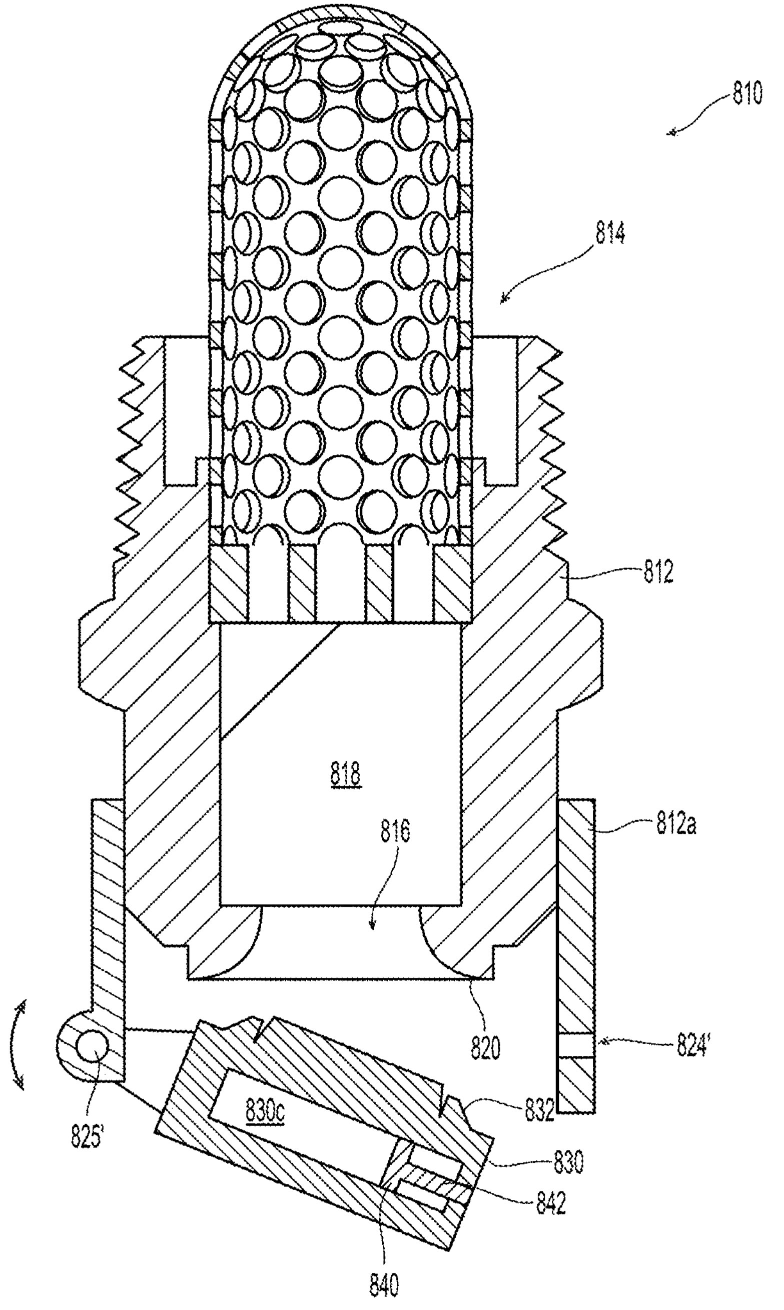
FIG. 18B is yet another embodiment of a fluid distribution device with a preferred embodiment of a releasing mechanism.

For example, shown in FIG. 18A is an alternate embodiment of the device 810' in which the sealing body 830' includes a first member 830'*a* that forms the seal with the frame body 812 in the unactuated state of the device 810' and a second member 100'*b* houses the linear actuator 840. In one preferred arrangement, the first and second sealing body members 830'*a*, 830'*b* are fixed to one another so as to pivot together about the internal hinge connection 825 upon retraction of the piston 842 of the releasing mechanism 840 in a manner as previously described. Alternatively, the first member can be fixed within the frame body 812 as an insert to define a preferred sealing surface and outlet 820', 816' of the device 810'. The second member 830'*b* would then form the fluid tight seal with the first member 810'*a* in the unactuated state of the device 810' and pivot independent of the first member 830'*a* in the actuated state about the hinge connection 825. Further in the alternative, the first and second members 830'*a*, 830'*b* can have a hinge connection 825'*s* between them so that the sealing assembly 830' provides a complete insert that provides for the sealing surface, the linear actuator and hinge connection. Another alternate construction could provide for an external hinge connection using either sealing body 830, 830'. Shown in FIG. 18B is a schematic representation of an alternate arrangement in which the hinge 825' is located outward of the external surface of the frame body 812. In the exemplary embodiment, the device 10 can include an external bracket 812*a* disposed about the frame 812 which provides a pivot pin connection 825' and recess 824' that is external to the frame body 812 for the sealing body 830 to engage accordingly in the extended and retracted conditions. In order to facilitate the external hinge, the sealing body 830 must be of sufficient dimension to pivot into and out of sealed engagement with the internal seal surface 820.

Figure 19:
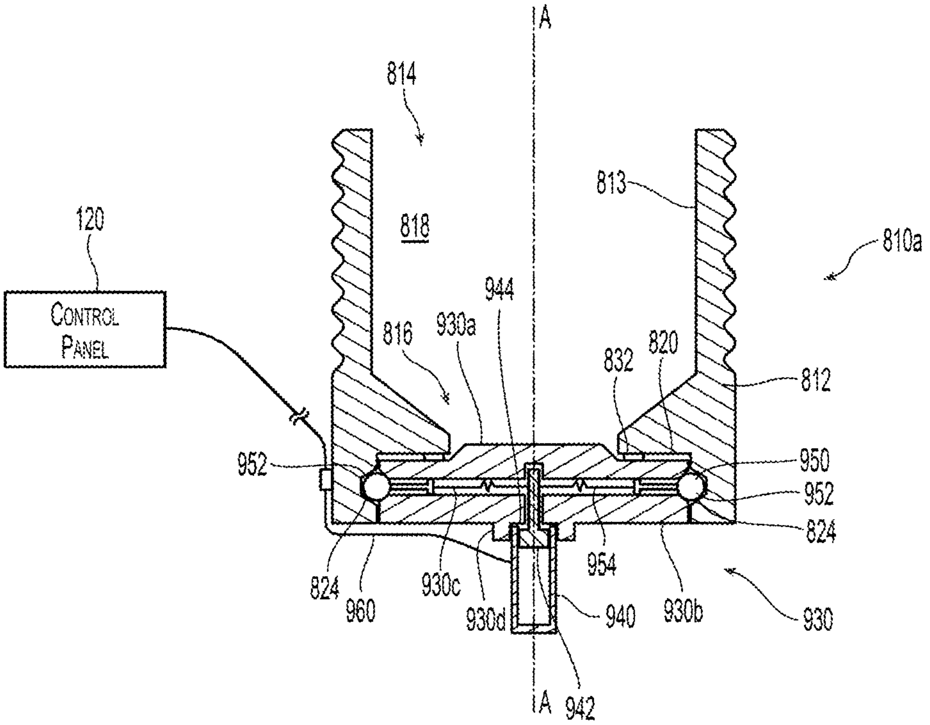
FIG. 19 is a schematic installed view of another embodiment of a fluid distribution device with another preferred embodiment of a releasing mechanism.
Figure 19A:
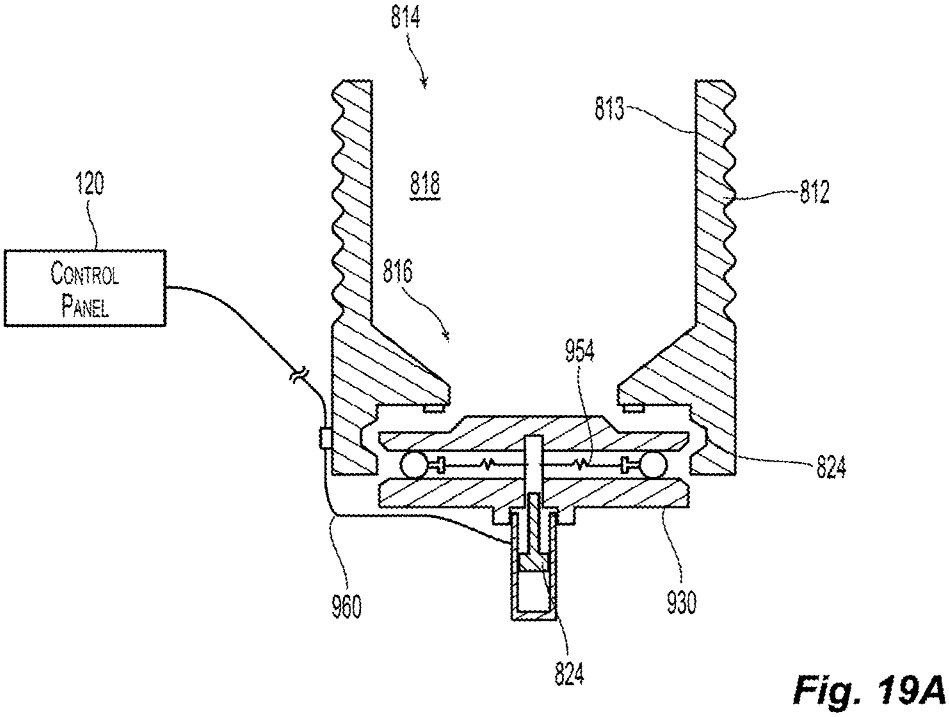
FIG. 19A is a schematic installed view of the device of FIG. 19 in operation.
Figure 20:
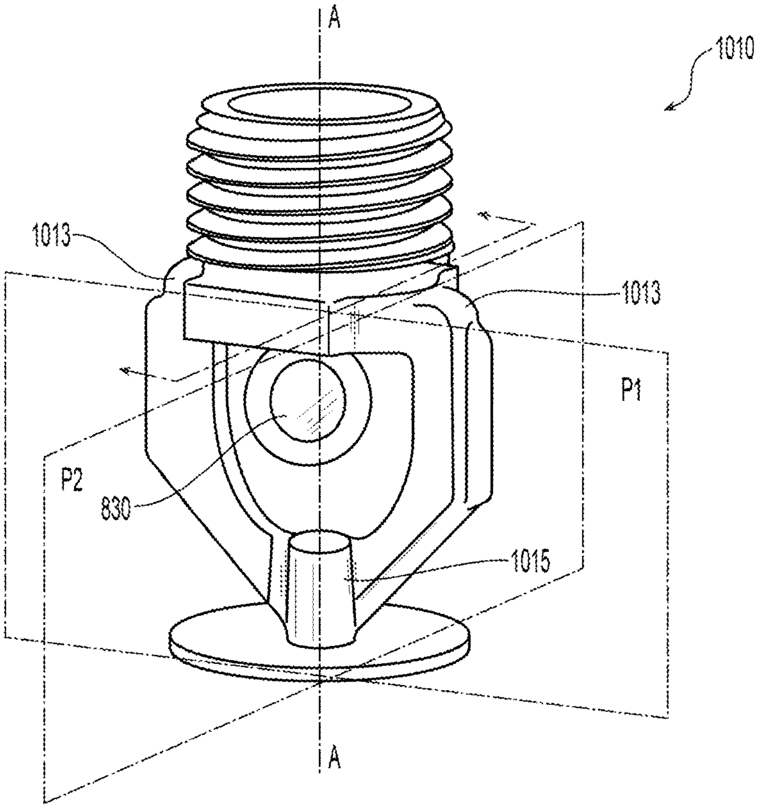
FIG. 20 is an illustrative alternate embodiment of a fluid distribution device with the releasing mechanism of FIG. 19 in operation.

FIG. 19 shows another preferred embodiment of a preferred fluid distribution device 810*a* that includes a sealing assembly 930 having a releasing mechanism to release the sealing assembly and space the sealing assembly from the outlet in actuated state of the device 810*a*. In this preferred embodiment, the sealing assembly includes a sealing body 930 that is supported in place proximate the outlet by a releasing mechanism including one or more ball-detent mechanism(s) 950. The ball-detent mechanism 950 is pressured by the linear actuator 940 in its extended configuration to maintain the sealing body 930 proximate the outlet 816 in the unactuated state of the device 810*a*. The retracted configuration of the linear actuator 940 releases the pressure on the ball-detent mechanism 950 to permit the ejection of the sealing body 930 in the actuated state of the device 810*a*.

As shown, the sealing body 930 includes a first surface 930*a* for engaging the internal sealing surface 820 of the frame body and an opposite second surface 930*b*. As previously described, the sealing body 930 can include a sealing member 932 such as, for example, a Belleville spring centered about a central post or formation of the first surface 930*a*. Formed between the first and second surfaces 930*a*, 930*b* of the sealing body 930 are one or more radially extending internal passageway(s) 930*c* for housing one or more spherical balls 952 and corresponding biasing members 954 of the ball-detent mechanism 950. The radial passageways form openings along the periphery or radial surface of the sealing body 930. The biasing members 954 transmit a pressure to the balls 952 such that the balls extend out of the internal passageway 930*c* and the perimeter of the sealing body 930. The biasing member 954 can be a spring element such as for example a coil spring or leaf spring. Preferably formed along the inner surface 813 of the frame body 812 is a corresponding detent, recess or groove 824 of the ball-dent mechanism 950 for receiving the portion of the ball 952 extending from the radial opening of the passageway 930*c* under the transferred pressure. With the balls of the releasing mechanism 950 engaged within the detent 924, the sealing body is supported in place proximate the outlet 816 in the unactuated state of the device 810*a*.

The pressure transferred and applied to the ball-detent mechanism 950 is provided by the preferably extended configuration of the linear actuator 940. Retraction of the linear actuator 940 relieves the pressure and release of the sealing body 930. The sealing body 930 preferably includes an axially extending passageway 930*d* for housing or coupling the linear actuator 940. More preferably, the axial passageway 930*d* and the displacement of the linear actuator 940 are parallel and axially aligned with the longitudinal axis A-A. As with the previously described embodiments, the linear actuator 940 preferably includes an axial rod, member or piston 942 and associated electrical contact or solenoid 944. As schematically shown, the piston 942 is preferably coupled, connected or mechanically associated with the biasing member(s) 954 of the ball-detent mechanism 950 such that in the extended configuration of the linear actuator a pressure is applied to the biasing member(s) 954 and transferred to the spherical ball(s) 952. Upon retraction of the piston 942, the pressure against the ball(s) 952 is relieved and the balls recoil or contract into the internal passageway 930*c*. Accordingly, in the preferred arrangement, the ball(s) 952 translate in a direction orthogonal to the direction of operation of the linear actuator 910 and its piston 942 and radially with respect to the longitudinal axis A-A.

Upon release of the pressure of the pressure against the ball-detent mechanism 950, the sealing body 930 can be ejected from the outlet 816, as seen in FIG. 19, of the from body under either its own weight a pull of gravity or by the fluid pressure delivered to the inlet 14 of the device 810*a*. To retain the sealing body 930, the device 810*a* preferably includes a harness between the sealing body 930 and the frame body 812 to keep the sealing body 930 coupled to the frame body in the actuated state of the device. Accordingly, in one preferred aspect, the sealing body can be reused when resetting the fire protection device or system. For the device 810*a*, the external cable or wiring, coupled to controller 120, can double as a harness to retain the sealing body 930 to the frame 812 in the actuated state of the device 810*a*.

The preferred sealing assemblies 830, 930 with releasing mechanisms described herein can be into other type of fluid distribution devices of the system, such as for example a fire protection sprinkler having a frame and outlet provided the sealing assembly and actuator do not interfere with the spray or discharge performance of the device. For example, the preferred sealing assemblies and releasing mechanisms described herein can be incorporated into a sprinkler device 1010 having a frame body 1012 as shown for example in FIG. 20 having a pair of frame arms 1013 that are disposed about the outlet 316 and converge toward the apex 1015. Where the frame arms 1013 define a first plane PI, the sealing assembly, such as for example pivotable sealing body 830, preferably is located outside of the plane PI in the actuated state of the device 1010 and more preferably pivoted in the second plane P2.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A system, comprising:
a plurality of fluid distribution devices beneath a ceiling of a storage occupancy and above a storage commodity of the storage occupancy, each fluid distribution device of the plurality of fluid distribution devices comprises:
a frame body comprising an internal passageway between an inlet and an outlet;
a deflector coupled with the frame body;
a seal assembly in the outlet;
a thermal trigger coupled with the seal assembly and at a position between the outlet and the deflector; and
an electrically responsive actuator arranged with the frame body to displace the thermal trigger from the position between the outlet and the deflector to control a flow of fluid discharge from the frame body;
one or more detectors to monitor the storage occupancy for a fire, the one or more detectors to detect a change in temperature and to detect smoke; and
a controller coupled to the one or more detectors and the plurality of fluid distribution devices, the controller to:
receive detection data from the one or more detectors;
determine a location of the fire based on the detection data;
select a number of the plurality of fluid distribution devices based on a type of the storage commodity and the location of the fire, the number including one or more fluid distribution devices of the plurality of fluid distribution devices, the type selected from at least one of a Class I commodity, a Class II commodity, a Class III commodity, a Class IV commodity, a Group A plastic, a Group B plastic, and a Group C plastic; and
communicate a control signal to the electrically responsive actuator of the selected number of fluid distribution devices of the plurality of fluid distribution devices to operate the electrically responsive actuator to address the detected fire; and
modify a discharge pattern of operation of the selected number of fluid distribution devices responsive to a determination that the fire has not been addressed.

2. The system of claim 1, comprising:
each detector of the one or more detectors is to detect a change of at least one of temperature, thermal energy, spectral energy, and smoke to indicate the fire in the storage occupancy.

3. The system of claim 1, comprising:
each detector of the one or more detectors comprises a temperature sensor and a smoke detector, and each detector of the one or more detectors is mounted to a corresponding fluid distribution device of the plurality of fluid distribution devices.

4. The system of claim 1, comprising:
the thermal trigger comprises a glass bulb.

5. The system of claim 1, comprising:
the controller is to communicate the control signal responsive to the detection data indicating that each of a pre-alarm threshold is met or exceeded and that an alarm threshold is met or exceeded, the alarm threshold greater than the pre-alarm threshold.

6. The system of claim 1, comprising:
the controller is to wirelessly receive the detection data from the one or more detectors.

7. The system of claim 1, comprising:
the plurality of fluid distribution devices are ceiling-only fluid distribution devices, and a height of the ceiling is twenty feet or greater.

8. The system of claim 1, comprising:
the controller is to select the number of fluid distribution devices according to a predetermined discharge array.

9. The system of claim 1, comprising:
the controller is to select the number of fluid distribution devices according to the detection data from a moment of a defined first detection of the detected fire up to a defined threshold moment in the detected fire.

10. The system of claim 1, comprising:
the controller is to wirelessly communicate the control signal to the electrically responsive actuator.

11. The system of claim 1, comprising:
the ceiling has a height of at least thirty feet, and the storage commodity has a height greater than or equal to twenty feet and less than or equal to fifty five feet, the height of the ceiling being greater than the height of the storage commodity.

12. The system of claim 1, comprising:
each fluid distribution device of the plurality of fluid distribution devices has a nominal K-factor of 14.0 GPM/PSI$^{(1/2)}$, 16.8 GPM/PSI$^{(1/2)}$, 19.6 GPM/PSI$^{(1/2)}$, 22.4 GPM/PSI$^{(1/2)}$, 25.5 GPM/PSI$^{(1/2)}$, 28.0 GPM/PSI$^{(1/2)}$, or 33.6 GPM/PSI$^{(1/2)}$.

13. The system of claim 1, comprising:
the ceiling has a height of at least 50 feet.

14. The system of claim 1, comprising:
the storage commodity includes any one of Class I, II, III or IV, Group A, Group B, or Group C plastics, elastomers, rubber, and exposed expanded plastic commodities.

15. The system of claim 1, comprising:
the storage commodity includes a rack storage including one or more of a multi-row rack, a double-row rack, or a single-row rack.

16. The system of claim 1, comprising:
the storage commodity includes a non-rack storage including one or more of palletized, solid-piled, bin-box, shelf, or back-to-back shelf storage.

17. A system, comprising:
a plurality of fluid distribution devices beneath a ceiling of a storage occupancy and above a storage commodity of the storage occupancy, each fluid distribution device of the plurality of fluid distribution devices comprises:

a frame body comprising an internal passageway between an inlet and an outlet; and an electrically responsive actuator coupled with the frame body to cause a flow of fluid discharge from the frame body;

one or more detectors to monitor the storage occupancy for a fire, the one or more detectors comprising at least one temperature sensor and at least one smoke sensor; and a controller coupled to the one or more detectors and the plurality of fluid distribution devices, the controller to:

receive detection data from the one or more detectors;

determine a location of the fire based on the detection data;

select a subset of the plurality of fluid distribution devices corresponding to the location of the fire and a type of the storage commodity, the type selected from at least one of a Class I commodity, a Class II commodity, a Class III commodity, a Class IV commodity, a Group A plastic, a Group B plastic, and a Group C plastic; and communicate a control signal to the electrically responsive actuator of the subset of the plurality of fluid distribution devices to operate the electrically responsive actuator to address the detected fire; and modify a discharge pattern of operation of the subset of fluid distribution devices responsive to a determination that the fire has not been addressed.

* * * * *